US012200484B2

(12) United States Patent
Li et al.

(10) Patent No.: US 12,200,484 B2
(45) Date of Patent: Jan. 14, 2025

(54) COMMUNICATION METHOD AND COMMUNICATIONS DEVICE

(71) Applicant: Huawei Technologies Co., Ltd., Shenzhen (CN)

(72) Inventors: Fei Li, Shenzhen (CN); Ruchuan Du, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 534 days.

(21) Appl. No.: 17/490,276

(22) Filed: Sep. 30, 2021

(65) Prior Publication Data

US 2022/0030428 A1 Jan. 27, 2022

Related U.S. Application Data

(63) Continuation of application No. PCT/CN2020/082155, filed on Mar. 30, 2020.

(30) Foreign Application Priority Data

| Mar. 30, 2019 | (CN) | 201910254151.2 |
| Apr. 8, 2019 | (CN) | 201910277715.4 |
| Dec. 26, 2019 | (CN) | 201911369774.0 |

(51) Int. Cl.
*H04W 12/06* (2021.01)
*H04W 8/12* (2009.01)
(Continued)

(52) U.S. Cl.
CPC ............. *H04W 12/06* (2013.01); *H04W 8/12* (2013.01); *H04W 36/0022* (2013.01);
(Continued)

(58) Field of Classification Search
CPC ........................ H04L 63/0884; H04L 63/0892
(Continued)

(56) References Cited

U.S. PATENT DOCUMENTS

2005/0078824 A1* 4/2005 Malinen .............. H04L 63/0876
455/410
2011/0265146 A1 10/2011 He
(Continued)

FOREIGN PATENT DOCUMENTS

| CN | 101998395 A | 3/2011 |
| CN | 101772020 B | 12/2011 |

(Continued)

OTHER PUBLICATIONS

3GPP TS 33.102 V15.1.0 "3rd Generation Partnership Project; Technical Specification Group Services and System Aspects; 3G Security; Security architecture(Release 15)," Dec. 2018, 77 pages.
(Continued)

*Primary Examiner* — Anthony D Brown
(74) *Attorney, Agent, or Firm* — Conley Rose, P.C.

(57) ABSTRACT

A communication method and a communications device, where the communication method includes: When a user equipment roams from a first network to a second network, a first core network device receives a first request, where the first request is a user authentication request or an authentication data request, where the first request carries an authentication vector request indication, where the second network is a 5G standalone network, where the first network is a 5G non-standalone network, and where the first core network device is in the first network. The first core network device generates an authentication vector quintet based on the authentication vector request indication, where a $0^{th}$ bit of an authentication management field in the authentication vector quintet is set to 1. The first core network device sends a response to the first request, where the response to the first request carries the authentication vector quintet.

20 Claims, 30 Drawing Sheets

(51) Int. Cl.
*H04W 36/00* (2009.01)
*H04L 9/40* (2022.01)
*H04W 36/14* (2009.01)

(52) U.S. Cl.
CPC ...... *H04L 63/0884* (2013.01); *H04L 63/0892* (2013.01); *H04W 36/14* (2013.01)

(58) Field of Classification Search
USPC .......................................................... 726/3
See application file for complete search history.

(56) References Cited

U.S. PATENT DOCUMENTS

| | | |
|---|---|---|
| 2017/0332226 A1 | 11/2017 | Bharatia |
| 2018/0139670 A1 | 5/2018 | Shaw et al. |
| 2019/0274038 A1 | 9/2019 | Wu et al. |
| 2020/0022031 A1 | 1/2020 | Li et al. |
| 2020/0128461 A1 | 4/2020 | Li et al. |
| 2021/0345284 A1* | 11/2021 | Gudivada ............. H04W 8/205 |

FOREIGN PATENT DOCUMENTS

| | | |
|---|---|---|
| CN | 108632880 A | 10/2018 |
| CN | 109104773 A | 12/2018 |
| CN | 109309920 A | 2/2019 |
| CN | 109548093 A | 3/2019 |
| CN | 104937965 B | 9/2019 |
| EP | 2941032 A1 | 11/2015 |
| WO | 2018158729 A1 | 9/2018 |

OTHER PUBLICATIONS

3GPP TS 33.501 V15.4.0 "3rd Generation Partnership Project; Technical Specification Group Services and System Aspects; Security architecture and procedures for 5G system (Release 15)," Mar. 2019, 187 pages.

Prasad, A., et al., "3GPP 5G Security," Journal of ICT Standardisation, vol. 6, No. 1, Mar. 30, 2018, pp. 137-158, XP055594813, 22 p.

3GPP TS 33.401 V15.7.0, "3rd Generation Partnership Project; Technical Specification Group Services and System Aspects; 3GPP System Architecture Evolution (SAE); Security architecture (Release 15)," Mar. 2019, 163 pages.

* cited by examiner

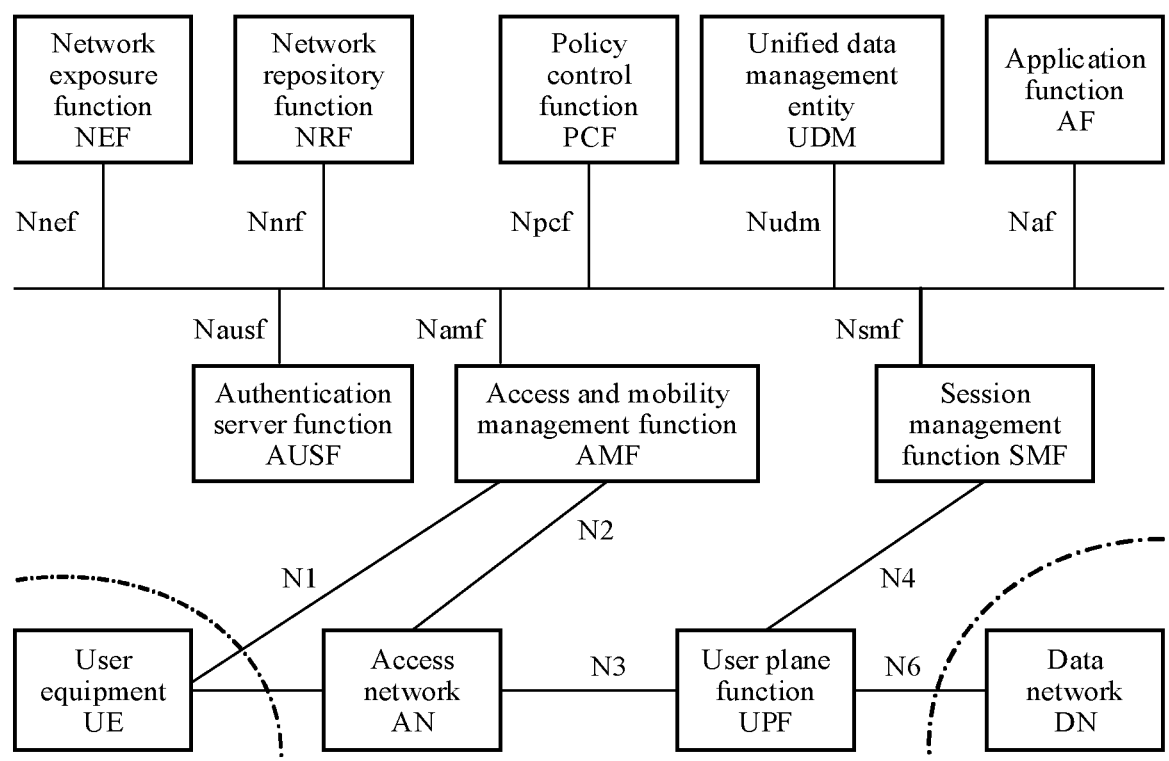
FIG. 1-A

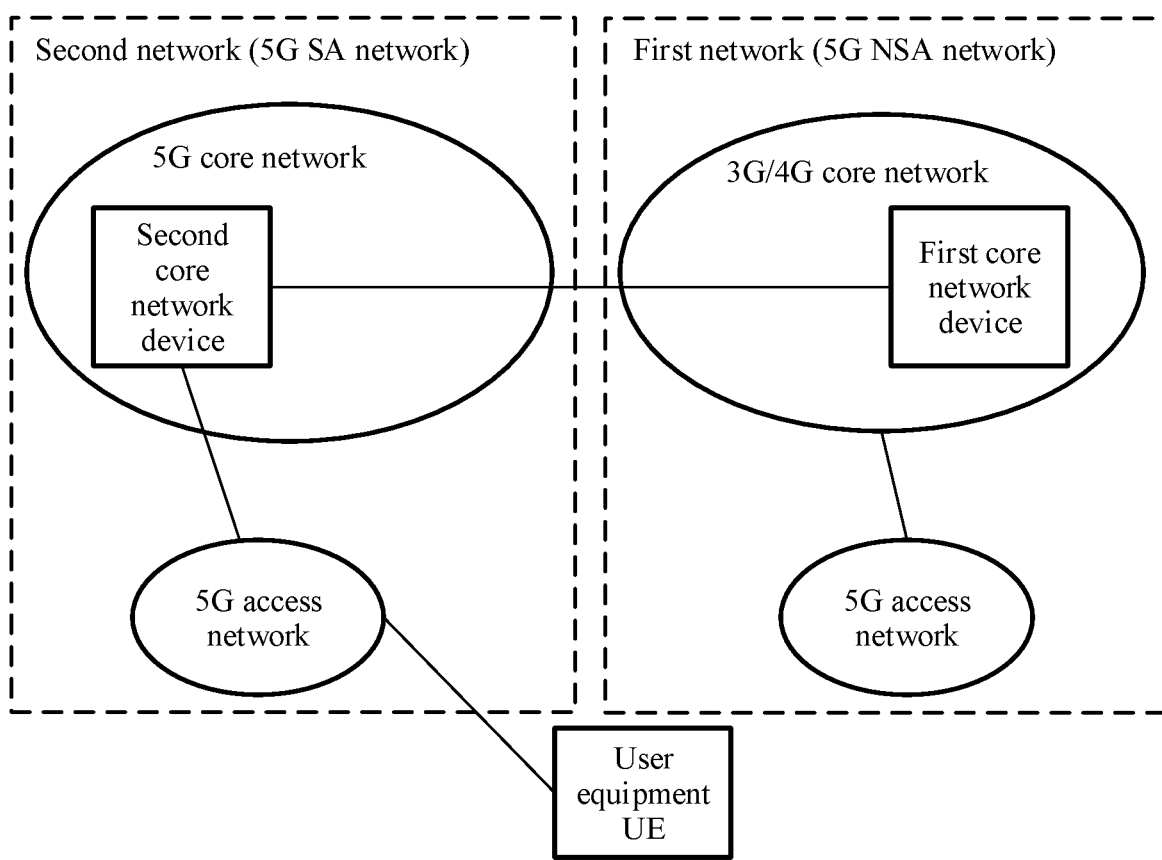
FIG. 1-B

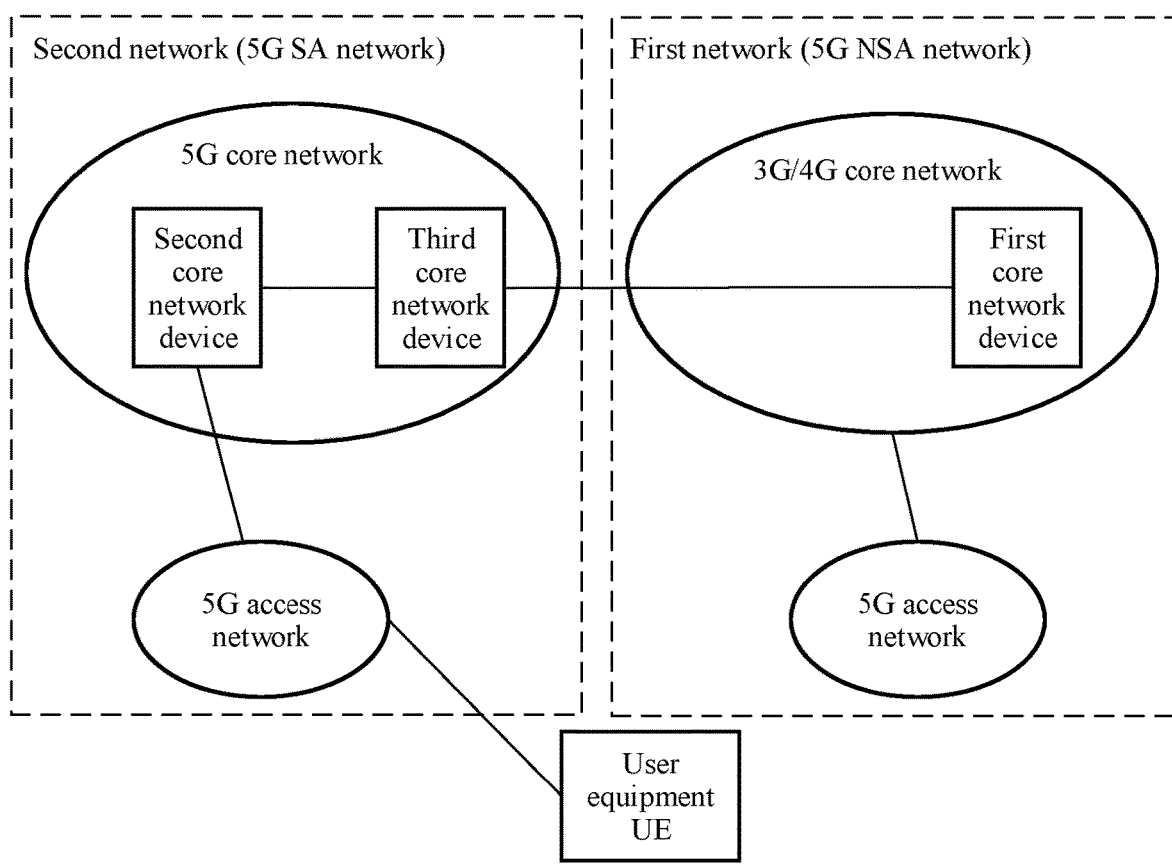
FIG. 1-C

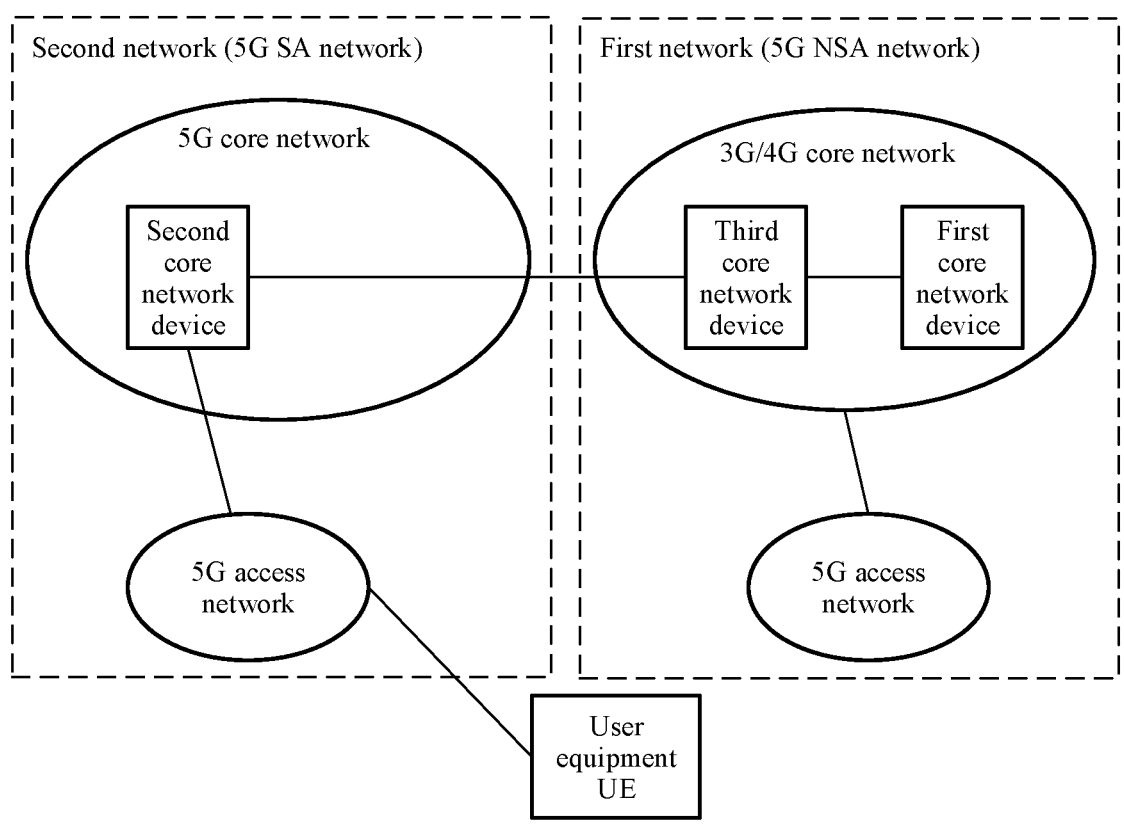
FIG. 1-D

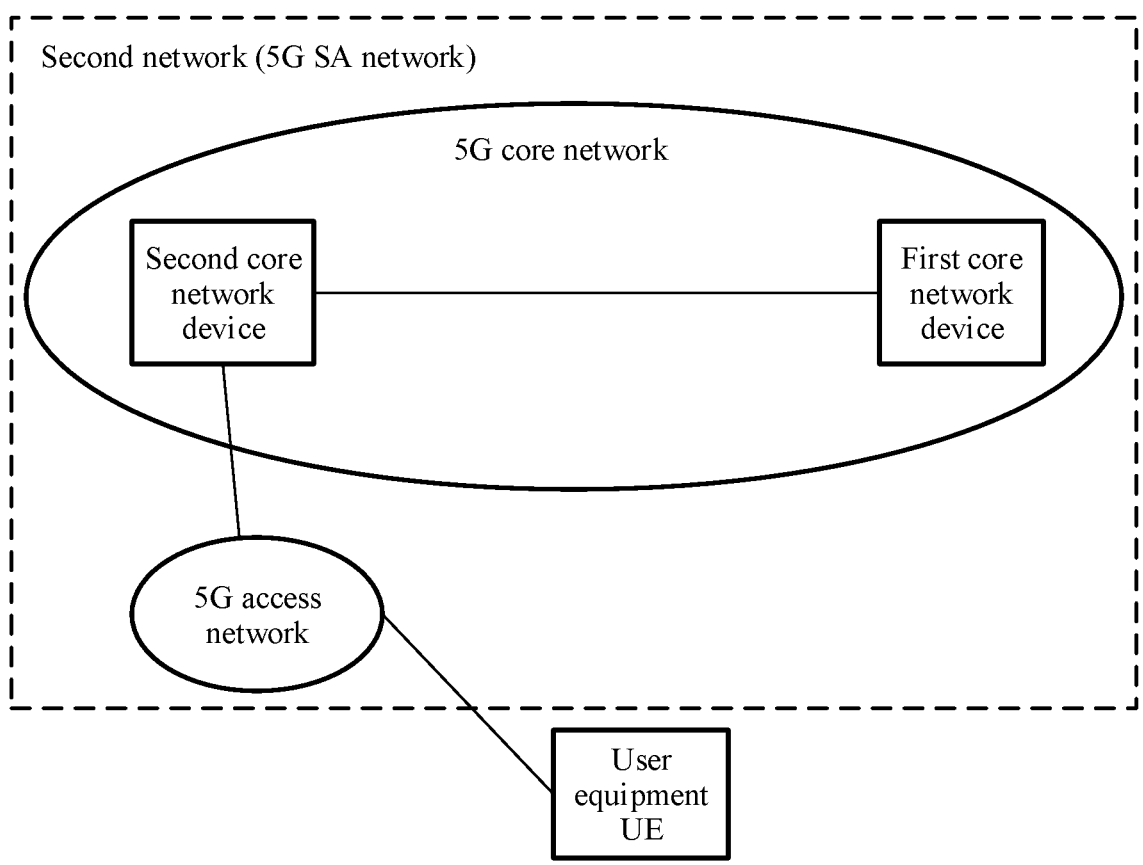
FIG. 1-E

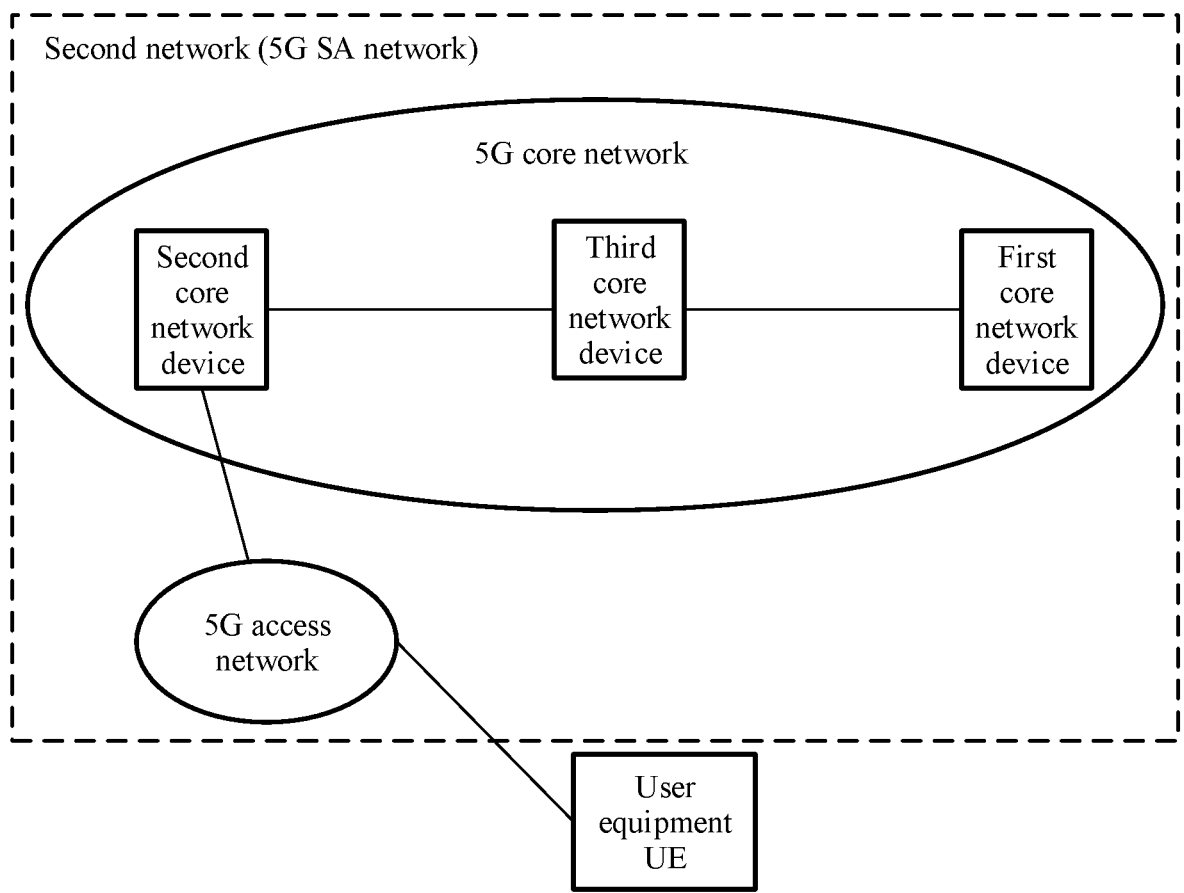
FIG. 1-F

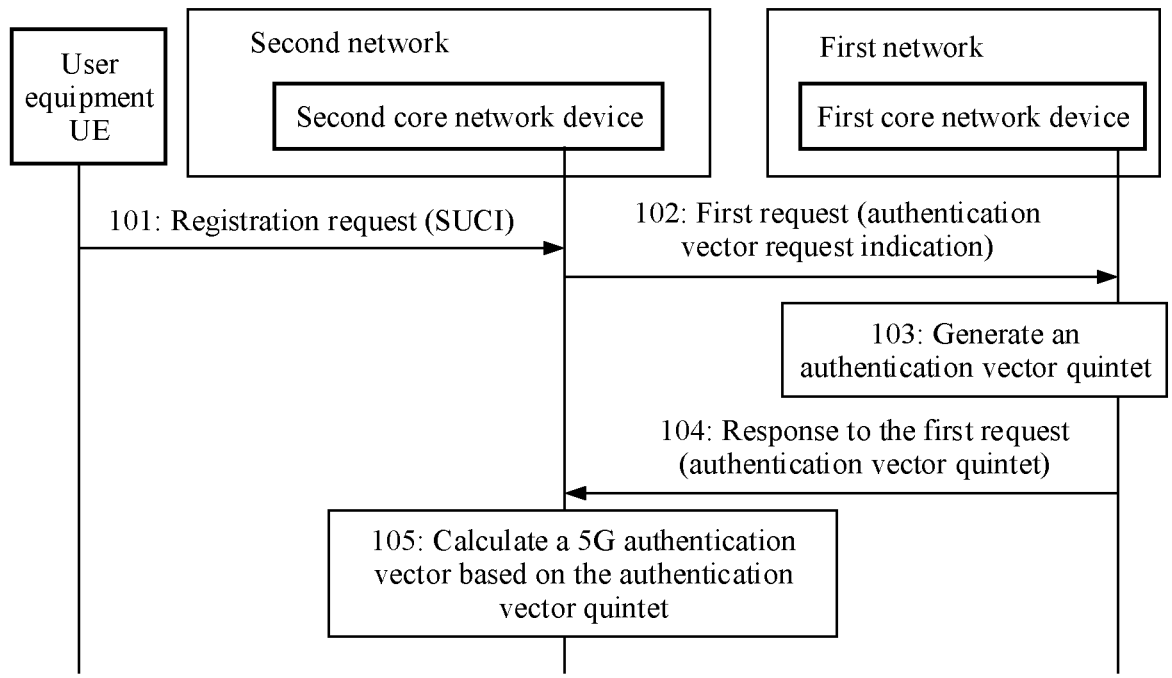
FIG. 2-A
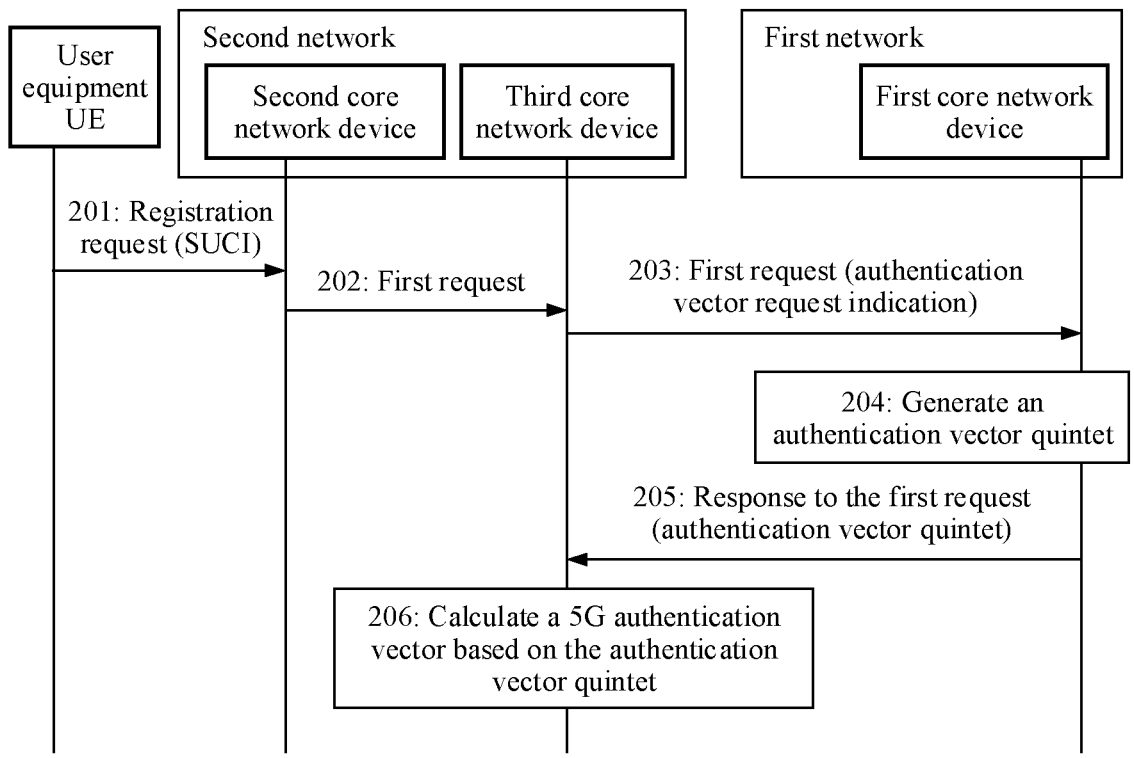
FIG. 2-B

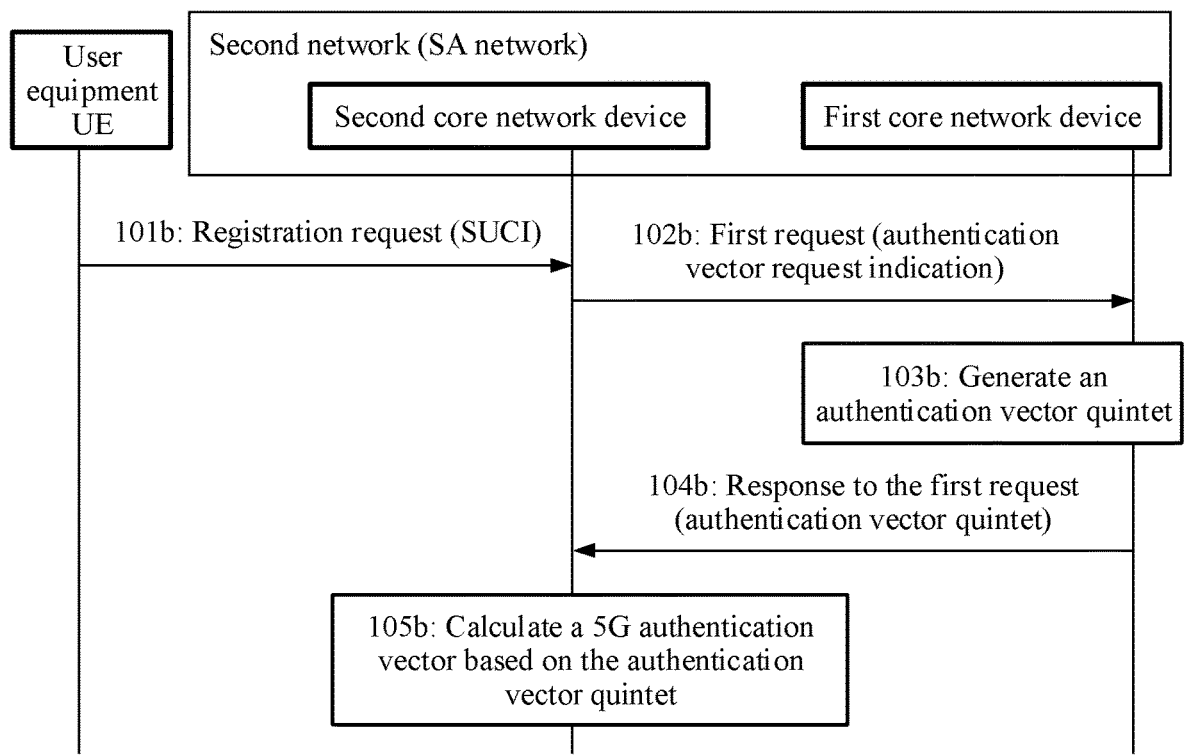
FIG. 2-C

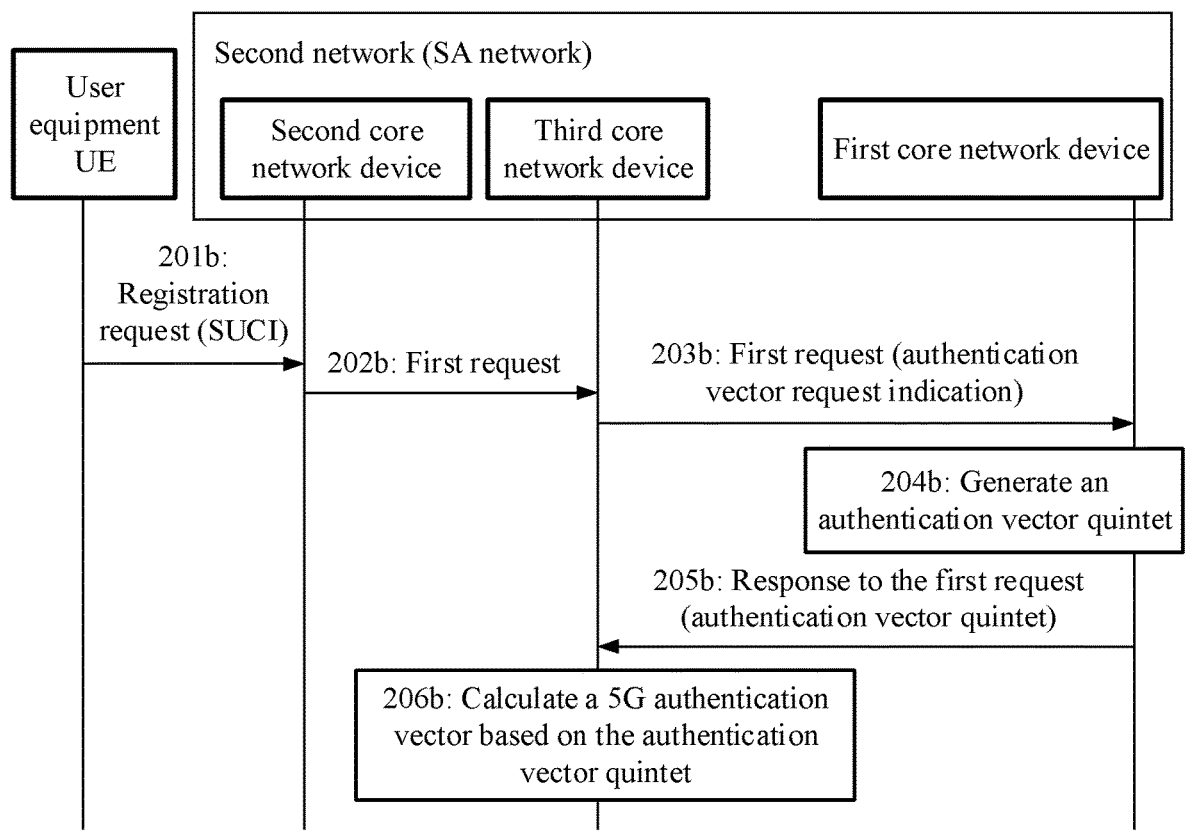
FIG. 2-D

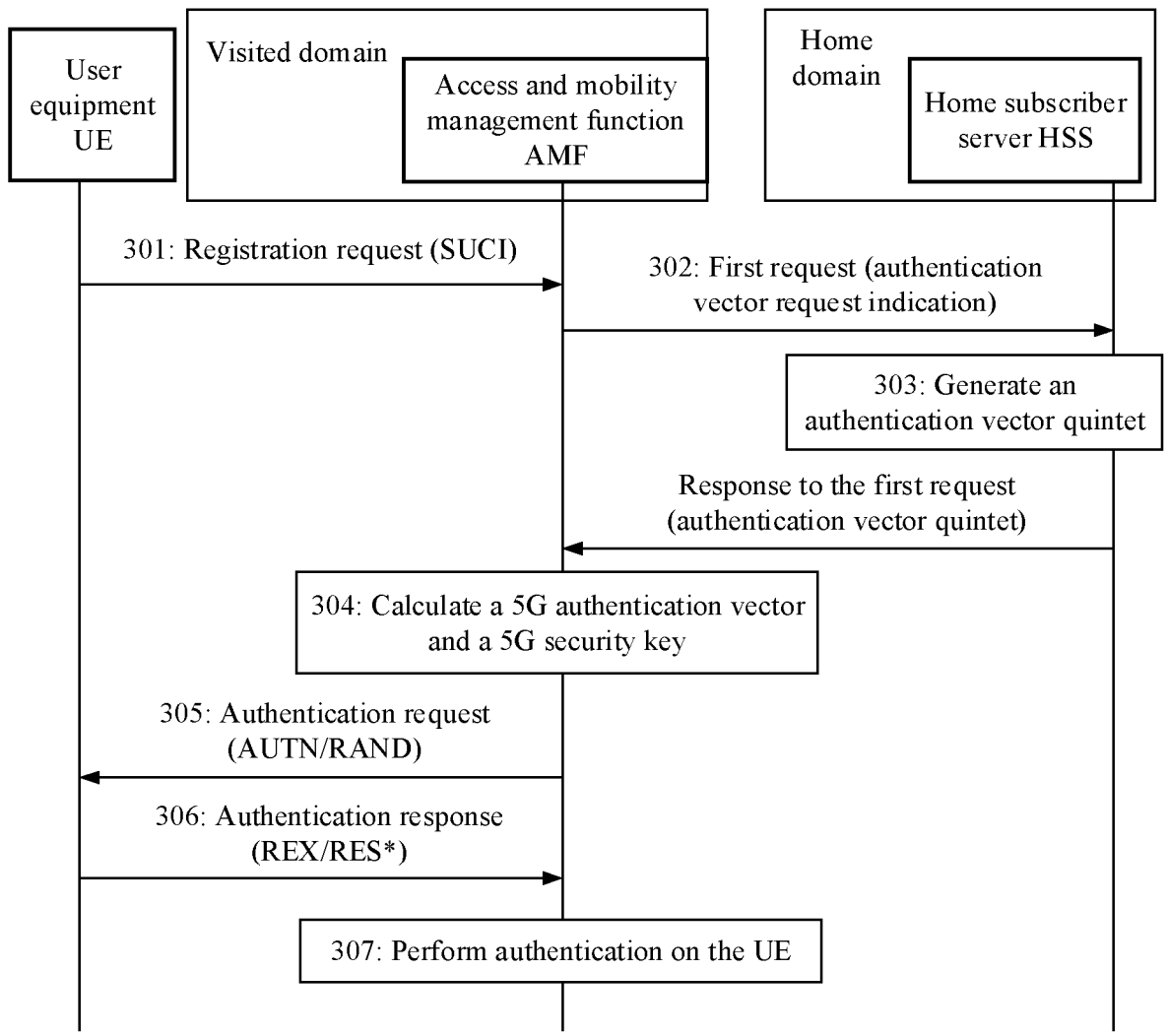
FIG. 3-A

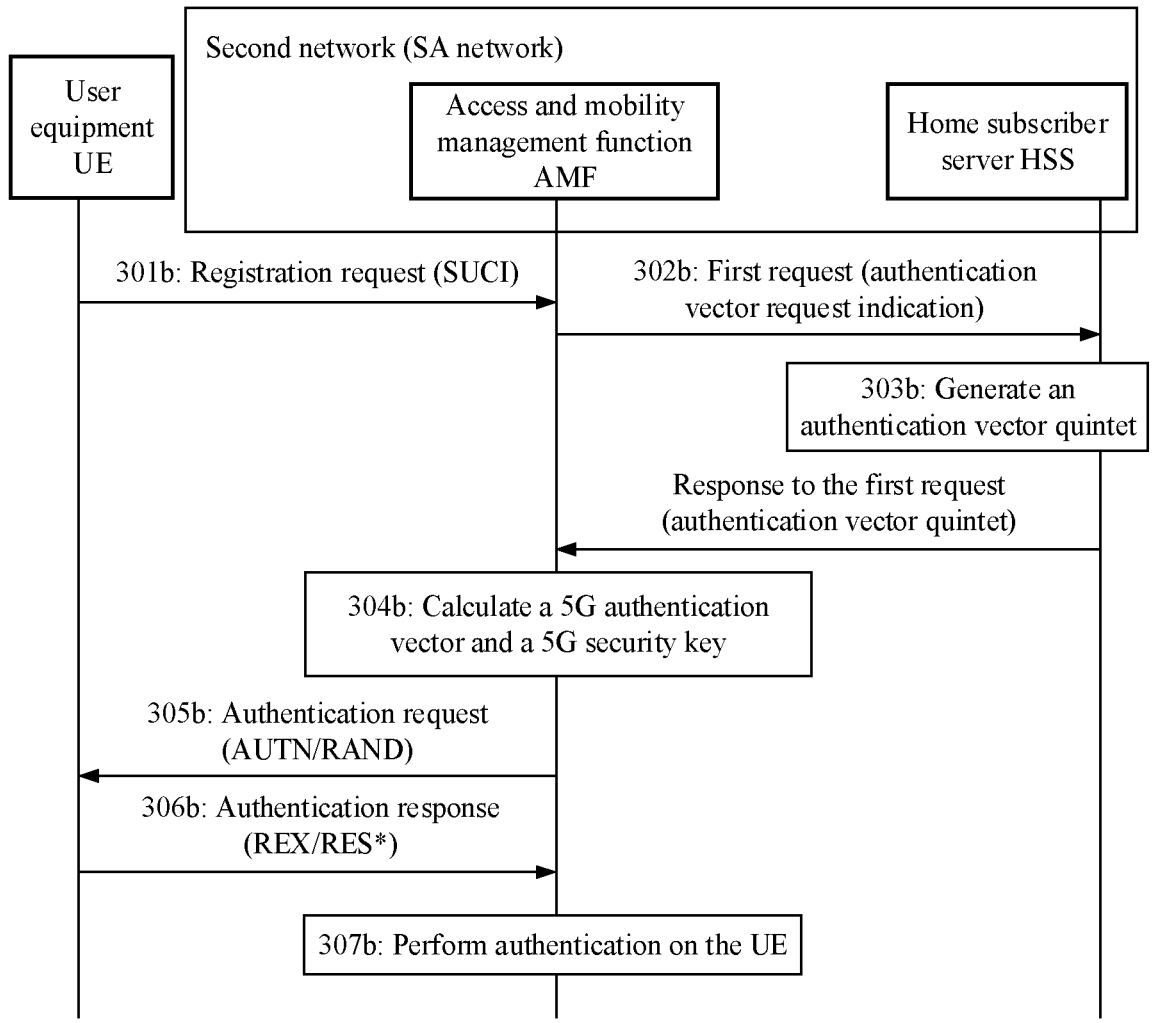
FIG. 3-B

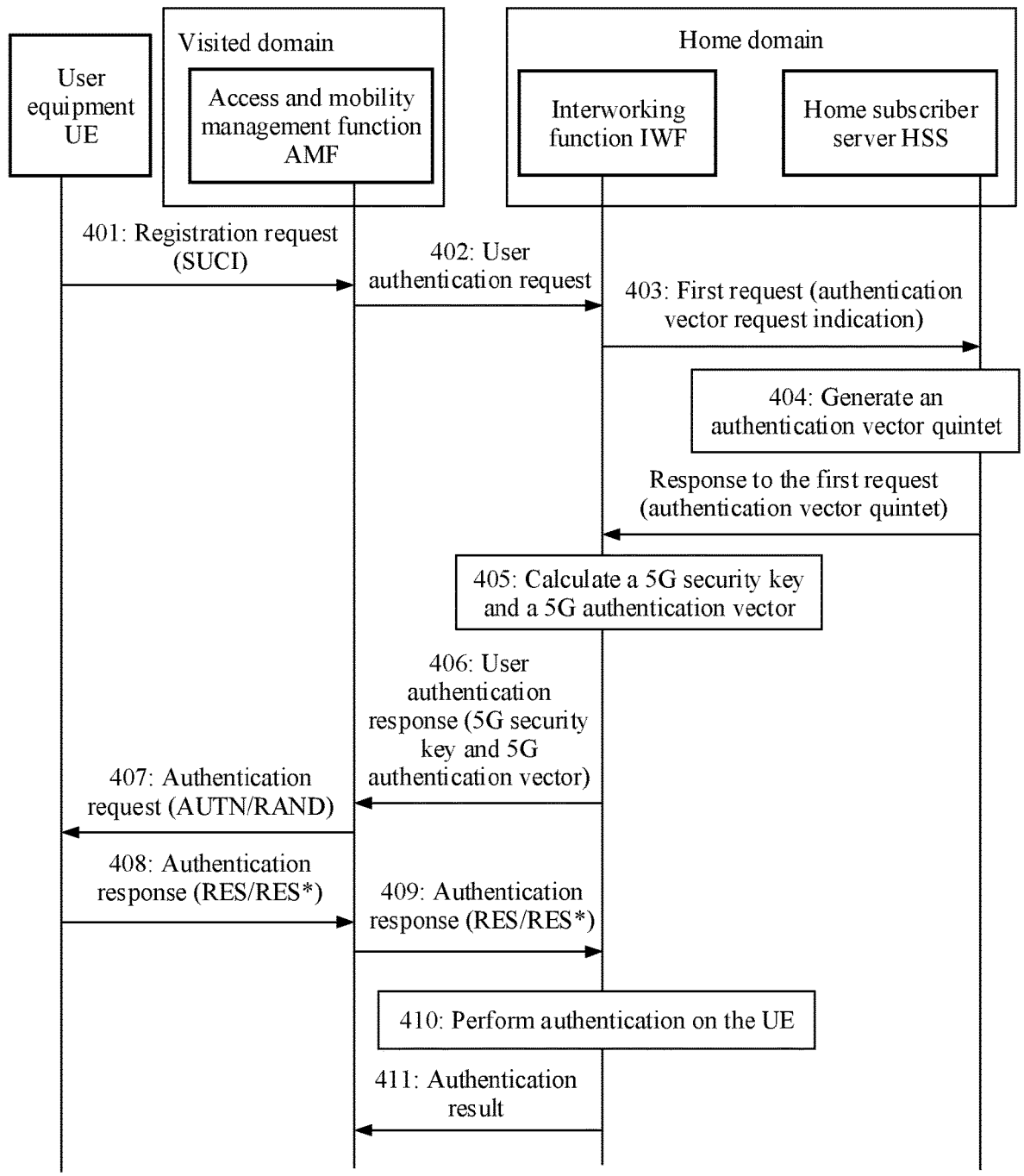
FIG. 4-A

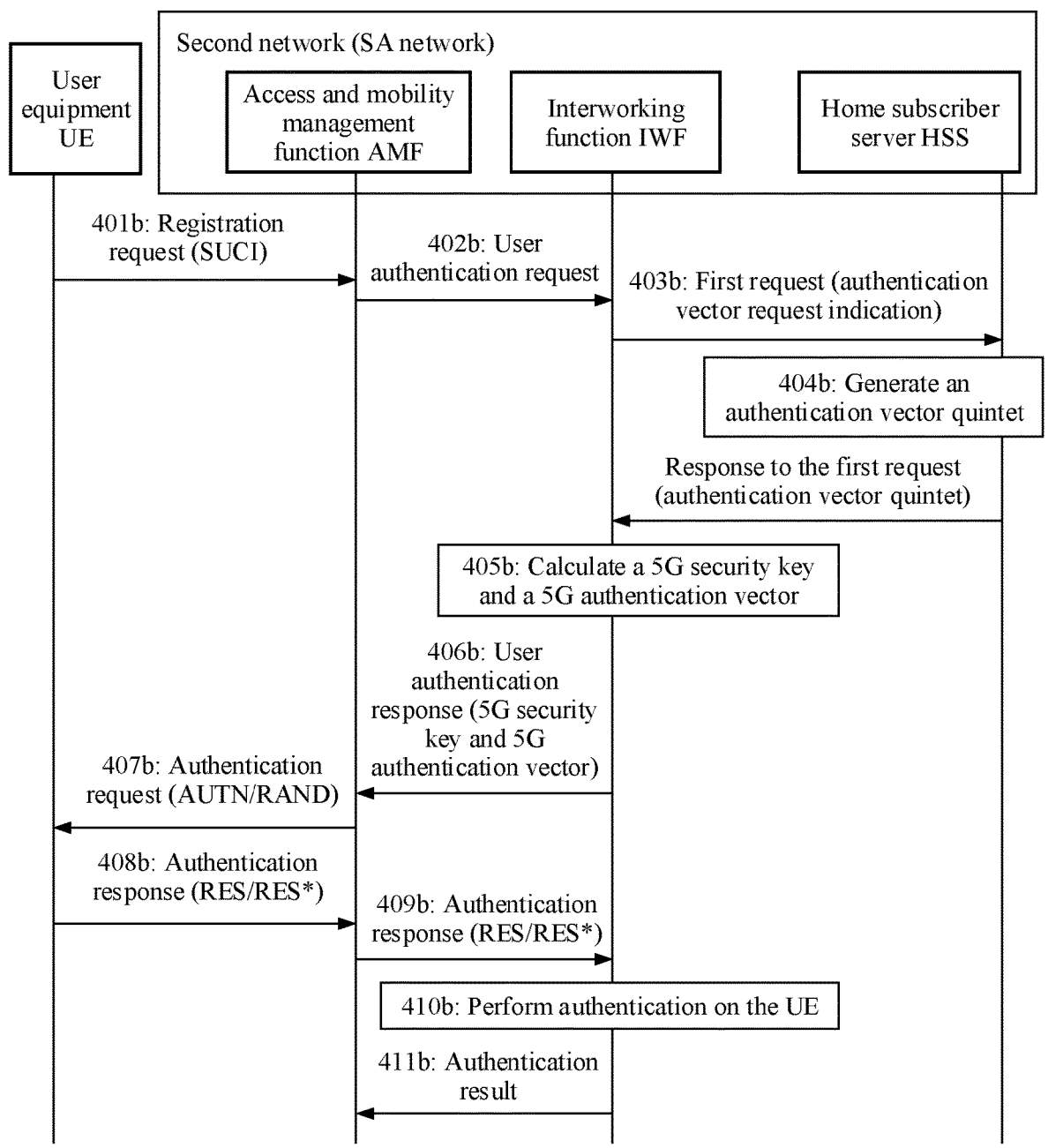
FIG. 4-B

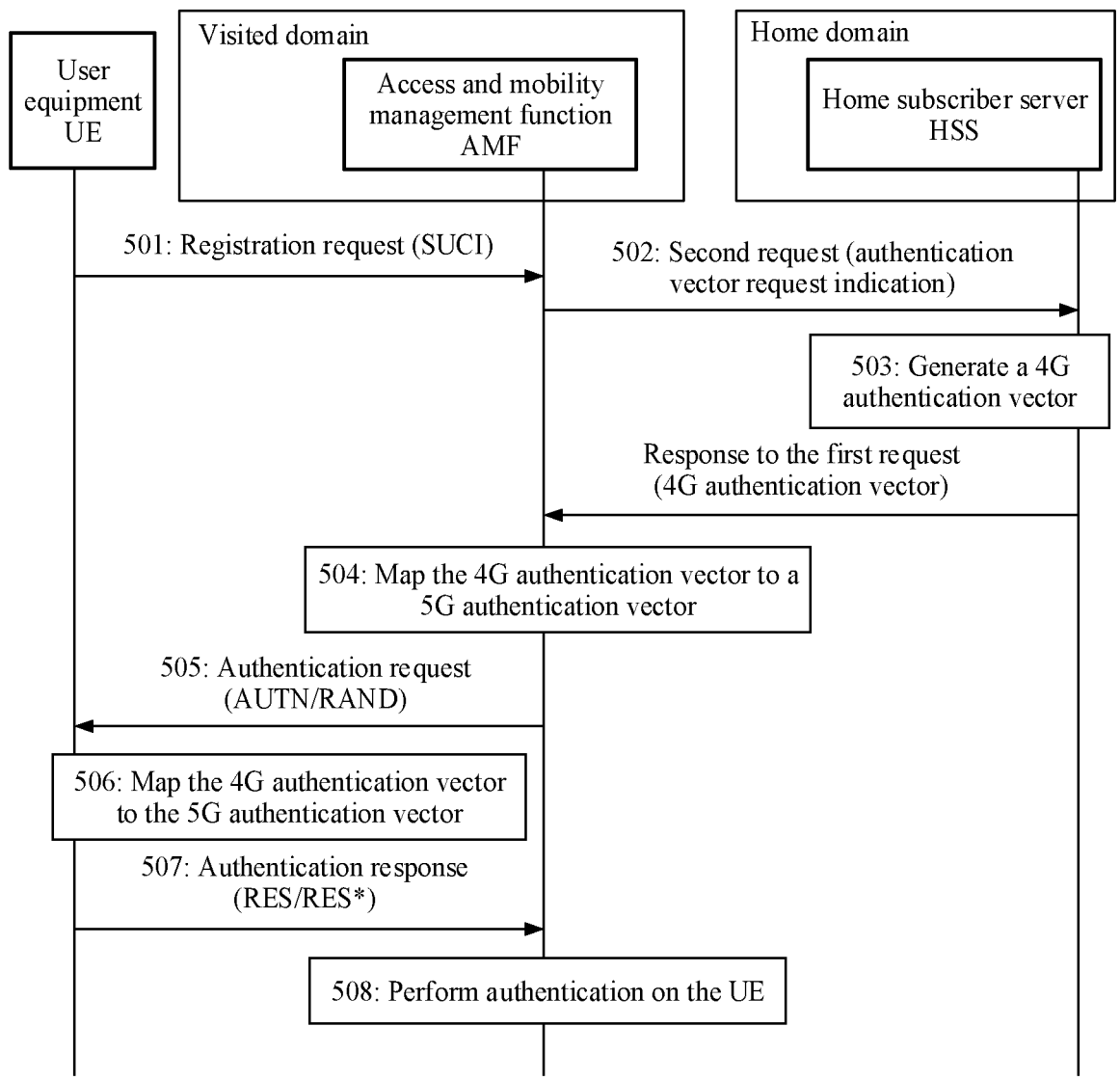
FIG. 5-A

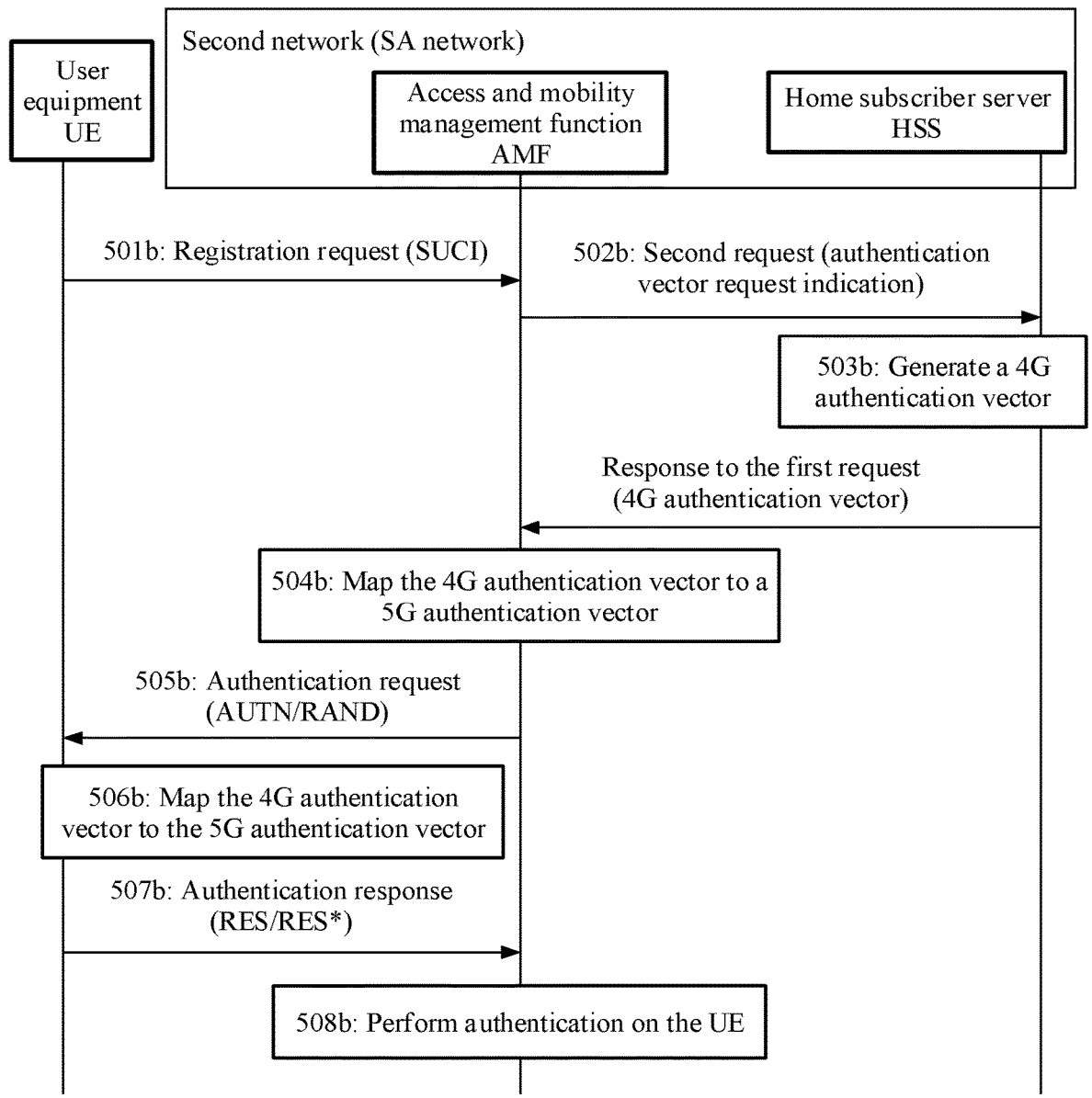
FIG. 5-B

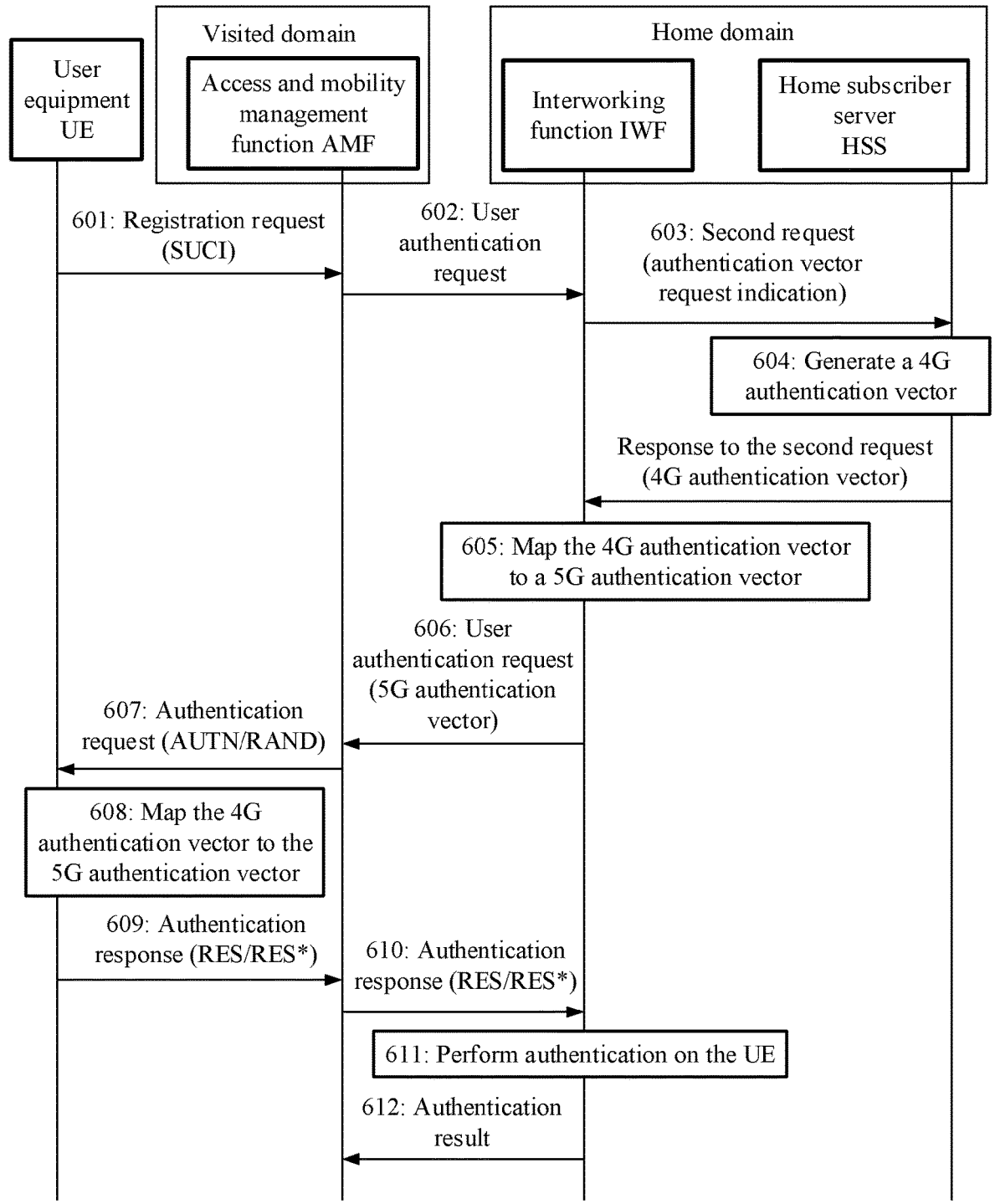
FIG. 6-A

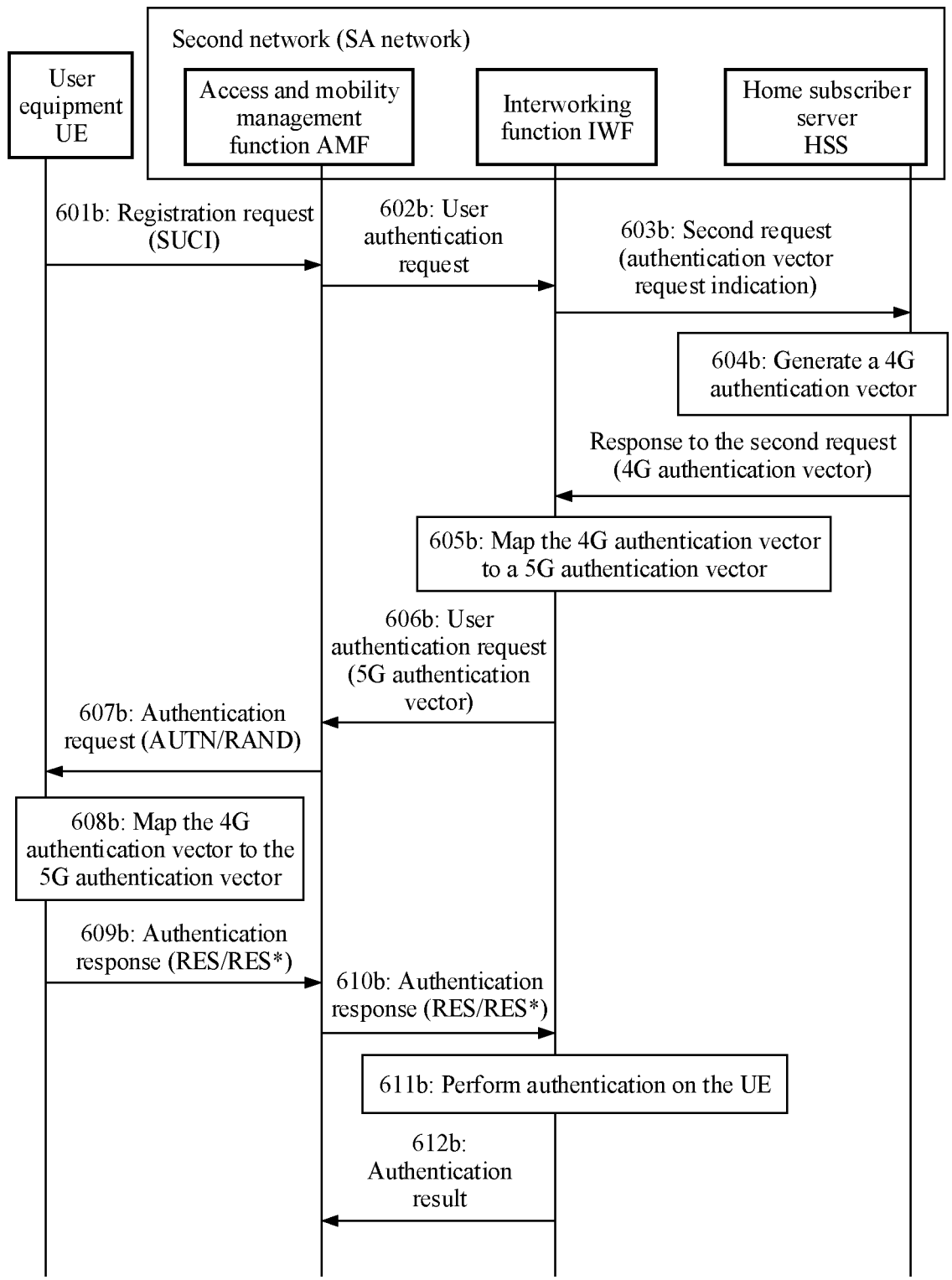
FIG. 6-B

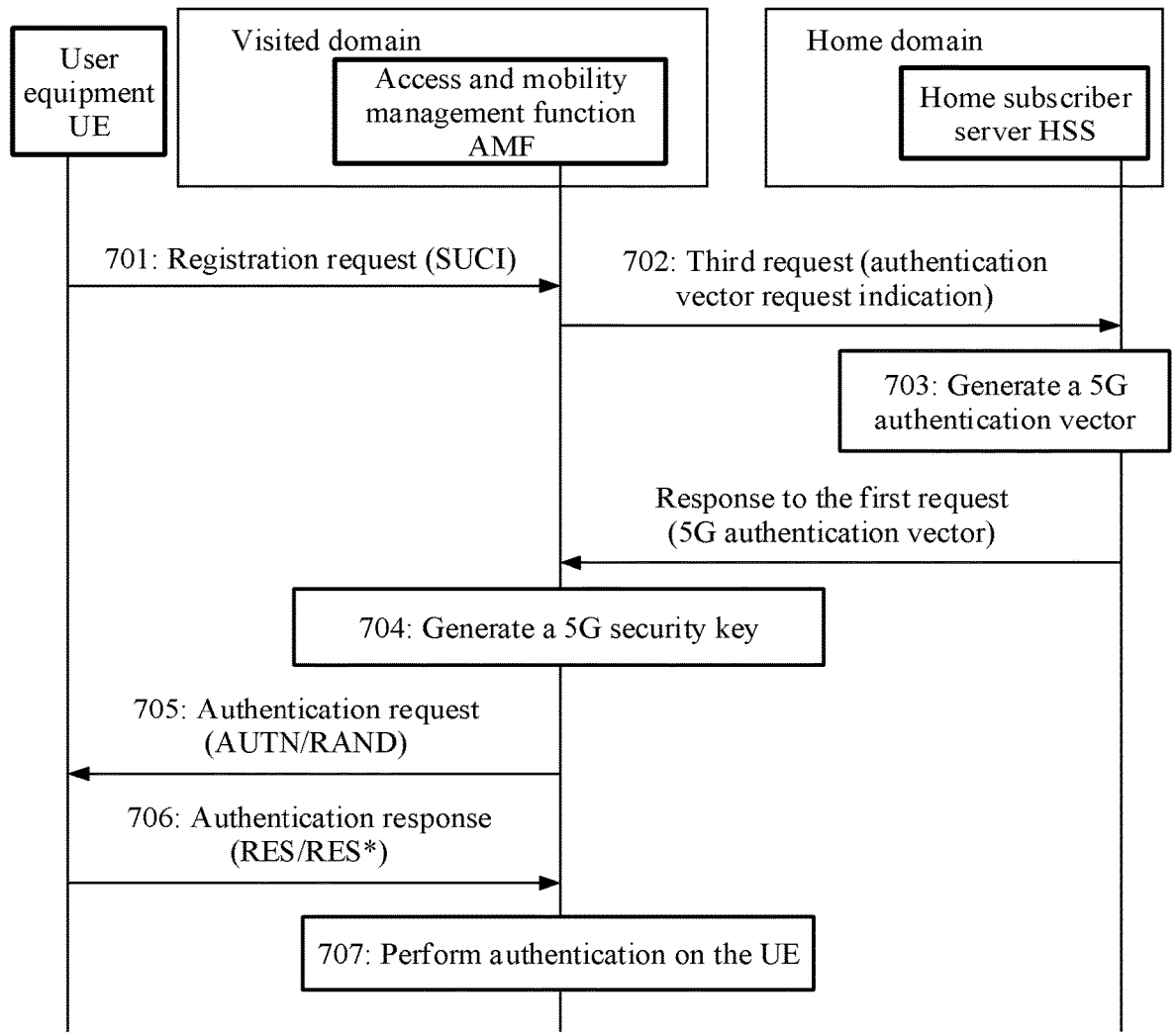
FIG. 7-A

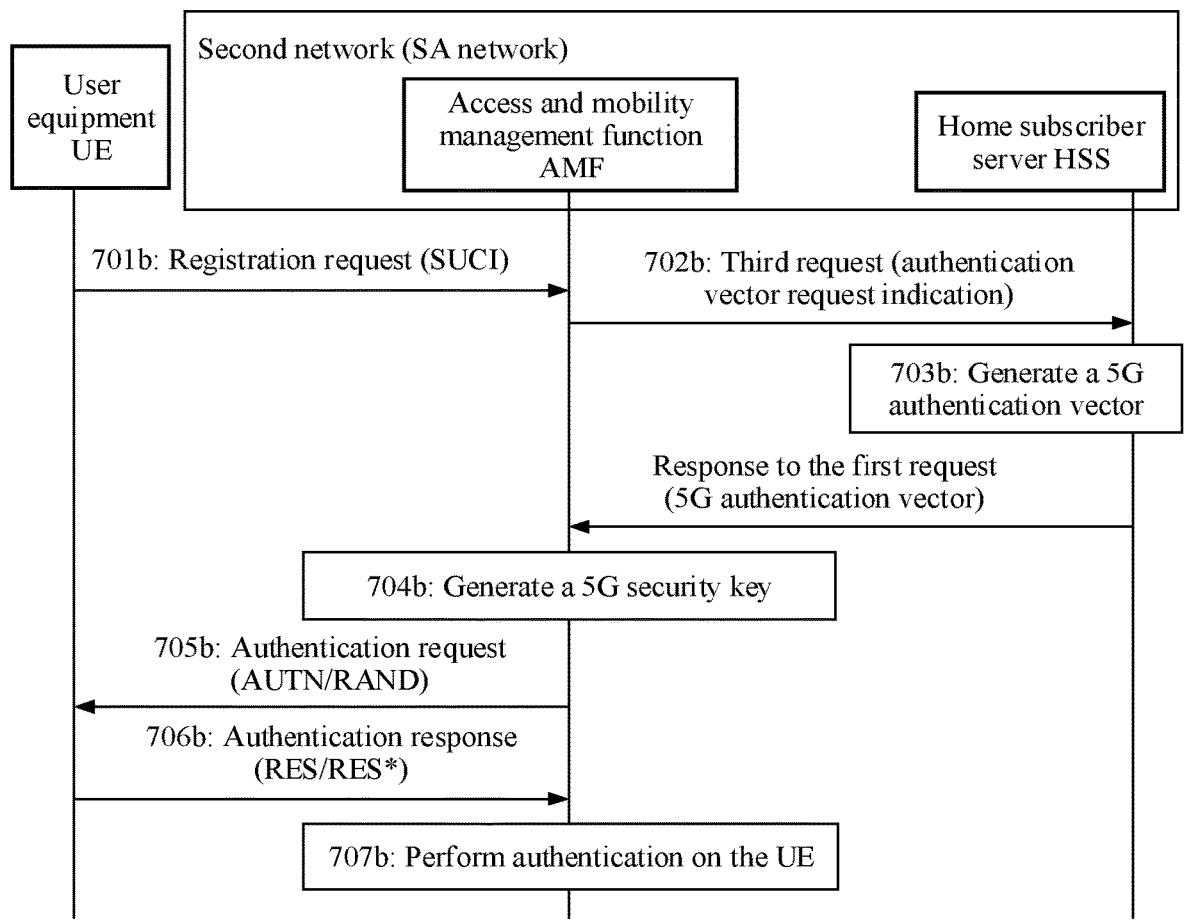
FIG. 7-B

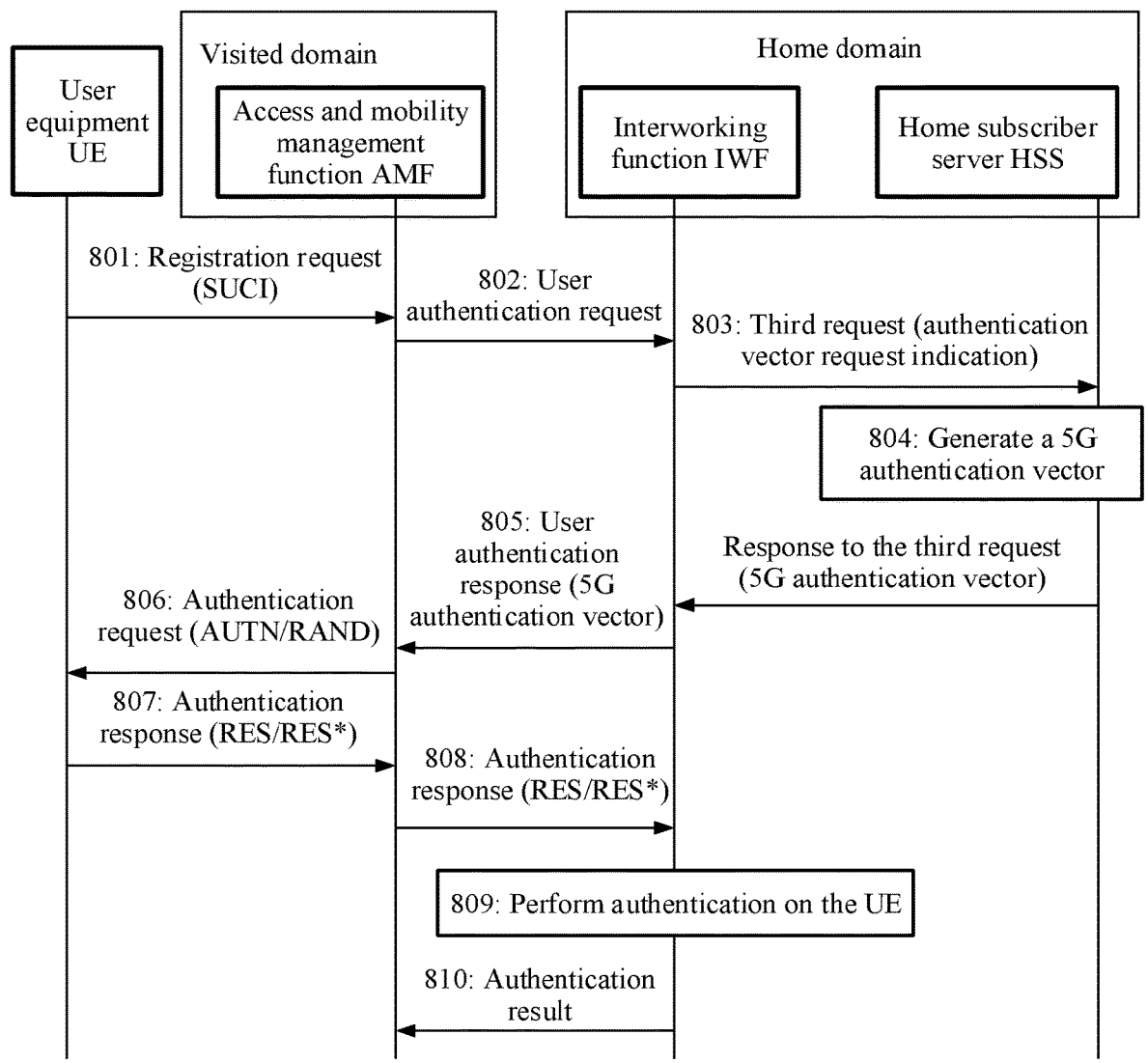
FIG. 8-A

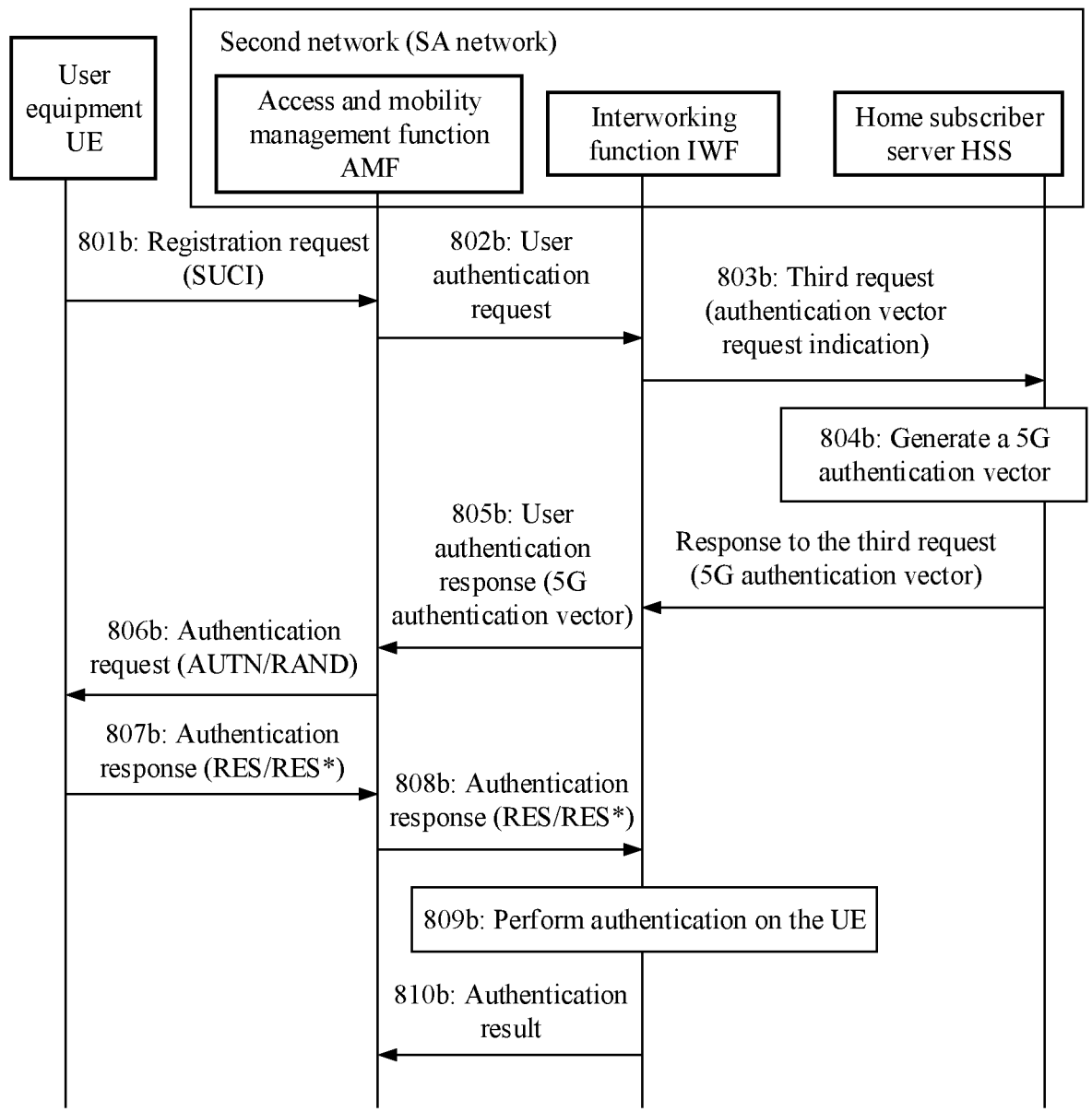
FIG. 8-B

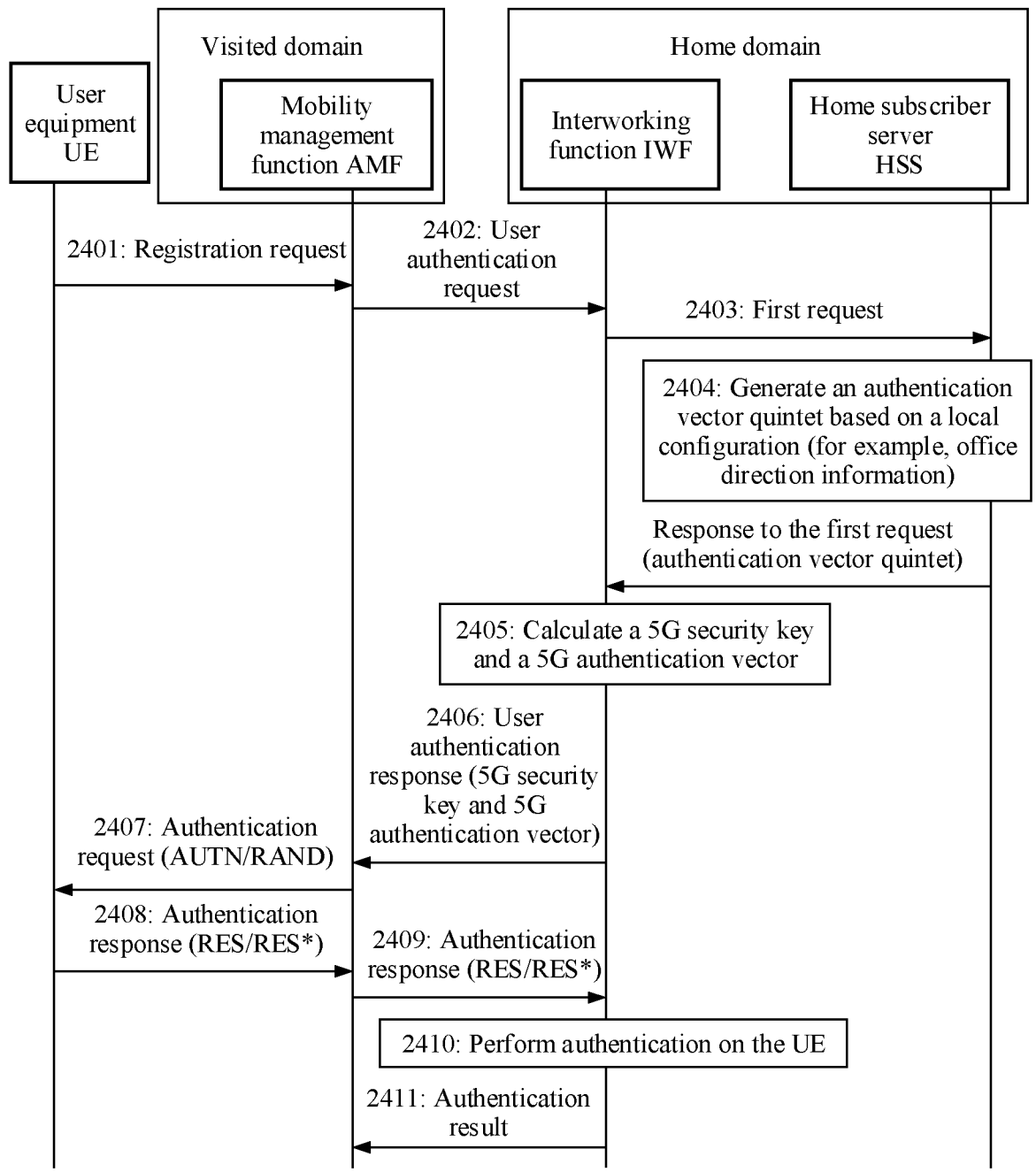
FIG. 24-A

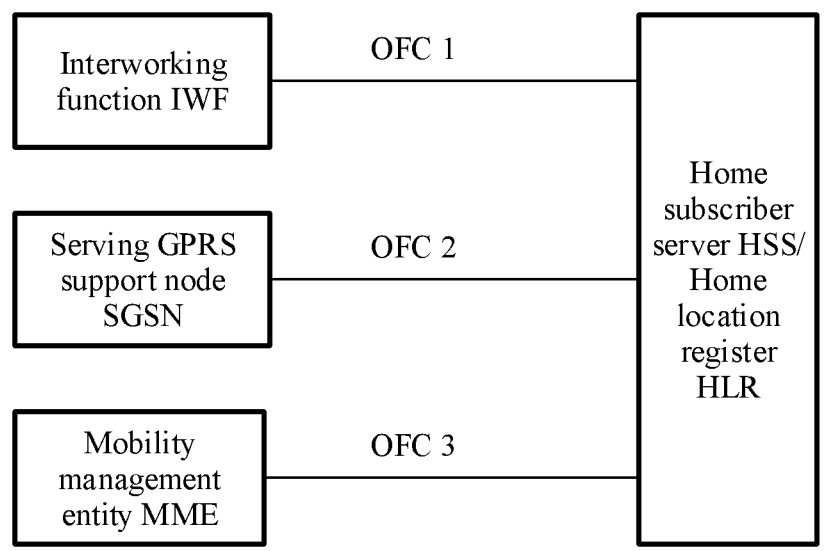
FIG. 24-B

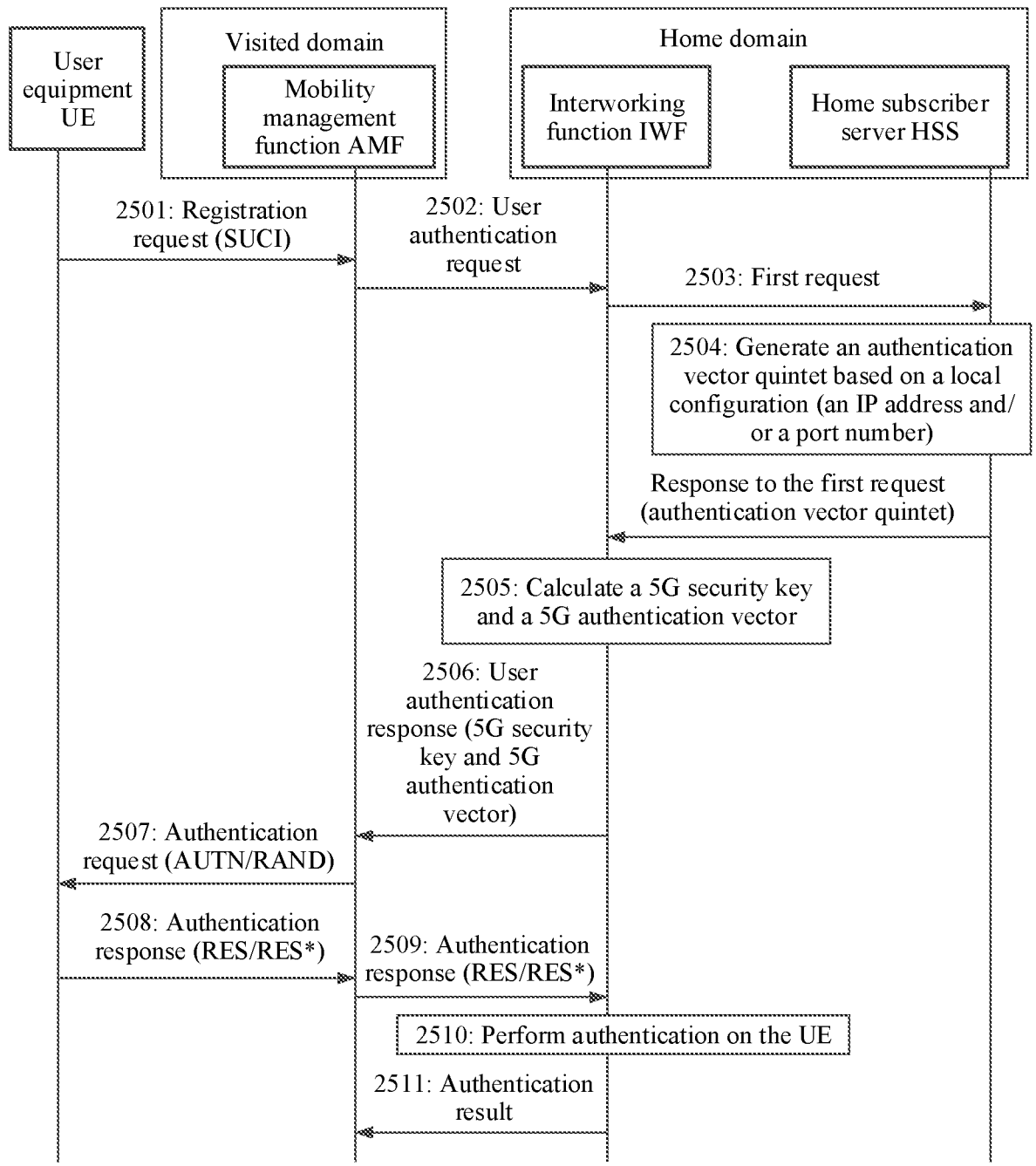
FIG. 25-A

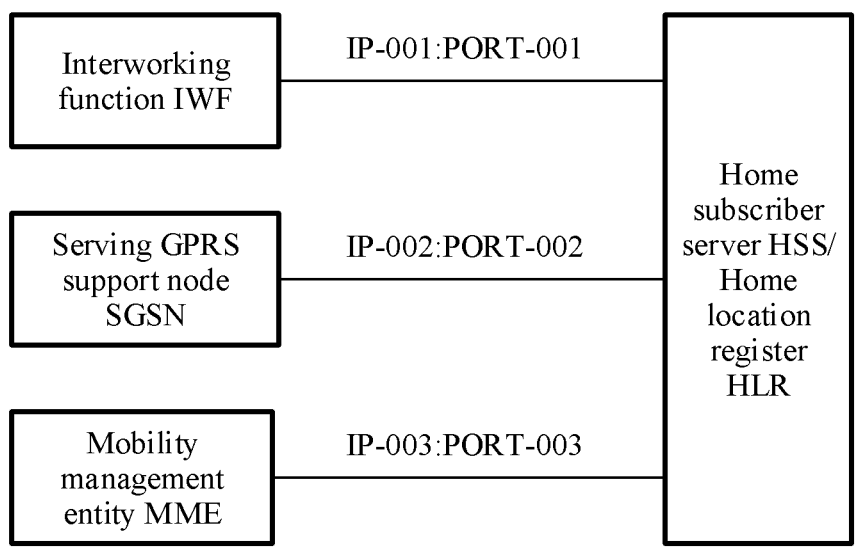
FIG. 25-B

COMMUNICATION METHOD AND COMMUNICATIONS DEVICE

CROSS-REFERENCE TO RELATED APPLICATIONS

This application is a continuation of International Patent Application No. PCT/CN2020/082155, filed on Mar. 30, 2020, which claims priority to Chinese Patent Application No. 201911369774.0, filed on Dec. 26, 2019, Chinese Patent Application No. 201910277715.4, filed on Apr. 8, 2019, and Chinese Patent Application No. 201910254151.2, filed on Mar. 30, 2019. All of the aforementioned patent applications are hereby incorporated by reference in their entireties.

TECHNICAL FIELD

This application relates to the field of communications technologies, and in particular, to a communication method and a communications device.

BACKGROUND

Different operators may consider different deployment modes for network evolution during construction of a 5th generation (5G) network. For example, some operators may deploy a 5G non-standalone (NSA) network, that is, an air interface is first upgraded to a next generation (NG) radio access network (NG-RAN), but a core network still temporarily remains a 3rd generation (3G)/4th generation (4G) network to provide services for user equipments (UEs). However, some operators may deploy a 5G standalone (SA) network, that is, both an air interface and a core network are upgraded to 5G to provide services for UEs.

Therefore, a UE of an operator in the 5G NSA network (a 5G NSA operator for short) may roam to an operator in the 5G SA network (a 5G SA operator for short). In this case, authentication in a process in which the 5G SA operator provides a 5G service for a UE of the 5G NSA operator is an important technical problem to be considered.

SUMMARY

Embodiments of this application provide a communication method and a communications device.

A first aspect of this application provides a communication method, including the following.

When a user equipment (UE) roams from a first network to a second network, a first core network device receives a first request (the first request may be from an access and mobility management function (AMF) of the second network). Alternatively, the first request may be from an interworking function (IWF), an authentication server function (AUSF), or another authentication proxy network element in the first network or the second network.

The first request may be, for example, a user authentication request (e.g., UE authentication request) or an authentication data request (e.g., UE authentication data request). The second network is a 5G standalone network, and the first network is a 5G non-standalone network. The first core network device is a core network device in the first network. The first core network device is, for example, a home subscriber server (HSS), a home location register (HLR), or another network element having a similar function.

The first request may carry an identifier of the UE.

The first request may carry an authentication vector request indication, and the authentication vector request indication may be used to request an authentication vector. Content of the authentication vector request indication may be diverse.

In some possible implementations, the authentication vector request indication includes one or more of the following: an access network type identifier, a requesting node identifier, or an authentication management field modification identifier. An access network type indicated by the access network type identifier is a 5G access network. An authentication management field modification manner indicated by the authentication management field modification identifier is setting a $0^{th}$ bit of an authentication management field in an authentication vector quintet to 1. A node that requests an authentication vector and that is indicated by the requesting node identifier is, for example, one or more of an AMF, an authentication server function (AUSF), a mobility management entity (MME), an interworking function (IWF), an authentication, authorization, and accounting server (AAA-server), a serving General Packet Radio Service (GPRS) support node (SGSN), or an authentication proxy network element.

The first core network device generates the authentication vector quintet based on the authentication vector request indication, where the $0^{th}$ bit of the authentication management field (AMF) in the authentication vector quintet is set to 1. The first core network device sends a response to the first request that carries the authentication vector quintet.

The authentication vector quintet includes a cipher key (CK), an integrity key (IK), a random number (RAND), an authentication token (AUTN), and an expected authentication result (XRES*). The authentication management field is located in the AUTN in the authentication vector quintet (RAND, AUTN, CK, IK, XRES).

It may be understood that the first network is a home network of the user equipment. A home network is also sometimes referred to as a home network or a home domain. The second network is a visited network of the user equipment, and the visited network is sometimes referred to as a visited domain. It may be understood that, in the foregoing technical solution, when the UE roams from the first network to the second network, the first network receives the user authentication request or the authentication data request that carries the authentication vector request indication. The first core network device generates the authentication vector quintet based on the authentication vector request indication, and feeds back, using the response to the first request, the authentication vector quintet in which the $0^{th}$ bit of the authentication management field is set to 1. In this way, the visited network obtains a 5G authentication vector based on the authentication vector quintet provided by the home network, and further performs 5G authentication on the roaming UE using the 5G authentication vector. This helps a 5G SA operator provide a 5G service for UE of a 5G NSA operator that roams to the 5G NSA network.

The first request is the user authentication request or the authentication data request. The first request carries the authentication vector request indication. The authentication vector request indication may be used to request an authentication vector, and content of an authentication vector request may be diverse.

5G authentication includes 5G Authentication and Key Agreement (AKA) authentication, 5G Extensible Authentication Protocol-AKA (EAP-AKA') authentication, and the like.

In some possible implementations, the response to the first request further carries an authentication mode indication, and the authentication mode indication is used to indicate 5G AKA authentication or 5G EAP-AKA' authentication.

For example, the visited network (for example, an AMF of the visited network) may determine a 5G authentication mode for the UE based on the authentication mode indication carried in the response to the first request. For example, when the authentication mode indication indicates 5G AKA authentication, the visited network may perform the 5G AKA authentication on the UE; and when the authentication mode indication indicates 5G EAP-AKA' authentication, the visited network may perform the 5G EAP-AKA' authentication on the UE.

A second aspect of this application provides a first core network device, including: a transceiver unit configured to receive a first request when a user equipment roams from a first network to a second network, where the first request is a user authentication request or an authentication data request, where the first request carries an authentication vector request indication, where the second network is a 5G standalone network, where the first network is a 5G non-standalone network, and where the first core network device is a core network device in the first network; and a processing unit configured to generate an authentication vector quintet based on the authentication vector request indication, where a $0^{th}$ bit of an authentication management field in the authentication vector quintet is set to 1.

The transceiver unit is further configured to send a response to the first request, where the response to the first request carries the authentication vector quintet.

In some possible implementations, the response to the first request further carries an authentication mode indication, and the authentication mode indication is used to indicate 5G AKA authentication or 5G EAP-AKA' authentication.

A third aspect of this application provides a core network device, including a processor and a memory that are coupled to each other. The processor invokes a program stored in the memory, to perform some or all of the steps of any communication method provided in the first aspect, for example, perform some or all of the steps of any communication method performed by the first core network device in the first aspect.

A fourth aspect of this application provides a computer-readable storage medium, where the computer-readable storage medium stores a computer program. The computer program is executed by a processor, to implement some or all of the steps of any communication method provided in the first aspect, for example, to implement some or all of the steps of any communication method performed by the first core network device in the first aspect.

A fifth aspect of this application provides a communication method, including: When a user equipment roams from a first network to a second network, a second core network device sends a first request (for example, the second core network device sends the first request to a first core network device, where the first core network device is a core network device in the first network). The first request is a user authentication request or an authentication data request, the first request carries an authentication vector request indication, the second network is a 5G standalone network, the first network is a 5G non-standalone network, and the second core network device is a core network device in the second network.

The second core network device receives a response to the first request that carries an authentication vector quintet, where a $0^{th}$ bit of an authentication management field in the authentication vector quintet is set to 1. The second core network device generates a 5G authentication vector for the user equipment using the authentication vector quintet.

The second core network device is an AMF of the second network or the like. The first core network device is, for example, an HSS, an HLR, or another similar device in the first network.

In some possible implementations, the authentication vector request indication includes one or more of the following: an access network type identifier, a requesting node identifier, or an authentication management field modification identifier. An access network type indicated by the access network type identifier is a 5G access network, an authentication management field modification manner indicated by the authentication management field modification identifier is setting the $0^{th}$ bit of the authentication management field in the authentication vector quintet to 1, or a node that requests an authentication vector and that is indicated by the requesting node identifier is one or more of the AMF, an AUSF, an MME, an AAA-server, an IWF, an SGSN, or an authentication proxy network element.

In some possible implementations, the response to the first request further carries an authentication mode indication, and the authentication mode indication is used to indicate 5G AKA authentication or 5G EAP-AKA' authentication. When the authentication mode indication indicates 5G AKA authentication, the 5G authentication vector for the user equipment generated by the second core network device is a 5G AKA authentication vector; and when the authentication mode indication indicates 5G EAP-AKA' authentication, the 5G authentication vector for the user equipment generated by the second core network device is a 5G EAP-AKA' authentication vector.

In some possible implementations, the method may further include: The second core network device sends an authentication request to the user equipment. The second core network device receives an authentication response (a response to the authentication request) from the user equipment. When the authentication mode indication indicates 5G AKA authentication, the second core network device performs the 5G AKA authentication on the user equipment. Alternatively, when the authentication mode indication indicates 5G EAP-AKA' authentication, the second core network device performs the 5G EAP-AKA' authentication on the user equipment.

For example, when the authentication response carries RES (an authentication result, response), the second core network device compares XRES (expected authentication result, expected RES) in the 5G EAP-AKA' authentication vector with RES carried in the authentication response. When XRES in the 5G EAP-AKA' authentication vector is consistent with RES carried in the authentication response, it is determined that authentication of the user equipment succeeds. When XRES in the 5G EAP-AKA' authentication vector is inconsistent with RES carried in the authentication response, it is determined that the authentication of the user equipment fails.

For another example, when the authentication response carries RES* (an authentication result, response*), the second core network device compares XRES* (an expected authentication result, expected RES*) in the 5G AKA authentication vector with RES* carried in the authentication response. When XRES* in the 5G AKA authentication vector is consistent with RES* carried in the authentication response, it is determined that authentication of the user equipment succeeds. When XRES* in the 5G AKA authentication vector is inconsistent with RES* carried in the authentication response, it is determined that the authentication of the user equipment fails.

In some possible implementations, the method may further include: The second core network device generates a 5G security key of the user equipment using the authentication vector quintet, where the 5G security key includes, for example, Kseaf and Kausf.

In some possible implementations, the method may further include: The second core network device returns a result of the 5G AKA authentication or 5G EAP-AKA' authentication performed on the user equipment to the first core network device.

It may be understood that, in the foregoing technical solution, when the UE roams from the first network to the second network, the second network sends the user authentication request or the authentication data request (the first request) that carries the authentication vector request indication. The first network may feed back, using the response to the first request, the authentication vector quintet in which the $0^{th}$ bit of the authentication management field is set to 1. The second network (a visited network) may obtain the 5G authentication vector based on the authentication vector quintet provided by a home network, and further perform the 5G authentication on the roaming UE using the 5G authentication vector. This helps a 5G SA operator provide a 5G service for the UE of a 5G NSA operator that roams to the 5G NSA network.

A sixth aspect of this application provides a second core network device, including a transceiver unit and a processing unit.

The transceiver unit is configured to send a first request when a user equipment roams from a first network to a second network, where the first request is a user authentication request or an authentication data request, where the first request carries an authentication vector request indication, where the second network is a 5G standalone network, where the first network is a 5G non-standalone network, and where the second core network device is a core network device in the second network.

The transceiver unit is further configured to receive a response to the first request that carries an authentication vector quintet, where a $0^{th}$ bit of an authentication management field in the authentication vector quintet is set to 1.

The processing unit is configured to generate a 5G authentication vector for the user equipment using the authentication vector quintet.

In some possible implementations, the response to the first request may further carry an authentication mode indication, and the authentication mode indication is used to indicate 5G AKA authentication or 5G EAP-AKA' authentication. When the authentication mode indication indicates 5G AKA authentication, the generated 5G authentication vector for the user equipment is a 5G AKA authentication vector. When the authentication mode indication indicates 5G EAP-AKA' authentication, the generated 5G authentication vector for the user equipment is a 5G EAP-AKA' authentication vector.

In some possible implementations, the transceiver unit is further configured to send an authentication request to the user equipment, and receive an authentication response from the user equipment.

The processing unit is further configured to: when the authentication mode indication indicates 5G EAP-AKA' authentication, perform the 5G EAP-AKA' authentication on the user equipment; and when the authentication mode indication indicates 5G AKA authentication, perform the 5G AKA authentication on the user equipment.

In some possible implementations, the processing unit is further configured to generate a 5G security key of the user equipment using the authentication vector quintet, where the 5G security key includes, for example, Kseaf and Kausf.

In some possible implementations, the processing unit is further configured to return a result of the 5G AKA authentication or 5G EAP-AKA' authentication performed on the user equipment to a first core network device. A seventh aspect of this application provides a core network device, including a processor and a memory that are coupled to each other. The processor invokes a program stored in the memory, to perform some or all of the steps of any communication method provided in the fifth aspect, for example, perform some or all of the steps of any communication method performed by the second core network device in the fifth aspect.

An eighth aspect of this application provides a computer-readable storage medium, where the computer-readable storage medium stores a computer program. The computer program is executed by a processor, to implement some or all of the steps of any communication method provided in the fifth aspect, for example, to implement some or all of the steps of any communication method performed by the second core network device in the fifth aspect.

A ninth aspect of this application provides a communication method, including the following.

When a user equipment roams from a first network to a second network, a third core network device receives a first request from a second core network device, where the first request is a user authentication request or an authentication data request. The second network is a 5G standalone network, the first network is a 5G non-standalone network, and the third core network device is a core network device in the first network or the second network. The second core network device is a core network device in the second network.

The third core network device sends a first request that carries an authentication vector request indication to a first core network device, where the first core network device is a core network device in the first network.

The third core network device receives a response to the first request from the first core network device, where the response to the first request carries an authentication vector quintet, and a $0^{th}$ bit of an authentication management field in the authentication vector quintet is set to 1. The third core network device generates a 5G authentication vector for the user equipment using the authentication vector quintet. The third core network device sends the response (which may carry the 5G authentication vector or the authentication vector quintet) to the first request to the second core network device.

In some possible implementations, the third core network device is, for example, an AUSF, an IWF, or an authentication proxy network element.

The second core network device is, for example, an AMF in the second network. The first core network device is, for example, an HSS, an HLR, or another similar device in the first network.

In some possible implementations, the authentication vector request indication includes one or more of the following: an access network type identifier, a requesting node identifier, or an authentication management field modification identifier. An access network type indicated by the access network type identifier is a 5G access network. An authentication management field modification manner indicated by the authentication management field modification identifier is setting the $0^{th}$ bit of the authentication management field in the authentication vector quintet to 1. A node that requests an authentication vector and that is indicated by the requesting node identifier is one or more of an AMF, an AUSF, an MME, an AAA-server, an IWF, an SGSN, or an authentication proxy network element.

In some possible implementations, the response to the first request further carries an authentication mode indication, and the authentication mode indication is used to indicate 5G AKA authentication or 5G EAP-AKA' authentication. When the authentication mode indication indicates 5G AKA authentication, the 5G authentication vector for the user equipment generated by the third core network device is a 5G AKA authentication vector. When the authentication mode indication indicates 5G EAP-AKA' authentication, the 5G authentication vector for the user equipment generated by the third core network device is a 5G EAP-AKA' authentication vector.

In some possible implementations, the method further includes: The third core network device receives an authentication response from the second core network device. When the authentication mode indication indicates 5G AKA authentication, the third core network device performs the 5G AKA authentication on the user equipment. Alternatively, when the authentication mode indication indicates 5G EAP-AKA' authentication, the third core network device performs the 5G EAP-AKA' authentication on the user equipment.

For example, when the authentication response carries RES, the third core network device compares XRES in the 5G EAP-AKA' authentication vector with RES carried in the authentication response. When XRES in the 5G EAP-AKA' authentication vector is consistent with RES carried in the authentication response, it is determined that authentication of the user equipment succeeds. When XRES in the 5G EAP-AKA' authentication vector is inconsistent with RES carried in the authentication response, it is determined that the authentication of the user equipment fails.

For another example, when the authentication response carries RES*, the third core network device compares XRES* in the 5G AKA authentication vector with RES* carried in the authentication response. When XRES* in the 5G AKA authentication vector is consistent with RES* carried in the authentication response, it is determined that authentication of the user equipment succeeds. When XRES* in the 5G AKA authentication vector is inconsistent with RES* carried in the authentication response, it is determined that the authentication of the user equipment fails.

In some possible implementations, the method further includes: The third core network device generates a 5G security key of the user equipment using the authentication vector quintet, where the 5G security key includes, for example, a security anchor function (SEAF) key (Kseaf) and AUSF key (Kausf). It may be understood that, in the foregoing technical solution, when the UE roams from the first network to the second network, the second network sends the user authentication request or the authentication data request. The third core network device sends, to the first core network device in the first network, the user authentication request or the authentication data request that carries the authentication vector request indication. The first network may feed back, using the response to the first request, the authentication vector quintet in which the $0^{th}$ bit of the authentication management field is set to 1. The third core network device may obtain the 5G authentication vector based on the authentication vector quintet provided by the home network, and further perform the 5G authentication on the roaming UE using the 5G authentication vector. This helps a 5G SA operator provide a 5G service for the UE of a 5G NSA operator that roams to the 5G NSA network.

A tenth aspect of this application provides a third core network device, including a transceiver unit and a processing unit.

The transceiver unit is configured to receive a first request from a second core network device when a user equipment roams from a first network to a second network, where the first request is a user authentication request or an authentication data request, where the second network is a 5G standalone network, where the first network is a 5G non-standalone network, where the third core network device is a core network device in the first network or the second network, and where the second core network device is a core network device in the second network.

The transceiver unit is further configured to send a first request that carries an authentication vector request indication to a first core network device, where the first core network device is a core network device in the first network.

The transceiver unit is further configured to receive a response to the first request from the first core network device, where the response to the first request carries an authentication vector quintet, and a $0^{th}$ bit of an authentication management field in the authentication vector quintet is set to 1.

The processing unit is configured to generate a 5G authentication vector for the user equipment using the authentication vector quintet.

The transceiver unit is further configured to send the response (which may carry the 5G authentication vector or the authentication vector quintet) to the first request to the second core network device.

In some possible implementations, the response to the first request may further carry an authentication mode indication, and the authentication mode indication is used to indicate 5G AKA authentication or 5G EAP-AKA' authentication. When the authentication mode indication indicates 5G EAP-AKA' authentication, the generated 5G authentication vector for the user equipment is a 5G EAP-AKA' authentication vector. When the authentication mode indication indicates 5G AKA authentication, the generated 5G authentication vector for the user equipment is a 5G AKA authentication vector.

In some possible implementations, the transceiver unit may be further configured to receive an authentication response from the second core network device. The authentication response is, for example, a response to the authentication request sent by the second core network device to the UE.

The processing unit is further configured to: when the authentication mode indication indicates 5G AKA authentication, perform the 5G AKA authentication on the user equipment. Alternatively, when the authentication mode indication indicates 5G EAP-AKA' authentication, perform the 5G EAP-AKA' authentication on the user equipment.

In some possible implementations, the processing unit is further configured to generate a 5G security key of the user equipment using the authentication vector quintet, where the 5G security key includes, for example, Kseaf and Kausf.

An eleventh aspect of this application provides a core network device, including a processor and a memory that are coupled to each other. The processor invokes a program stored in the memory, to perform some or all of the steps of any communication method provided in the ninth aspect, for example, perform some or all of the steps of any communication method performed by the third core network device in the ninth aspect.

A twelfth aspect of this application provides a computer-readable storage medium, where the computer-readable storage medium stores a computer program. The computer program is executed by a processor, to implement some or all of the steps of any communication method provided in the ninth aspect, for example, to implement some or all of the steps of any communication method performed by the third core network device in the ninth aspect.

A thirteenth aspect of this application provides a communication method, including the following.

When a user equipment roams from a first network to a second network, a first core network device receives a second request, where the second request is a user authentication request or an authentication data request. The second network is a 5G standalone network, the first network is a 5G non-standalone network, and the first core network device is a core network device in the first network. The second request carries an authentication vector request indication, or the second request is received through an S6a interface or an SWx interface.

The first core network device determines, based on the authentication vector request indication, that a 4G authentication vector for the user equipment is a 4G AKA authentication vector or a 4G EAP-AKA' authentication vector. The first core network device determines, based on an interface through which the second request is received, that the 4G authentication vector for the user equipment is a 4G AKA authentication vector or a 4G EAP-AKA' authentication vector.

The first core network device sends a response to the second request that carries the determined 4G authentication vector.

The 4G authentication vector is used to generate a 5G authentication vector for the user equipment, and the 5G authentication vector is, for example, a 5G EAP-AKA' authentication vector or a 5G AKA authentication vector. The 4G authentication vector is, for example, the 4G EAP-AKA' authentication vector or the 4G AKA authentication vector.

The first request may carry an authentication vector request indication, and the authentication vector request indication may be used to request an authentication vector. Content of the authentication vector request indication may be diverse.

In some possible implementations, the authentication vector request indication includes one or more of the following: an access network type identifier or a requesting node identifier. An access network type indicated by the access network type identifier is a 5G access network. A node that requests an authentication vector and that is indicated by the requesting node identifier is one or more of an AMF, an AUSF, an MME, an AAA-server, an IWF, an SGSN, or an authentication proxy network element.

For example, if the authentication vector request indication indicates that the access network type is the 5G access network or the node that requests an authentication vector is the AMF, the AUSF, the IWF, or the authentication proxy, the first core network device may determine, according to a local policy, that the 4G authentication vector for the user equipment is the 4G AKA authentication vector or the 4G EAP-AKA' authentication vector.

If the authentication vector request indication indicates that the node that requests an authentication vector is the MME, the first core network device may, for example, determine that the 4G authentication vector for the user equipment is the 4G AKA authentication vector.

If the authentication vector request indication indicates that the node that requests an authentication vector is the AAA-server, the first core network device may, for example, determine that the 4G authentication vector for the user equipment is the 4G EAP-AKA' authentication vector.

If the first core network device receives the second request from the S6a interface, the first core network device may, for example, determine that the 4G authentication vector for the user equipment is the 4G AKA authentication vector.

If the first core network device receives the second request from the SWx interface, the first core network device may, for example, determine that the 4G authentication vector for the user equipment is the 4G EAP-AKA' authentication vector.

Certainly, a manner in which the first core network device determines, based on the authentication vector request indication, that the 4G authentication vector for the user equipment is the 4G AKA authentication vector or the 4G EAP-AKA' authentication vector is not limited to the foregoing example manners.

In some possible implementations, the response to the second request further carries an authentication vector generation indication. The authentication vector generation indication is used to indicate the user equipment to generate the 4G EAP-AKA' authentication vector or the 4G AKA authentication vector.

In some possible implementations, the response to the second request further carries an authentication vector mapping indication, and the authentication vector mapping indication indicates to map the 4G AKA authentication vector to a 5G AKA authentication vector. Alternatively, the authentication vector mapping indication indicates to map the 4G EAP-AKA' authentication vector to a 5G EAP-AKA' authentication vector.

It may be understood that, in the foregoing technical solution, when the UE roams from the first network to the second network, the first network receives the user authentication request or the authentication data request that carries the authentication vector request indication. Alternatively, the user authentication request or the authentication data request is received through the S6a interface or the SWx interface. The first core network device determines the 4G authentication vector based on the authentication vector request indication or an interface through which a message is received, and feeds back the determined 4G authentication vector using the response to the second request. In this way, a visited network can obtain the 5G authentication vector based on the 4G authentication vector provided by a home network, and further perform 5G authentication on the roaming UE using obtain the 5G authentication vector. Alternatively, the visited network may directly perform 4G authentication on the UE using the 4G authentication vector. This helps a 5G SA operator provide a 5G service for UE of a 5G NSA operator that roams to the 5G NSA network.

A fourteenth aspect of this application provides a first core network device, including: a transceiver unit configured to receive a second request when a user equipment roams from a first network to a second network, where the second request is a user authentication request or an authentication data request, where the second network is a 5G standalone network, where the first network is a 5G non-standalone network, where the first core network device is a core network device in the first network, and where the second request carries an authentication vector request indication, or where the second request is received through an S6a interface or an SWx interface; and a processing unit configured to: determine, based on the authentication vector request indication, that a 4G authentication vector for the user equipment is a 4G AKA authentication vector or a 4G EAP-AKA' authentication vector; or determine, based on an interface through which the second request is received, that the 4G authentication vector for the user equipment is a 4G AKA authentication vector or a 4G EAP-AKA' authentication vector.

The transceiver unit is configured to send a response to the second request that carries the 4G authentication vector.

The 4G authentication vector is used to generate a 5G authentication vector for the user equipment, and the 5G authentication vector is, for example, a 5G EAP-AKA' authentication vector or a 5G AKA authentication vector.

In some possible implementations, the authentication vector request indication includes one or more of the following: an access network type identifier or a requesting node identifier. An access network type indicated by the access network type identifier is a 5G access network. A node that requests an authentication vector and that is indicated by the requesting node identifier is one or more of an AMF, an AUSF, an MME, an AAA-server, an IWF, an SGSN, or an authentication proxy network element.

For example, if the authentication vector request indication indicates that the access network type is the 5G access network or the node that requests the authentication vector is the AMF, the AUSF, the IWF, or the authentication proxy, the processing unit may determine, according to a local policy, that the 4G authentication vector for the user equipment is the 4G AKA authentication vector or the 4G EAP-AKA' authentication vector.

If the authentication vector request indication indicates that the node that requests an authentication vector is the MME, the processing unit may, for example, determine that the 4G authentication vector for the user equipment is the 4G AKA authentication vector.

If the authentication vector request indication indicates that the node that requests an authentication vector is the AAA-server, the processing unit may, for example, determine that the 4G authentication vector for the user equipment is the 4G EAP-AKA' authentication vector.

If the first core network device receives the second request from the S6a interface, the processing unit may, for example, determine that the 4G authentication vector for the user equipment is the 4G AKA authentication vector.

If the first core network device receives the second request from the SWx interface, the processing unit may, for example, determine that the 4G authentication vector for the user equipment is the 4G EAP-AKA authentication vector.

Certainly, a manner in which the processing unit determines, based on the authentication vector request indication, that the 4G authentication vector for the user equipment is the 4G AKA authentication vector or the 4G EAP-AKA' authentication vector is not limited to the foregoing example manners.

In some possible implementations, the response to the second request further carries an authentication vector generation indication. The authentication vector generation indication is used to indicate the user equipment to generate the 4G EAP-AKA' authentication vector or the 4G AKA authentication vector.

In some possible implementations, the response to the second request further carries an authentication vector mapping indication, and the authentication vector mapping indication indicates to map the 4G AKA authentication vector to a 5G AKA authentication vector, or the authentication vector mapping indication indicates to map the 4G EAP-AKA' authentication vector to a 5G EAP-AKA' authentication vector.

A fifteenth aspect of this application provides a core network device, including a processor and a memory that are coupled to each other. The processor invokes a program stored in the memory, to perform some or all of the steps of any communication method provided in the thirteenth aspect, for example, perform some or all of the steps of any communication method performed by the first core network device in the thirteenth aspect.

A sixteenth aspect of this application provides a computer-readable storage medium, where the computer-readable storage medium stores a computer program. The computer program is executed by a processor, to implement some or all of the steps of any communication method provided in the thirteenth aspect, for example, to implement some or all of the steps of any communication method performed by the first core network device in the thirteenth aspect.

A seventeenth aspect of this application provides a communication method, including the following.

When a user equipment roams from a first network to a second network, a second core network device sends a second request (for example, the second core network device sends the second request to a first core network device, where the first core network device is a core network device in the first network). The second request is a user authentication request or an authentication data request, the second network is a 5G standalone network, the first network is a 5G non-standalone network, and the second core network device is a core network device in the second network. The second request carries an authentication vector request indication, or the second request is sent through an S6a interface or an SWx interface.

The second core network device receives a response to the second request that carries a 4G authentication vector.

The second core network device is, for example, an AMF in the second network. The first core network device is, for example, an HSS, an HLR, or another similar device in the first network.

The 4G authentication vector is used to generate a 5G authentication vector for the user equipment, and the 5G authentication vector is a 5G EAP-AKA' authentication vector or a 5G AKA authentication vector. The 4G authentication vector is a 4G EAP-AKA' authentication vector or a 4G AKA authentication vector.

In some possible implementations, the authentication vector request indication includes one or more of an access network type identifier or a requesting node identifier. An access network type indicated by the access network type identifier is a 5G access network. A node that requests an authentication vector and that is indicated by the requesting node identifier is one or more of an AMF, an AUSF, an MME, an AAA-server, an IWF, an SGSN, or an authentication proxy network element.

In some possible implementations, the response to the second request further carries an authentication vector generation indication, where the authentication vector generation indication is used to indicate the user equipment to generate the 4G EAP-AKA' authentication vector or the 4G AKA authentication vector.

In some possible implementations, the response to the second request further carries an authentication vector mapping indication, and the authentication vector mapping indication indicates to map the 4G AKA authentication vector to a 5G AKA authentication vector, or the authentication vector mapping indication indicates to map the 4G EAP-AKA' authentication vector to a 5G EAP-AKA' authentication vector.

In some possible implementations, the method further includes: When the authentication vector mapping indication indicates to map the 4G AKA authentication vector to the 5G AKA authentication vector, the second core network device maps the 4G authentication vector carried in the response to the second request to the 5G AKA authentication vector; or when the authentication vector mapping indication indicates to map the 4G EAP-AKA' authentication vector to the 5G EAP-AKA' authentication vector, the second core network device maps the 4G authentication vector carried in the response to the second request to the 5G EAP-AKA' authentication vector.

In some possible implementations, the method further includes: The second core network device determines, according to a local policy, to perform 5G AKA authentication, 5G EAP-AKA' authentication, 4G AKA authentication, or 4G EAP-AKA' authentication on the user equipment.

In some possible implementations, the method further includes: The second core network device sends an authentication request to the user equipment. For example, the authentication request carries the authentication vector generation indication and/or the authentication vector mapping indication. The second core network device receives an authentication response from the user equipment.

When the second core network device determines, according to the local policy, to perform the 5G AKA authentication on the user equipment, the second core network device performs the 5G AKA authentication on the user equipment.

Alternatively, when the second core network device determines, according to the local policy, to perform the 5G EAP-AKA' authentication on the user equipment, the second core network device performs the 5G EAP-AKA' authentication on the user equipment.

Alternatively, when the second core network device determines, according to the local policy, to perform the 4G AKA authentication on the user equipment, the second core network device performs the 4G AKA authentication on the user equipment.

Alternatively, when the second core network device determines, according to the local policy, to perform the 4G EAP-AKA' authentication on the user equipment, the second core network device performs the 4G EAP-AKA' authentication on the user equipment.

In some possible implementations, the method further includes: The second core network device generates a 5G security key of the user equipment using the 4G authentication vector, where the 5G security key may include Kseaf and Kausf.

In some possible implementations, the method may further include: The second core network device returns a result of the 4G AKA authentication, 4G EAP-AKA' authentication, 5G AKA authentication, or 5G EAP-AKA' authentication performed on the user equipment to the first core network device.

It may be understood that, in the foregoing technical solution, when the UE roams from the first network to the second network, the second network may send the user authentication request or the authentication data request that carries the authentication vector request indication. Alternatively, the user authentication request or the authentication data request (the second request) is sent through the S6a interface or the SWx interface, and the first network may feed back the 4G authentication vector using the response to the second request. The second network (a visited network) may obtain the 5G authentication vector based on the 4G authentication vector quintet provided by a home network, and may further perform 5G authentication on the roaming UE using the 5G authentication vector, or the visited network may directly perform 4G authentication on the UE using the 4G authentication vector. This helps a 5G SA operator provide a 5G service for UE of a 5G NSA operator that roams to the 5G NSA network.

An eighteenth aspect of this application provides a second core network device, including: a sending unit configured to send a second request when a user equipment roams from a first network to a second network, where the second request is a user authentication request or an authentication data request, where the second network is a 5G standalone network, where the first network is a 5G non-standalone network, where the second core network device is a core network device in the second network, and where the second request carries an authentication vector request indication, or where the second request is sent through an S6a interface or an SWx interface; and a receiving unit configured to receive a response to the second request that carries a 4G authentication vector.

The 4G authentication vector is used to generate a 5G authentication vector for the user equipment, and the 5G authentication vector is a 5G EAP-AKA' authentication vector or a 5G AKA authentication vector. The 4G authentication vector is a 4G EAP-AKA' authentication vector or a 4G AKA authentication vector.

In some possible implementations, the authentication vector request indication includes one or more of an access network type identifier or a requesting node identifier. An access network type indicated by the access network type identifier is a 5G access network. A node that requests an authentication vector and that is indicated by the requesting node identifier is one or more of an AMF, an AUSF, an MME, an AAA-server, an IWF, an SGSN, or an authentication proxy network element.

In some possible implementations, the response to the second request further carries an authentication vector generation indication, where the authentication vector generation indication is used to indicate the user equipment to generate the 4G EAP-AKA' authentication vector or the 4G AKA authentication vector.

In some possible implementations, the response to the second request further carries an authentication vector mapping indication, and the authentication vector mapping indication indicates to map the 4G AKA authentication vector to a 5G AKA authentication vector, or the authentication vector mapping indication indicates to map the 4G EAP-AKA' authentication vector to a 5G EAP-AKA' authentication vector.

In some possible implementations, the second core network device further includes a processing unit configured to: when the authentication vector mapping indication indicates to map the 4G AKA authentication vector to the 5G AKA authentication vector, map the 4G authentication vector carried in the response to the second request to the 5G AKA authentication vector; or when the authentication vector mapping indication indicates to map the 4G EAP-AKA' authentication vector to the 5G EAP-AKA' authentication vector, map the 4G authentication vector carried in the response to the second request to the 5G EAP-AKA' authentication vector.

In some possible implementations, the processing unit is further configured to determine, according to a local policy, to perform 5G AKA authentication, 5G EAP-AKA' authentication, 4G AKA authentication, or 4G EAP-AKA' authentication on the user equipment.

In some possible implementations, the sending unit is further configured to send an authentication request to the user equipment. For example, the authentication request carries the authentication vector generation indication and/or the authentication vector mapping indication.

The receiving unit is further configured to receive an authentication response from the user equipment.

The processing unit is further configured to: when it is determined, according to the local policy, to perform the 5G AKA authentication on the user equipment, perform the 5G AKA authentication on the user equipment; or when it is determined, according to the local policy, to perform the 5G EAP-AKA' authentication on the user equipment, perform the 5G EAP-AKA' authentication on the user equipment; or when it is determined, according to the local policy, to perform the 4G AKA authentication on the user equipment, perform the 4G AKA authentication on the user equipment; or when it is determined, according to the local policy, to perform the 4G EAP-AKA' authentication on the user equipment, perform the 4G EAP-AKA' authentication on the user equipment.

In some possible implementations, the processing unit is further configured to generate a 5G security key of the user equipment using the 4G authentication vector, where the 5G security key may include Kseaf and Kausf.

A nineteenth aspect of this application provides a core network device, including a processor and a memory that are coupled to each other. The processor invokes a program stored in the memory, to perform some or all of the steps of any communication method provided in the seventeenth aspect, for example, perform some or all of the steps of any communication method performed by the second core network device in the seventeenth aspect.

A twentieth aspect of this application provides a computer-readable storage medium, where the computer-readable storage medium stores a computer program. The computer program is executed by a processor, to implement some or all of the steps of any communication method provided in the seventeenth aspect, for example, to implement some or all of the steps of any communication method performed by the second core network device in the seventeenth aspect.

A twenty-first aspect of this application provides a communication method, including the following.

When a user equipment roams from a first network to a second network, a third core network device receives a first request from a second core network device, where the first request is a user authentication request or an authentication data request, the second network is a 5G standalone network, the first network is a 5G non-standalone network, the third core network device is a core network device in the first network or the second network, and the second core network device is a core network device in the second network.

The third core network device sends a second request to a first core network device through an S6a interface or an SWx interface, or the third core network device adds an authentication vector request indication to the second request; and the third core network device sends the second request that carries the authentication vector request indication to the first core network device, where the first core network device is a core network device in the first network.

The third core network device receives a response to the second request that carries a 4G authentication vector. The third core network device sends the response to the second request to the second core network device.

The 4G authentication vector is used to generate a 5G authentication vector for the user equipment, and the 5G authentication vector is a 5G EAP-AKA' authentication vector or a 5G AKA authentication vector. The 4G authentication vector is a 4G EAP-AKA' authentication vector or a 4G AKA authentication vector.

In some possible implementations, the authentication vector request indication includes one or more of an access network type identifier or a requesting node identifier. An access network type indicated by the access network type identifier is a 5G access network. A node that requests an authentication vector and that is indicated by the requesting node identifier is one or more of an AMF, an AUSF, an MME, an AAA-server, an IWF, an SGSN, or an authentication proxy network element.

In some possible implementations, the response to the second request further carries an authentication vector generation indication, where the authentication vector generation indication is used to indicate the user equipment to generate the 4G EAP-AKA' authentication vector or the 4G AKA authentication vector.

In some possible implementations, the response to the second request further carries an authentication vector mapping indication, and the authentication vector mapping indication indicates to map the 4G AKA authentication vector to the 5G AKA authentication vector, or the authentication vector mapping indication indicates to map the 4G EAP-AKA' authentication vector to the 5G EAP-AKA' authentication vector.

In some possible implementations, the method further includes: When the authentication vector mapping indication indicates to map the 4G AKA authentication vector to the 5G AKA authentication vector, the second core network device maps the 4G authentication vector carried in the response to the second request to the 5G AKA authentication vector; or when the authentication vector mapping indication indicates to map the 4G EAP-AKA' authentication vector to the 5G EAP-AKA' authentication vector, the second core network device maps the 4G authentication vector carried in the response to the second request to the 5G EAP-AKA' authentication vector.

In some possible implementations, the method further includes: The third core network device determines, according to a local policy, to perform 5G AKA authentication, 5G EAP-AKA' authentication, 4G AKA authentication, or 4G EAP-AKA' authentication on the user equipment.

In some possible implementations, the method further includes: The third core network device receives an authentication response from the second core network device. When the third core network device determines, according to the local policy, to perform the 5G AKA authentication on the user equipment, the third core network device performs the 5G AKA authentication on the user equipment.

Alternatively, when the third core network device determines, according to the local policy, to perform the 5G EAP-AKA' authentication on the user equipment, the third core network device performs the 5G EAP-AKA' authentication on the user equipment.

Alternatively, when the third core network device determines, according to the local policy, to perform the 4G AKA authentication on the user equipment, the third core network device performs the 4G AKA authentication on the user equipment.

Alternatively, when the third core network device determines, according to the local policy, to perform the 4G EAP-AKA' authentication on the user equipment, the third core network device performs the 4G EAP-AKA' authentication on the user equipment.

In some possible implementations, the method further includes: The second core network device generates a 5G security key of the user equipment using the 4G authentication vector, where the 5G security key includes Kseaf and Kausf.

In some possible implementations, the third core network device is the AUSF, the IWF, or the authentication proxy network element.

A twenty-second aspect of this application provides a third core network device, including: a transceiver unit configured to receive a first request from a second core network device when a user equipment roams from a first network to a second network, where the first request is a user authentication request or an authentication data request, where the second network is a 5G standalone network, where the first network is a 5G non-standalone network, where the third core network device is a core network device in the first network or the second network, and where the second core network device is a core network device in the second network.

The transceiver unit is further configured to: send a second request to a first core network device through an S6a interface or an SWx interface; add an authentication vector request indication to the second request; or send the second request that carries the authentication vector request indication to the first core network device, where the first core network device is a core network device in the first network.

The transceiver unit is further configured to: receive a response to the second request that carries a 4G authentication vector; and send the response to the second request to the second core network device.

The 4G authentication vector is used to generate a 5G authentication vector for the user equipment, and the 5G authentication vector is a 5G EAP-AKA' authentication vector or a 5G AKA authentication vector. The 4G authentication vector is a 4G EAP-AKA' authentication vector or a 4G AKA authentication vector.

In some possible implementations, the authentication vector request indication includes one or more of an access network type identifier or a requesting node identifier. An access network type indicated by the access network type identifier is a 5G access network. A node that requests an authentication vector and that is indicated by the requesting node identifier is one or more of an AMF, an AUSF, an MME, an AAA-server, an IWF, an SGSN, or an authentication proxy network element.

In some possible implementations, the response to the second request further carries an authentication vector generation indication, where the authentication vector generation indication is used to indicate the user equipment to generate the 4G EAP-AKA' authentication vector or the 4G AKA authentication vector.

In some possible implementations, the response to the second request further carries an authentication vector mapping indication, and the authentication vector mapping indication indicates to map the 4G AKA authentication vector to the 5G AKA authentication vector, or the authentication vector mapping indication indicates to map the 4G EAP-AKA' authentication vector to the 5G EAP-AKA' authentication vector.

In some possible implementations, the third core network device further includes a processing unit configured to: when the authentication vector mapping indication indicates to map the 4G AKA authentication vector to the 5G AKA authentication vector, map the 4G authentication vector carried in the response to the second request to the 5G AKA authentication vector; or when the authentication vector mapping indication indicates to map the 4G EAP-AKA' authentication vector to the 5G EAP-AKA' authentication vector, map the 4G authentication vector carried in the response to the second request to the 5G EAP-AKA' authentication vector.

In some possible implementations, the processing unit is further configured to determine, according to a local policy, to perform 5G AKA authentication, 5G EAP-AKA' authentication, 4G AKA authentication, or 4G EAP-AKA' authentication on the user equipment.

In some possible implementations, the transceiver unit is further configured to receive an authentication response from the second core network device.

The processing unit is further configured to: when it is determined, according to the local policy, to perform the 5G AKA authentication on the user equipment, perform the 5G AKA authentication on the user equipment; or when it is determined, according to the local policy, to perform the 5G EAP-AKA' authentication on the user equipment, perform the 5G EAP-AKA' authentication on the user equipment; when it is determined, according to the local policy, to perform the 4G AKA authentication on the user equipment, perform the 4G AKA authentication on the user equipment; or when it is determined, according to the local policy, to perform the 4G EAP-AKA' authentication on the user equipment, perform the 4G EAP-AKA' authentication on the user equipment.

In some possible implementations, the processing unit is further configured to generate a 5G security key of the user equipment using the 4G authentication vector, where the 5G security key includes Kseaf and Kausf.

In some possible implementations, the third core network device is the AUSF, the IWF, or the authentication proxy network element.

A twenty-third aspect of this application provides a core network device, including a processor and a memory that are coupled to each other. The processor invokes a program stored in the memory, to perform some or all of the steps of any communication method provided in the twenty-first aspect, for example, perform some or all of the steps of any communication method performed by the third core network device in the twenty-first aspect.

A twenty-fourth aspect of this application provides a computer-readable storage medium, where the computer-readable storage medium stores a computer program. The computer program is executed by a processor, to implement some or all of the steps of any communication method provided in the twenty-first aspect, for example, to implement some or all of the steps of any communication method performed by the third core network device in the twenty-first aspect.

A twenty-fifth aspect of this application provides a communication method, including the following.

When a user equipment roams from a first network to a second network, the user equipment receives an authentication request sent by a second core network device, where the authentication request carries an authentication vector generation indication, where the second network is a 5G standalone network, where the first network is a 5G non-standalone network, and where the second core network device is a core network device in the second network.

When the authentication vector generation indication carried in the authentication request is used to indicate the user equipment to generate a 4G EAP-AKA' authentication vector, a generated 4G authentication vector is a 4G EAP-AKA' authentication vector. When the authentication vector generation indication is used to indicate the user equipment to generate a 4G AKA authentication vector, a generated 4G authentication vector is a 4G AKA authentication vector.

The user equipment sends, to the core network device, an authentication response that carries the generated 4G EAP-AKA' authentication vector or the 4G AKA authentication vector.

A twenty-sixth aspect of this application provides a user equipment, including: a transceiver unit configured to receive an authentication request sent by a second core network device when the user equipment roams from a first network to a second network, where the authentication request carries an authentication vector generation indication, where the second network is a 5G standalone network, where the first network is a 5G non-standalone network, and where the second core network device is a core network device in the second network; and a processing unit configured to: when the authentication vector generation indication carried in the authentication request is used to indicate the user equipment to generate a 4G EAP-AKA' authentication vector, a generated 4G authentication vector is a 4G EAP-AKA' authentication vector; or when the authentication vector generation indication is used to indicate the user equipment to generate a 4G AKA authentication vector, a generated 4G authentication vector is a 4G AKA authentication vector.

The transceiver unit is further configured to send, to the core network device, an authentication response that carries the generated 4G EAP-AKA' authentication vector or 4G AKA authentication vector.

A twenty-seventh aspect of this application provides user equipment, including a processor and a memory that are coupled to each other. The processor invokes a program stored in the memory, to perform some or all of the steps of any communication method provided in the twenty-fifth aspect, for example, may perform some or all of the steps of any communication method performed by the user equipment in the twenty-fifth aspect.

A twenty-eighth aspect of this application provides a computer-readable storage medium, where the computer-readable storage medium stores a computer program. The computer program is executed by a processor, to implement some or all of the steps of any communication method provided in the twenty-fifth aspect, for example, to implement some or all of the steps of any communication method performed by the user equipment in the twenty-fifth aspect.

A twenty-ninth aspect of this application provides a communication method, including the following.

When a user equipment roams from a first network to a second network, the user equipment receives an authentication request sent by a second core network device, where the authentication request carries an authentication vector mapping indication, where the second network is a 5G standalone network, where the first network is a 5G non-standalone network, and where the second core network device is a core network device in the second network.

When the authentication vector mapping indication carried in the authentication request indicates the user equipment to map a 4G EAP-AKA' authentication vector to a 5G EAP-AKA' authentication vector, the user equipment generates a 4G EAP-AKA' authentication vector, and the user equipment maps the generated 4G EAP-AKA' authentication vector to a 5G EAP-AKA' authentication vector.

When the authentication vector mapping indication carried in the authentication request indicates the user equipment to map a 4G AKA authentication vector to a 5G AKA authentication vector, the user equipment generates a 4G AKA authentication vector, and the user equipment maps the generated 4G AKA authentication vector to a 5G AKA authentication vector.

The user equipment sends an authentication response to the second core network device, where the authentication response carries the 5G AKA authentication vector or the 5G EAP-AKA' authentication vector obtained through mapping.

A thirtieth aspect of this application provides user equipment, including: a transceiver unit configured to receive an authentication request sent by a second core network device when a user equipment roams from a first network to a second network, where the authentication request carries an authentication vector mapping indication, where the second network is a 5G standalone network, where the first network is a 5G non-standalone network, and where the second core network device is a core network device in the second network; and a processing unit configured to: generate a 4G EAP-AKA' authentication vector when the authentication vector mapping indication carried in the authentication request indicates the user equipment to map a 4G EAP-AKA' authentication vector to a 5G EAP-AKA' authentication vector; and map the generated 4G EAP-AKA' authentication vector to a 5G EAP-AKA' authentication vector.

The processing unit is further configured to: generate a 4G AKA authentication vector when the authentication vector mapping indication carried in the authentication request indicates the user equipment to map a 4G AKA authentication vector to a 5G AKA authentication vector; and map the generated 4G AKA authentication vector to a 5G AKA authentication vector.

The transceiver unit is further configured to send an authentication response to the second core network device, where the authentication response carries the 5G AKA authentication vector or the 5G EAP-AKA' authentication vector obtained through mapping.

A thirty-first aspect of this application provides user equipment, including a processor and a memory that are coupled to each other. The processor invokes a program stored in the memory, to perform some or all of the steps of any communication method provided in the twenty-ninth aspect, for example, may perform some or all of the steps of any communication method performed by the user equipment in the twenty-ninth aspect.

A thirty-second aspect of this application provides a computer-readable storage medium, where the computer-readable storage medium stores a computer program. The computer program is executed by a processor, to implement some or all of the steps of any communication method provided in the twenty-ninth aspect, for example, to implement some or all of the steps of any communication method performed by the user equipment in the twenty-ninth aspect.

A thirty-third aspect of this application provides a communication method, including the following.

When a user equipment roams from a first network to a second network, a first core network device receives a third request (the third request may be from an access and mobility management function (AMF) in the second network). Alternatively, the third request may be from an IWF, an AUSF, or another authentication proxy network element in the first network or the second network. The third request is a user authentication request or an authentication data request, and the third request carries an authentication vector request indication. The second network is a 5G standalone network, the first network is a 5G non-standalone network, and the first core network device is a core network device in the first network.

The first core network device sends a response to the third request that carries a 5G authentication vector, where the 5G authentication vector is an EAP-AKA' authentication vector or a 5G AKA authentication vector.

It may be understood that, in the foregoing technical solution, when the UE roams from the first network to the second network, the first network receives the user authentication request or the authentication data request (the third request) that carries the authentication vector request indication. The first core network device generates the 5G authentication vector based on the authentication vector request indication, and feeds back the 5G authentication vector using the response to the third request. In this way, a visited network can perform 5G authentication on the roaming UE using the 5G authentication vector. This helps a 5G SA operator provide a 5G service for UE of a 5G NSA operator that roams to the 5G NSA network.

In some possible implementations, the authentication vector request indication includes one or more of the following: an access network type identifier or a requesting node identifier.

An access network type indicated by the access network type identifier is a 5G access network, or a node that requests an authentication vector and that is indicated by the requesting node identifier is one or more of an AMF, an AUSF, an IWF, an SGSN, or an authentication proxy network element.

A thirty-fourth aspect of this application provides a first core network device, including: a receiving unit configured to receive a third request when a user equipment roams from a first network to a second network, where the third request is a user authentication request or an authentication data request, where the third request carries an authentication vector request indication, where the second network is a 5G standalone network, where the first network is a 5G non-standalone network, and where the first core network device is a core network device in the first network; and a sending unit configured to send a response to the third request that carries a 5G authentication vector, where the 5G authentication vector is an EAP-AKA' authentication vector or a 5G AKA authentication vector.

In some possible implementations, the authentication vector request indication includes one or more of the following: an access network type identifier or a requesting node identifier.

An access network type indicated by the access network type identifier is a 5G access network. A node that requests an authentication vector and that is indicated by the requesting node identifier is one or more of an AMF, an AUSF, an IWF, an SGSN, or an authentication proxy network element.

A thirty-fifth aspect of this application provides a core network device, including a processor and a memory that are coupled to each other. The processor invokes a program stored in the memory, to perform some or all of the steps of any communication method provided in the thirty-third aspect, for example, perform some or all of the steps of any communication method performed by the first core network device in the thirty-third aspect.

A thirty-sixth aspect of this application provides a computer-readable storage medium, where the computer-readable storage medium stores a computer program. The computer program is executed by a processor, to implement some or all of the steps of any communication method provided in the thirty-third aspect, for example, to implement some or all of the steps of any communication method performed by the first core network device in the thirty-third aspect.

A thirty-seventh aspect of this application provides a communication method, including the following.

When a user equipment roams from a first network to a second network, a second core network device sends a third request, where the third request is a user authentication request or an authentication data request, the third request carries an authentication vector request indication, the second network is a 5G standalone network, the first network is a 5G non-standalone network, and the second core network device is a core network device in the second network.

The second core network device receives a response to the third request that carries a 5G authentication vector, where the 5G authentication vector is a 5G AKA authentication vector or a 5G EAP-AKA' authentication vector.

It may be understood that, in the foregoing technical solution, when the UE roams from the first network to the second network, the second network sends the user authentication request or the authentication data request (the third request) that carries the authentication vector request indication. The first network may feed back the 5G authentication vector using the response to the third request, such that the second network (a visited network) may perform 5G authentication on the roaming UE based on the 5G authentication vector provided by a home network. This helps a 5G SA operator provide a 5G service for UE of a 5G NSA operator that roams to the 5G NSA network.

In some possible implementations, the authentication vector request indication includes one or more of the following: an access network type identifier or a requesting node identifier.

An access network type indicated by the access network type identifier is a 5G access network. A node that requests an authentication vector and that is indicated by the requesting node identifier is one or more of an AMF, an AUSF, an IWF, an SGSN, or an authentication proxy network element.

In some possible implementations, the method further includes: The second core network device sends an authentication request to the user equipment; the second core network device receives an authentication response from the user equipment; and the second core network device performs 5G AKA authentication or 5G EAP-AKA' authentication on the user equipment.

For example, when the authentication response carries RES, the second core network device compares XRES in the EAP-AKA' authentication vector with RES carried in the authentication response. When XRES in the EAP-AKA' authentication vector is consistent with RES carried in the authentication response, it is determined that authentication of the user equipment succeeds.

Alternatively, when the authentication response carries RES*, the second core network device compares XRES* in the 5G AKA authentication vector with RES* carried in the authentication response. When XRES* in the 5G AKA authentication vector is consistent with RES* carried in the authentication response, it is determined that the authentication of the user equipment succeeds.

In some possible implementations, the method further includes: The second core network device generates a 5G security key of the user equipment using the 5G authentication vector, where the 5G security key includes Kseaf and Kausf.

A thirty-eighth aspect of this application provides a second core network device, including: a transceiver unit configured to send a third request when a user equipment roams from a first network to a second network, where the third request is a user authentication request or an authentication data request, where the third request carries an authentication vector request indication, where the second network is a 5G standalone network, where the first network is a 5G non-standalone network, and where the second core network device is a core network device in the second network.

The transceiver unit is further configured to receive a response to the third request that carries a 5G authentication vector, where the 5G authentication vector is a 5G AKA authentication vector or a 5G EAP-AKA' authentication vector.

In some possible implementations, the authentication vector request indication includes one or more of the following: an access network type identifier or a requesting node identifier.

An access network type indicated by the access network type identifier is a 5G access network. Anode that requests an authentication vector and that is indicated by the requesting node identifier is one or more of an AMF, an AUSF, an IWF, an SGSN, or an authentication proxy network element.

In some possible implementations, the transceiver unit is further configured to send an authentication request to the user equipment, and receive an authentication response from the user equipment.

The second core network device further includes a processing unit configured to perform 5G AKA authentication or 5G EAP-AKA' authentication on the user equipment.

For example, when the authentication response carries RES, the processing unit compares XRES in the EAP-AKA' authentication vector with RES carried in the authentication response. When XRES in the EAP-AKA' authentication vector is consistent with RES carried in the authentication response, it is determined that authentication of the user equipment succeeds.

Alternatively, when the authentication response carries RES*, the processing unit compares XRES* in the 5G AKA authentication vector with RES* carried in the authentication response. When XRES* in the 5G AKA authentication vector is consistent with RES* carried in the authentication response, it is determined that the authentication of the user equipment succeeds.

In some possible implementations, the processing unit is further configured to generate a 5G security key of the user equipment using the 5G authentication vector, where the 5G security key includes Kseaf and Kausf.

A thirty-ninth aspect of this application provides a core network device, including a processor and a memory that are coupled to each other. The processor invokes a program stored in the memory, to perform some or all of the steps of any communication method provided in the thirty-seventh aspect, for example, perform some or all of the steps of any communication method performed by the second core network device in the thirty-seventh aspect.

A fortieth aspect of this application provides a computer-readable storage medium, where the computer-readable storage medium stores a computer program. The computer program is executed by a processor, to implement some or all of the steps of any communication method provided in the thirty-seventh aspect, for example, to implement some or all of the steps of any communication method performed by the second core network device in the thirty-seventh aspect.

A forty-first aspect of this application provides a communication method, including the following.

When a user equipment roams from a first network to a second network, a third core network device receives a third request from a second core network device, where the third request is a user authentication request or an authentication data request, where the second network is a 5G standalone network, where the first network is a 5G non-standalone network, where the third core network device is a core network device in the first network or the second network, and where the second core network device is a core network device in the second network.

The third core network device sends the third request that carries an authentication vector request indication to a first core network device, where the first core network device is a core network device in the first network.

The third core network device receives a response to the third request that carries a 5G authentication vector, where the 5G authentication vector is a 5G AKA authentication vector or a 5G EAP-AKA' authentication vector.

The third core network device sends the response (which may carry the 5G authentication vector) to the third request to the second core network device.

In some possible implementations, the authentication vector request indication includes one or more of the following: an access network type identifier or a requesting node identifier. An access network type indicated by the access network type identifier is a 5G access network. A node that requests an authentication vector and that is indicated by the requesting node identifier is one or more of an AMF, an AUSF, an IWF, an SGSN, or an authentication proxy network element.

In some possible implementations, the method further includes: The third core network device receives an authentication response from the user equipment; and the third core network device performs 5G AKA authentication or 5G EAP-AKA' authentication on the user equipment.

For example, when the authentication response carries RES, the third core network device compares XRES in the EAP-AKA' authentication vector with RES carried in the authentication response. When XRES in the EAP-AKA' authentication vector is consistent with RES carried in the authentication response, it is determined that authentication of the user equipment succeeds.

Alternatively, when the authentication response carries RES*, the third core network device compares XRES* in the 5G AKA authentication vector with RES* carried in the authentication response. When XRES* in the 5G AKA authentication vector is consistent with RES* carried in the authentication response, it is determined that the authentication of the user equipment succeeds.

In some possible implementations, the second core network device generates a 5G security key of the user equipment using the 5G authentication vector, where the 5G security key includes Kseaf and Kausf.

In some possible implementations, the third core network device is the AUSF, the IWF, or the authentication proxy network element.

A forty-second aspect of this application provides a third core network device, including: a transceiver unit configured to receive a third request from a second core network device when a user equipment roams from a first network to a second network, where the third request is a user authentication request or an authentication data request, where the second network is a 5G standalone network, where the first network is a 5G non-standalone network, where the third core network device is a core network device in the first network or the second network, and where the second core network device is a core network device in the second network.

The transceiver unit is further configured to send the third request that carries an authentication vector request indication to a first core network device, where the first core network device is a core network device in the first network.

The transceiver unit is further configured to receive a response to the third request that carries a 5G authentication vector, where the 5G authentication vector is a 5G AKA authentication vector or a 5G EAP-AKA' authentication vector.

The transceiver unit is further configured to send the response to the third request to the second core network device.

In some possible implementations, the authentication vector request indication includes one or more of the following: an access network type identifier or a requesting node identifier. An access network type indicated by the access network type identifier is a 5G access network. A node that requests an authentication vector and that is indicated by the requesting node identifier is one or more of an AMF, an AUSF, an IWF, an SGSN, or an authentication proxy network element.

In some possible implementations, the transceiver unit is further configured to receive an authentication response from the user equipment.

The third core network device further includes a processing unit configured to perform 5G AKA authentication or 5G EAP-AKA' authentication on the user equipment.

For example, when the authentication response carries RES, the processing unit compares XRES in the EAP-AKA' authentication vector with RES carried in the authentication response. When XRES in the EAP-AKA' authentication vector is consistent with RES carried in the authentication response, it is determined that authentication of the user equipment succeeds.

Alternatively, when the authentication response carries RES*, the processing unit compares XRES* in the 5G AKA authentication vector with RES* carried in the authentication response. When XRES* in the 5G AKA authentication vector is consistent with RES* carried in the authentication response, it is determined that the authentication of the user equipment succeeds.

In some possible implementations, the processing unit is further configured to generate a 5G security key of the user equipment using the 5G authentication vector, where the 5G security key includes Kseaf and Kausf.

In some possible implementations, the third core network device is the AUSF, the IWF, or the authentication proxy network element.

A forty-third aspect of this application provides a core network device, including a processor and a memory that are coupled to each other. The processor invokes a program stored in the memory, to perform some or all of the steps of any communication method provided in the forty-first aspect, for example, perform some or all of the steps of any communication method performed by the third core network device in the forty-first aspect.

A forty-fourth aspect of this application provides a computer-readable storage medium, where the computer-readable storage medium stores a computer program. The computer program is executed by a processor, to implement some or all of the steps of any communication method provided in the forty-first aspect, for example, to implement some or all of the steps of any communication method performed by the third core network device in the forty-first aspect.

According to a forty-fifth aspect, an embodiment of this application further provides a communications apparatus, where the communication apparatus includes a processor and a memory that are coupled to each other. The processor is configured to invoke a program stored in the memory, to complete some or all of the steps of any method performed by any device provided in the embodiments of this application.

According to a forty-sixth aspect, an embodiment of this application further provides a computer-readable storage medium. The computer-readable storage medium stores a program. When the program is executed by a processor, some or all steps of any method performed by any device provided in the embodiments of this application are completed.

According to a forty-seventh aspect, an embodiment of this application further provides a computer program product including instructions. When the computer program product runs on a computer device, the computer device is enabled to perform some or all of the steps of any method performed by any device provided in the embodiments of this application.

BRIEF DESCRIPTION OF DRAWINGS

The following describes some accompanying drawings in embodiments of this application.

FIG. 1A is a schematic architectural diagram of a communications system according to an embodiment of this application;

FIG. 1B to FIG. 1D are schematic architectural diagrams of other communications systems according to an embodiment of this application;

FIG. 1E and FIG. 1F are schematic architectural diagrams of other communications systems according to an embodiment of this application;

FIG. 2A is a schematic flowchart of a communication method according to an embodiment of this application;

FIG. 2B is a schematic flowchart of another communication method according to an embodiment of this application;

FIG. 2C is a schematic flowchart of another communication method according to an embodiment of this application;

FIG. 2D is a schematic flowchart of another communication method according to an embodiment of this application;

FIG. 3A is a schematic flowchart of another communication method according to an embodiment of this application;

FIG. 3B is a schematic flowchart of another communication method according to an embodiment of this application;

FIG. 4A is a schematic flowchart of another communication method according to an embodiment of this application;

FIG. 4B is a schematic flowchart of another communication method according to an embodiment of this application;

FIG. 5A is a schematic flowchart of another communication method according to an embodiment of this application;

FIG. 5B is a schematic flowchart of another communication method according to an embodiment of this application;

FIG. 6A is a schematic flowchart of another communication method according to an embodiment of this application;

FIG. 6B is a schematic flowchart of another communication method according to an embodiment of this application;

FIG. 7A is a schematic flowchart of another communication method according to an embodiment of this application;

FIG. 7B is a schematic flowchart of another communication method according to an embodiment of this application;

FIG. 8A is a schematic flowchart of another communication method according to an embodiment of this application;

FIG. 8B is a schematic flowchart of another communication method according to an embodiment of this application;

FIG. 24A is a schematic flowchart of another communication method according to an embodiment of this application;

FIG. 24B is a schematic diagram of setting office direction information according to an embodiment of this application;

FIG. 25A is a schematic flowchart of another communication method according to an embodiment of this application; and FIG. 25B is a schematic diagram of setting an IP address and/or a port number according to an embodiment of this application.

DESCRIPTION OF EMBODIMENTS

Figure 9:
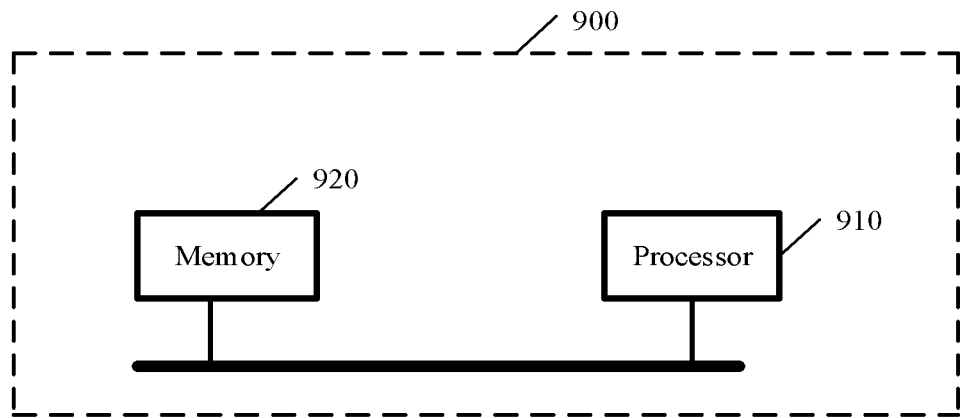
FIG. 9 is a schematic architectural diagram of a core network device according to an embodiment of this application.

The following describes embodiments of this application with reference to the accompanying drawings in the embodiments of this application.

FIG. 1A is a schematic diagram of an example of a 5G network architecture according to an embodiment of this application. A 5G network splits some functional network elements (for example, a mobility management entity (MME)) of a 4G network, and defines an architecture based on a service-oriented architecture. In the network architecture shown in FIG. 1A, for example, a function of an MME in a 4G network is split into a session management function (SMF), an access and mobility management function (AMF), and the like.

The following describes some other related network elements/entities.

User equipment (UE) accesses a data network (DN) and the like by accessing an operator network, and uses a service provided by an operator or a third party in the DN.

The access and mobility management function (AMF) is a control plane network element in a 3rd Generation Partnership Project (3GPP) network, and is mainly responsible for access control and mobility management for the UE to access the operator network. A security anchor function (SEAF) may be deployed in the AMF, or an SEAF may be deployed in another device different from the AMF. In FIG. 1A, an example in which the SEAF is deployed in the AMF is used. When the SEAF is deployed in the AMF, the SEAF and the AMF may be jointly referred to as an AMF.

The session management function (SMF) is a control plane network element in the 3GPP network. The SMF is mainly responsible for managing a packet data unit (PDU) session of the UE. The PDU session is a channel for transmitting PDUs. The UE and the DN may send PDUs to each other using the PDU session. The SMF is responsible for management, such as establishing, maintaining, and deleting a PDU session.

The data network (DN) is also referred to as a packet data network (PDN), and is a network outside the 3GPP network. The 3GPP network may be connected to a plurality of DNs, and a plurality of services provided by an operator or a third party may be deployed in the DN. For example, a DN is a private network of a smart factory, a sensor installed in a workshop of the smart factory serves as a UE, and a control server of the sensor is deployed in the DN. The UE communicates with the control server. After obtaining an instruction of the control server, the UE may transfer collected data to the control server based on the instruction. For another example, a DN is an internal office network of a company, a terminal used by an employee of the company may serve as UE, and the UE may access internal information and other resources of the company.

A unified data management (UDM) network element is also a control plane network element in the 3GPP network. The UDM is mainly responsible for storing subscription data, a credential, a subscription permanent identifier (SUPI), and the like of a subscriber (e.g., the UE) in the 3GPP network. The data may be used for authentication and authorization of the UE to access the 3GPP network of the operator.

An authentication server function (AUSF) is also a control plane network element in the 3GPP network. The AUSF is mainly responsible for level-1 authentication (namely, authentication of the 3GPP network for a subscriber).

A network exposure function (NEF) is also a control plane network element in the 3GPP network. The NEF is mainly responsible for exhibiting an external interface of the 3GPP network to a third party in a secure manner. When a network element such as the SMF needs to communicate with a third-party network element, the NEF may serve as a relay for communication. The NEF can translate internal and external identifiers when the NEF serves as a relay. For example, when sending an SUPI of the UE from the 3GPP network to a third party, the NEF may translate the SUPI into a corresponding external identity (ID). Conversely, when an external identity ID is sent to the 3GPP network, the NEF may translate the external identity ID into a corresponding SUPI.

A network repository function (NRF) is also a control plane network element in the 3GPP network, and is mainly responsible for storing a configuration service profile of an accessible network function (NF), and providing a network function discovery service for another network element.

A user plane function (UPF) is a gateway for communication between the 3GPP network and the DN.

A policy control function (PCF) is a control plane function in the 3GPP network, and is configured to provide a PDU session policy for the SMF. The policy may include charging, quality of service (QoS), an authorization-related policy, and the like.

An access network (AN) is a sub-network of the 3GPP network. To access the 3GPP network, the UE first needs to access the AN. In a radio access scenario, the AN is also referred to as a radio access network (RAN). Therefore, the terms RAN and AN are often used interchangeably without distinction.

A 3GPP network is a network that complies with a 3GPP standard. In FIG. 1A, parts other than a UE and a DN may be considered as a 3GPP network. The 3GPP network is not only limited to a 5G network defined by the 3GPP, and may further include a 2nd generation (2G) network, a 3G network, and a 4G network. Generally, the 3GPP network is operated by an operator. In addition, in the architecture shown in FIG. 1A, N1, N2, N3, N4, N6 and the like respectively represent reference points between related network elements/network functions. Nausf, Namf, and the like represent service-oriented interfaces of related network functions.

Certainly, the 3GPP network and a non-3GPP network may coexist, and some network elements in the 5G network may also be applied to some non-5G networks.

Different operators may consider different evolution deployment modes during construction of the 5G network. Therefore, a 5G non-standalone network (5G NSA network) and a 5G standalone network (5G SA network) may coexist. The solution in this embodiment of this application is mainly described in a scenario in which the 5G NSA network and the 5G SA network coexist. This embodiment describes a related authentication scheme used by a 5G SA operator to provide a 5G service for a UE of a 5G NSA operator when the UE of the 5G NSA operator roams to the 5G SA operator.

FIG. 1B to FIG. 1D shows some possible example network architectures in a scenario in which a 5G NSA network and a 5G SA network coexist. A UE of a 5G NSA operator may roam from the 5G NSA network to the 5G SA network. In this case, the 5G NSA network serves as a home network of the UE and the 5G SA network serves as a visited network of the UE.

The home network mentioned in this embodiment of this application may also be referred to as a home domain or a home network.

In FIG. 1B, a second core network device may be an AMF or the like, and a first core network device may be an HSS, an HLR, or the like. In FIG. 1C and FIG. 1D, the second core network device may be an AMF or the like, the first core network device may be an HSS, an HLR, or the like, and a third core network device may be an AUSF, an IWF, an authentication proxy network element, or the like.

In addition, there may be a scenario in which an operator in the 5G SA network does not deploy a UDM but use the HSS/HLR to provide a service for a user. Therefore, how the HSS/HLR provides a 5G service for the user is an important issue for the 5G SA operator to consider.

FIG. 1E and FIG. 1F illustrate some possible network architectures of a 5G SA network. In FIG. 1B, a second core network device may be an AMF or the like, and a first core network device may be an HSS, an HLR, or the like. In FIG. 1C and FIG. 1D, the second core network device may be an AMF or the like, the first core network device may be an HSS, an HLR, or the like, and a third core network device may be an AUSF, an IWF, an authentication proxy network element, or the like.

A roaming scenario and a non-roaming scenario may exist in the solution in this embodiment of this application. In the roaming scenario, a first network (e.g., an NSA network) and a second network (e.g., a SA network) are different networks. However, in the non-roaming scenario, the first network and the second network are a same network (the SA network). In other words, both the first network and the second network may be 5G standalone networks and belong to a same network. In this case, a user receives a service in the same network, and no roaming action is performed.

Some methods in the embodiments of this application may be implemented based on the network architectures shown in FIG. 1B to FIG. 1D.

Other methods in the embodiments of this application may be implemented based on the network architectures shown in FIG. 1E and FIG. 1F.

FIG. 2A is a schematic flowchart of another communication method according to an embodiment of this application. The communication method shown in FIG. 2A may be implemented based on the network architecture shown in FIG. 1B. As shown in FIG. 2A, another communication method may include the following steps.

101: When a UE roams from a first network to a second network, the UE sends a registration request (RR) to a second core network device in the second network.

102: The second core network device sends a first request to a first core network device in the first network after receiving the registration request from the UE.

The first request is a user authentication request or an authentication data request. The first request carries an authentication vector request indication. The authentication vector request indication may be used to request an authentication vector, and content of an authentication vector request may be diverse.

In some possible implementations, the authentication vector request indication includes one or more of the following: an access network type identifier, a requesting node identifier, or an authentication management field modification identifier. An access network type indicated by the access network type identifier is a 5G access network. An authentication management field modification manner indicated by the authentication management field modification identifier is setting a $0^{th}$ bit of an authentication management field in an authentication vector quintet to 1. A node that requests an authentication vector and that is indicated by the requesting node identifier is, for example, one or more of an AMF, an authentication server function (AUSF), a mobility management entity (MME), an interworking function (IWF), an authentication, authorization, and accounting server (AAA-server), an SGSN, or an authentication proxy network element.

103: The first core network device generates the authentication vector quintet based on the authentication vector request indication after receiving the first request from the second core network device, where a $0^{th}$ bit of an authentication management field in the authentication vector quintet is set to 1.

104: The first core network device sends a response to the first request to the second core network device, where the response to the first request carries the authentication vector quintet.

105: After receiving the response to the first request from the first core network device, the second core network device generates a 5G authentication vector for the UE using the authentication vector quintet carried in the response to the first request.

The second core network device is, for example, an AMF in the second network. The first core network device is, for example, an HSS, an HLR, or another similar device in the first network.

5G authentication includes 5G Authentication and Key Agreement (AKA) authentication, 5G Extensible Authentication Protocol-Authentication and Key Agreement (EAP-AKA') authentication, and the like.

In some possible implementations, the response to the first request further carries an authentication mode indication, and the authentication mode indication is used to indicate 5G AKA authentication or 5G EAP-AKA' authentication. When the authentication mode indication indicates 5G AKA authentication, the 5G authentication vector for the user equipment generated by the second core network device is a 5G AKA authentication vector. When the authentication mode indication indicates 5G EAP-AKA' authentication, the 5G authentication vector for the user equipment generated by the second core network device is a 5G EAP-AKA' authentication vector.

In some possible implementations, the method may further include: The second core network device sends an authentication request to the user equipment; and the second core network device receives an authentication response (a response to the authentication request) from the user equipment. When the authentication mode indication indicates 5G AKA authentication, the second core network device performs the 5G AKA authentication on the user equipment. Alternatively, when the authentication mode indication indicates 5G EAP-AKA' authentication, the second core network device performs the 5G EAP-AKA' authentication on the user equipment.

For example, when the authentication response carries RES (an authentication result, response), the second core network device compares XRES in the EAP-AKA' authentication vector with RES carried in the authentication response. When XRES in the EAP-AKA' authentication vector is consistent with RES carried in the authentication response, it is determined that authentication of the user equipment succeeds. When XRES in the EAP-AKA' authentication vector is inconsistent with RES carried in the authentication response, it is determined that the authentication of the user equipment fails.

For example, when the authentication response carries RES* (an authentication result, response*), the second core network device compares XRES* (an expected authentication result, expected RES*) in the 5G AKA authentication vector with RES* carried in the authentication response. When XRES* in the 5G AKA authentication vector is consistent with RES* carried in the authentication response, it is determined that authentication of the user equipment succeeds. When XRES* in the 5G AKA authentication vector is inconsistent with RES* carried in the authentication response, it is determined that the authentication of the user equipment fails.

In some possible implementations, the method may further include: The second core network device generates a 5G security key of the user equipment using the authentication vector quintet, where the 5G security key includes, for example, Kseaf and Kausf.

It may be understood that, in the foregoing technical solution, when the user equipment roams from the first network to the second network, the second network receives the user authentication request or the authentication data request (the first request) that carries the authentication vector request indication. The first core network device generates the authentication vector quintet based on the authentication vector request indication, and feeds back, using the response to the first request, the authentication vector quintet in which the $0^{th}$ bit of the authentication management field is set to 1. In this way, a visited network obtains a 5G authentication vector based on the authentication vector quintet provided by a home network, and further performs 5G authentication on the UE using the 5G authentication vector. This helps a 5G SA operator provide a 5G service for a user of a 5G NSA operator.

FIG. 2B is a schematic flowchart of another communication method according to an embodiment of this application. The communication method shown in FIG. 2B may be implemented based on the network architecture shown in FIG. 1C. As shown in FIG. 2B, the other communication method may include the following steps.

201: When a UE roams from a first network to a second network, the UE sends a registration request (RR) to a second core network device in the second network.

202: The second core network device sends a first request to a third core network device in the first network after receiving the registration request from the UE.

The first request is a user authentication request or an authentication data request.

203: The third core network device sends the first request to a first core network device in the first network after receiving the first request from the second core network device. The first request sent by the third core network device carries an authentication vector request indication (for example, the third core network device may add the authentication vector request indication to the first request from the second core network device, and then send the first request that carries the authentication vector request indication to the first core network device in the first network).

The authentication vector request indication may be used to request an authentication vector, and content of an authentication vector request may be diverse.

In some possible implementations, the authentication vector request indication includes one or more of the following: an access network type identifier, a requesting node identifier, or an authentication management field modification identifier. An access network type indicated by the access network type identifier is a 5G access network. An authentication management field modification manner indicated by the authentication management field modification identifier is setting a $0^{th}$ bit of an authentication management field in an authentication vector quintet to 1. A node that requests an authentication vector and that is indicated by the requesting node identifier is, for example, one or more of an AMF, an authentication server function (AUSF), a mobility management entity (MME), an interworking function (IWF), an authentication, authorization, and accounting server (AAA-server), an SGSN, or an authentication proxy network element.

204: The first core network device generates the authentication vector quintet based on the authentication vector request indication after receiving the first request from the third core network device, where the $0^{th}$ bit of the authentication management field in the authentication vector quintet is set to 1.

205: The first core network device sends a response to the first request to the third core network device, where the response to the first request carries the authentication vector quintet.

206: After receiving the response to the first request from the first core network device, the third core network device generates a 5G authentication vector for the UE using the authentication vector quintet carried in the response to the first request.

The second core network device is, for example, an AMF in the second network. The first core network device is, for example, an HSS, an HLR, or another similar device in the first network. The third core network device is, for example, an AUSF, an IWF, or an authentication proxy network element.

5G authentication includes 5G AKA authentication, 5G EAP-AKA' authentication, and the like.

In some possible implementations, the response to the first request further carries an authentication mode indication, and the authentication mode indication is used to indicate 5G AKA authentication or 5G EAP-AKA' authentication. When the authentication mode indication indicates 5G AKA authentication, the 5G authentication vector for the user equipment generated by the third core network device is a 5G AKA authentication vector; and when the authentication mode indication indicates 5G EAP-AKA' authentication, the 5G authentication vector for the user equipment generated by the third core network device is a 5G EAP-AKA' authentication vector.

In some possible implementations, the method may further include: The second core network device sends an authentication request to the user equipment; and the second core network device receives an authentication response (a response to the authentication request) from the user equipment. The second core network device forwards the authentication response from the user equipment to the third core network device. The third core network device receives the authentication response from the user equipment that is forwarded by the third core network device.

When the authentication mode indication indicates 5G AKA authentication, the third core network device performs the 5G AKA authentication on the user equipment. Alternatively, when the authentication mode indication indicates 5G EAP-AKA' authentication, the third core network device performs the 5G EAP-AKA' authentication on the user equipment.

For example, when the authentication response carries RES (an authentication result, response), the third core network device compares XRES in the EAP-AKA' authentication vector with RES carried in the authentication response. When XRES in the EAP-AKA' authentication vector is consistent with RES carried in the authentication response, it is determined that authentication of the user equipment succeeds. When XRES in the EAP-AKA' authentication vector is inconsistent with RES carried in the authentication response, it is determined that the authentication of the user equipment fails.

For example, when the authentication response carries RES* (an authentication result, response*), the third core network device compares XRES* (an expected authentication result, expected RES*) in the 5G AKA authentication vector with RES* carried in the authentication response. When XRES* in the 5G AKA authentication vector is consistent with RES* carried in the authentication response, it is determined that authentication of the user equipment succeeds. When XRES* in the 5G AKA authentication vector is inconsistent with RES* carried in the authentication response, it is determined that the authentication of the user equipment fails.

In some possible implementations, the method may further include: The third core network device generates a 5G security key of the user equipment using the authentication vector quintet, where the 5G security key includes, for example, Kseaf and Kausf.

In FIG. 2B, that the third core network device is located in the second network is used as an example. Certainly, the third core network device may alternatively be located in the first network. An implementation in a scenario in which the third core network device is located in the first network may be similar to an implementation in a scenario in which the third core network device is located in the second network. Therefore, details are not described herein again.

It may be understood that, in the foregoing technical solution, when the user equipment roams from the first network to the second network, the second network receives the user authentication request or the authentication data request that carries the authentication vector request indication. The first core network device generates the authentication vector quintet based on the authentication vector request indication, and feeds back, using the response to the first request, the authentication vector quintet in which the $0^{th}$ bit of the authentication management field is set to 1. In this way, a visited network obtains a 5G authentication vector based on the authentication vector quintet provided by a home network, and further performs 5G authentication on the UE using the 5G authentication vector. This helps a 5G SA operator provide a 5G service for a user of a 5G NSA operator. In addition, when the second core network device is an AMF, after the third core network device is introduced, changes to the AMF can be greatly reduced, and solution implementation is less complex.

FIG. 2C is a schematic flowchart of another communication method according to an embodiment of this application. The communication method shown in FIG. 2C may be implemented based on the network architecture shown in FIG. 1E. As shown in FIG. 2C, the other communication method may include the following steps.

101b: A UE sends a registration request (RR) to a second core network device in a second network.

102b: The second core network device sends a first request to a first core network device in the second network after receiving the registration request from the UE.

The first request is a user authentication request or an authentication data request. The first request carries an authentication vector request indication. The authentication vector request indication may be used to request an authentication vector, and content of an authentication vector request may be diverse.

In some possible implementations, the authentication vector request indication includes one or more of the following: an access network type identifier, a requesting node identifier, or an authentication management field modification identifier. An access network type indicated by the access network type identifier is a 5G access network. An authentication management field modification manner indicated by the authentication management field modification identifier is setting a $0^{th}$ bit of an authentication management field in an authentication vector quintet to 1. A node that requests an authentication vector and that is indicated by the requesting node identifier is, for example, one or more of an AMF, an authentication server function (AUSF), a mobility management entity (MIME), an interworking function (IWF), an authentication, authorization, and accounting server (AAA-server), an SGSN, or an authentication proxy network element.

103b: The first core network device generates the authentication vector quintet based on the authentication vector request indication after receiving the first request from the second core network device, where a $0^{th}$ bit of an authentication management field in the authentication vector quintet is set to 1.

104b: The first core network device sends a response to the first request to the second core network device, where the response to the first request carries the authentication vector quintet.

105b: After receiving the response to the first request from the first core network device, the second core network device generates a 5G authentication vector for the UE using the authentication vector quintet carried in the response to the first request.

The second core network device is, for example, an AMF in the second network. The first core network device is, for example, an HSS, an HLR, or another similar device in the second network.

5G authentication includes an authentication mode such as 5G AKA authentication and 5G EAP-AKA' authentication.

In some possible implementations, the response to the first request further carries an authentication mode indication, and the authentication mode indication is used to indicate 5G AKA authentication or 5G EAP-AKA' authentication. When the authentication mode indication indicates 5G AKA authentication, the 5G authentication vector for the user equipment generated by the second core network device is a 5G AKA authentication vector; and when the authentication mode indication indicates 5G EAP-AKA' authentication, the 5G authentication vector for the user equipment generated by the second core network device is a 5G EAP-AKA' authentication vector.

In some possible implementations, the method may further include: The second core network device sends an authentication request to the user equipment; and the second core network device receives an authentication response (a response to the authentication request) from the user equipment. When the authentication mode indication indicates 5G AKA authentication, the second core network device performs the 5G AKA authentication on the user equipment. Alternatively, when the authentication mode indication indicates 5G EAP-AKA' authentication, the second core network device performs the 5G EAP-AKA' authentication on the user equipment.

For example, when the authentication response carries RES (an authentication result, response), the second core network device compares XRES in the EAP-AKA' authentication vector with RES carried in the authentication response. When XRES in the EAP-AKA' authentication vector is consistent with RES carried in the authentication response, it is determined that authentication of the user equipment succeeds. When XRES in the EAP-AKA' authentication vector is inconsistent with RES carried in the authentication response, it is determined that the authentication of the user equipment fails.

For example, when the authentication response carries RES* (an authentication result, response*), the second core network device compares XRES* (an expected authentication result, expected RES*) in the 5G AKA authentication vector with RES* carried in the authentication response. When XRES* in the 5G AKA authentication vector is consistent with RES* carried in the authentication response, it is determined that authentication of the user equipment succeeds. When XRES* in the 5G AKA authentication vector is inconsistent with RES* carried in the authentication response, it is determined that the authentication of the user equipment fails.

In some possible implementations, the method may further include: The second core network device generates a 5G security key of the user equipment using the authentication vector quintet, where the 5G security key includes, for example, Kseaf and Kausf.

It may be understood that, in the foregoing technical solution, when the user equipment registers with the second network, the second network receives the user authentication request or the authentication data request (the first request) that carries the authentication vector request indication. The first core network device (for example, an HSS/HLR) generates the authentication vector quintet based on the authentication vector request indication, and feeds back, using the response to the first request, the authentication vector quintet in which the $0^{th}$ bit of the authentication management field is set to 1. In this way, the second core network device (for example, an AMF) in the second network obtains a 5G authentication vector based on the authentication vector quintet provided by a home network, and further performs 5G authentication on the UE using the 5G authentication vector. This helps a 5G SA operator use, for example, the HSS/HLR to provide a 5G service for user equipment of the 5G SA operator.

FIG. 2D is a schematic flowchart of another communication method according to an embodiment of this application. The communication method shown in FIG. 2D may be implemented based on the network architecture shown in FIG. 1F. As shown in FIG. 2D, the other communication method may include the following steps.

201b: A UE sends a registration request (RR) to a second core network device in a second network.

202b: The second core network device sends a first request to a third core network device in the second network after receiving the registration request from the UE.

The first request is a user authentication request or an authentication data request.

203b: The third core network device sends the first request to a first core network device in the second network after receiving the first request from the second core network device. The first request sent by the third core network device carries an authentication vector request indication (for example, the third core network device may add the authentication vector request indication to the first request from the second core network device, and then send the first request that carries the authentication vector request indication to the first core network device in the second network).

The authentication vector request indication may be used to request an authentication vector, and content of an authentication vector request may be diverse.

In some possible implementations, the authentication vector request indication includes one or more of the following: an access network type identifier, a requesting node identifier, or an authentication management field modification identifier. An access network type indicated by the access network type identifier is a 5G access network. An authentication management field modification manner indicated by the authentication management field modification identifier is setting a $0^{th}$ bit of an authentication management field in an authentication vector quintet to 1. A node that requests an authentication vector and that is indicated by the requesting node identifier is, for example, one or more of an AMF, an authentication server function (AUSF), a mobility management entity (MME), an interworking function (IWF), an authentication, authorization, and accounting server (AAA-server), an SGSN, or an authentication proxy network element.

204b: The first core network device generates the authentication vector quintet based on the authentication vector request indication after receiving the first request from the third core network device, where the $0^{th}$ bit of the authentication management field in the authentication vector quintet is set to 1.

205b: The first core network device sends a response to the first request to the third core network device, where the response to the first request carries the authentication vector quintet.

206b: After receiving the response to the first request from the first core network device, the third core network device generates a 5G authentication vector for the UE using the authentication vector quintet carried in the response to the first request.

The second core network device is, for example, an AMF in the second network. The first core network device is, for example, an HSS, an HLR, or another similar device in the first network. The third core network device is, for example, an AUSF, an IWF, or an authentication proxy network element.

5G authentication includes an authentication mode such as 5G AKA authentication and 5G EAP-AKA' authentication.

In some possible implementations, the response to the first request further carries an authentication mode indication, and the authentication mode indication is used to indicate 5G AKA authentication or 5G EAP-AKA' authentication.

In some possible implementations, the response to the first request further carries an authentication mode indication, and the authentication mode indication is used to indicate 5G AKA authentication or 5G EAP-AKA' authentication. When the authentication mode indication indicates 5G AKA authentication, the 5G authentication vector for the user equipment generated by the third core network device is a 5G AKA authentication vector; and when the authentication mode indication indicates 5G EAP-AKA' authentication, the 5G authentication vector for the user equipment generated by the third core network device is a 5G EAP-AKA' authentication vector.

In some possible implementations, the method may further include: The second core network device sends an authentication request to the user equipment; and the second core network device receives an authentication response (a response to the authentication request) from the user equipment. The second core network device forwards the authentication response from the user equipment to the third core network device. The third core network device receives the authentication response from the user equipment that is forwarded by the third core network device.

When the authentication mode indication indicates 5G AKA authentication, the third core network device performs the 5G AKA authentication on the user equipment. Alternatively, when the authentication mode indication indicates 5G EAP-AKA' authentication, the third core network device performs the 5G EAP-AKA' authentication on the user equipment.

For example, when the authentication response carries RES (an authentication result, response), the third core network device compares XRES in the EAP-AKA' authentication vector with RES carried in the authentication response. When XRES in the EAP-AKA' authentication vector is consistent with RES carried in the authentication response, it is determined that authentication of the user equipment succeeds. When XRES in the EAP-AKA' authentication vector is inconsistent with RES carried in the authentication response, it is determined that the authentication of the user equipment fails.

For example, when the authentication response carries RES* (an authentication result, response*), the third core network device compares XRES* (an expected authentication result, expected RES*) in the 5G AKA authentication vector with RES* carried in the authentication response. When XRES* in the 5G AKA authentication vector is consistent with RES* carried in the authentication response, it is determined that authentication of the user equipment succeeds. When XRES* in the 5G AKA authentication vector is inconsistent with RES* carried in the authentication response, it is determined that the authentication of the user equipment fails.

In some possible implementations, the method may further include: The third core network device generates a 5G security key of the user equipment using the authentication vector quintet, where the 5G security key includes, for example, Kseaf and Kausf.

It may be understood that, in the foregoing technical solution, when the user equipment requests to register with the second network, the second network receives the user authentication request or the authentication data request that carries the authentication vector request indication. The first core network device (for example, an HSS/HLR) generates the authentication vector quintet based on the authentication vector request indication, and feeds back, using the response to the first request, the authentication vector quintet in which the $0^{th}$ bit of the authentication management field is set to 1. In this way, the third core network device (for example, an IWF) obtains a 5G authentication vector based on the authentication vector quintet provided by the first core network device (for example, the HSS/HLR), and further performs 5G authentication on the UE using the 5G authentication vector. This effectively enables a 5G SA operator to provide a 5G service for a user of the 5G SA operator. In addition, when the second core network device is an AMF, after the third core network device is introduced, changes to the AMF can be greatly reduced, and solution implementation is less complex.

FIG. 3A is a schematic flowchart of another communication method according to an embodiment of this application. The communication method shown in FIG. 3A may be implemented based on the network architecture shown in FIG. 1B. The other communication method may include the following steps.

301: A UE sends a registration request to an AMF in a visited network, where the registration request may carry a subscription concealed identifier (SUCI) of the UE protected using a null scheme.

302: The AMF sends a first request that carries an authentication vector request indication to a home network HSS/HLR after receiving the registration request from the UE, where the authentication vector request indication is used to request an authentication vector.

The authentication vector request indication includes, for example, one or more of the following: an access network type identifier, a requesting node identifier, or an authentication management field modification identifier.

An access network type indicated by the access network type identifier is a 5G access network, an authentication management field modification manner indicated by the authentication management field modification identifier is setting a $0^{th}$ bit of an authentication management field in an authentication vector quintet to 1, or a node that requests an authentication vector and that is indicated by the requesting node identifier is one or more of the AMF, an AUSF, an MME, an AAA-server, an IWF, an SGSN, or an authentication proxy network element.

303: An HSS/HLR sets a $0^{th}$ bit of the AMF in the authentication vector quintet to 1 based on the authentication vector request indication after receiving the first request from the AMF in the visited network, and sends a response to the first request to the AMF, where the response to the first request carries the authentication vector quintet.

304: After receiving the response to the first request, the AMF obtains the authentication vector quintet carried in the response to the first request, and generates a 5G authentication vector for the UE based on the authentication vector quintet.

The AMF may determine to perform 5G AKA authentication or 5G EAP-AKA' authentication according to a local policy.

Alternatively, the response to the first request further carries an authentication mode indication, and the authentication mode indication is used to indicate 5G AKA authentication or 5G EAP-AKA' authentication. The AMF may determine, based on the authentication mode indication carried in the response to the first request, to perform 5G AKA authentication or 5G EAP-AKA' authentication. For example, when the authentication mode indication indicates 5G EAP-AKA' authentication, the AMF determines to perform the 5G EAP-AKA' authentication on the UE; and when the authentication mode indication indicates 5G AKA authentication, the AMF determines to perform the 5G AKA authentication on the UE.

For example, if the 5G AKA authentication is performed, a 5G AKA authentication vector (RAND, AUTN, Kausf, XRES*) is calculated based on the authentication vector quintet (RAND, AUTN, CK, IK, XRES).

RAND in the 5G AKA authentication vector is equal to RAND in the authentication vector quintet.

AUTN in the 5G AKA authentication vector is equal to AUTN in the authentication vector quintet.

Kausf in the 5G AKA authentication vector is equal to KDF (CK||IK, 0x6A||SN name||length of SN name||SQN⊕AK||length of SQN⊕AK), where KDF denotes key derivation function, where SN name denotes serving network name, and where SQN denotes sequence number.

XRES* in the 5G AKA authentication vector is equal to KDF (CK||IK, 0x6B||SN name||length of SN name||RAND-||length of RAND||XRES||length of XRES).

For example, KDF=HMAC-SHA-256 (Key, S), where HMAC denotes hash-based message authentication code, and where SHA denotes secure hash algorithm.

For another example, if the 5G EAP-AKA' authentication is performed, a 5G EAP-AKA' authentication vector (RAND, AUTN, CK', IK', XRES) is calculated based on the authentication vector quintet (RAND, AUTN, CK, IK, XRES).

RAND in the 5G EAP-AKA' authentication vector is equal to RAND in the authentication vector quintet.

AUTN in the 5G EAP-AKA' authentication vector is equal to AUTN in the authentication vector quintet.

XRES in the 5G EAP-AKA' authentication vector is equal to XRES in the authentication vector quintet.

CK'||K'=KDF (CK||IK, 0x20||SN name||length of SN name||SQN⊕AK||length of SQN⊕AK).

For example, Kausf is an upper 256-bit of the Extended Master Session Key (EMSK), and EMSK=MK[1152 . . . 1663], where:

Master Key (MK)=PRF' (IK'||CK', "EAP-AKA'"||SUPI);
PRF' (K, S)=T1|T2|T3|T4| . . . , where PRF denotes pseudorandom function;
T1=HMAC-SHA-256 (K, S|0x01);
T2=HMAC-SHA-256 (K, T1|S|0x02);
T3=HMAC-SHA-256 (K, T2|S|0x03); and
T4=HMAC-SHA-256 (K, T3|S|0x04).

The SUPI is obtained by the AMF from the SUCI.

The AMF may further calculate a key Kseaf.

For example, Kseaf=KDF (Kausf, 0x6C||SN name||length of SN name).

The calculation of the key Kseaf may alternatively be performed after step 307.

305: The AMF sends an authentication request to the UE, where the authentication request carries AUTN/RAND included in the 5G authentication vector.

306: After receiving the authentication request from the AMF, the UE may authenticate a network based on received AUTN. If an authentication mode is 5G AKA authentication and the authentication succeeds, the UE adds calculated RES* to an authentication response to be sent to the AMF, where the UE calculates RES* in a same manner as the AMF calculates XRES*. If the authentication mode is 5G EAP-AKA' authentication and the authentication succeeds, the UE adds calculated RES to the authentication response to be sent to the AMF, where the UE calculates RES in a same manner as the AMF calculates XRES.

307: After receiving the authentication response from the UE, the AMF performs authentication on a result (RES* or RES) returned by the UE, to be more specific, performs 5G AKA authentication or 5G EAP-AKA' authentication.

In the solution in this embodiment, the HSS/HLR may calculate, based on an indication of the visited network, an authentication vector quintet that meets a 5G authentication requirement. This brings almost no change to the UE, and further reduces implementation costs of the solution.

FIG. 3B is a schematic flowchart of another communication method according to an embodiment of this application. The communication method shown in FIG. 3B may be implemented based on the network architecture shown in FIG. 1E. The other communication method may include the following steps.

301b: A UE sends a registration request to an AMF. The registration request may carry a SUCI of the UE.

302b: The AMF sends a first request that carries an authentication vector request indication to an HSS/HLR after receiving the registration request from the UE, where the authentication vector request indication is used to request an authentication vector.

The first request may further carry the SUCI of the UE.

The authentication vector request indication includes, for example, one or more of the following: an access network type identifier, a requesting node identifier, or an authentication management field modification identifier.

An access network type indicated by the access network type identifier is a 5G access network, an authentication management field modification manner indicated by the authentication management field modification identifier is setting a $0^{th}$ bit of an authentication management field in an authentication vector quintet to 1, or a node that requests an authentication vector and that is indicated by the requesting node identifier is one or more of the AMF, an AUSF, an MME, an AAA-server, an IWF, an SGSN, or an authentication proxy network element.

303b: The HSS/HLR sets a $0^{th}$ bit of the AMF in the authentication vector quintet to 1 based on the authentication vector request indication after receiving the first request from the AMF, and sends a response to the first request to the AMF, where the response to the first request carries the authentication vector quintet.

When the first request carries the SUCI of the UE, the HSS/HLR may decrypt the SUCI to obtain the SUPI.

304b: The AMF receives the response to the first request, obtains the authentication vector quintet carried in the response to the first request, and generates a 5G authentication vector for the UE based on the authentication vector quintet.

The AMF may determine to perform 5G AKA authentication or 5G EAP-AKA' authentication according to a local policy.

Alternatively, the response to the first request further carries an authentication mode indication, and the authentication mode indication is used to indicate 5G AKA authentication or 5G EAP-AKA' authentication. The AMF may determine, based on the authentication mode indication carried in the response to the first request, to perform 5G AKA authentication or 5G EAP-AKA' authentication. For example, when the authentication mode indication indicates 5G EAP-AKA' authentication, the AMF determines to perform the 5G EAP-AKA' authentication on the UE; and when the authentication mode indication indicates 5G AKA authentication, the AMF determines to perform the 5G AKA authentication on the UE.

For example, if the 5G AKA authentication is performed, a 5G AKA authentication vector (RAND, AUTN, Kausf, XRES*) is calculated based on the authentication vector quintet (RAND, AUTN, CK, IK, XRES).

RAND in the 5G AKA authentication vector is equal to RAND in the authentication vector quintet.

AUTN in the 5G AKA authentication vector is equal to AUTN in the authentication vector quintet.

Kausf in the 5G AKA authentication vector is equal to KDF 0x6A∥SN name∥length of SN name∥SQN⊕AK∥length of SQN⊕AK).

XRES* in the 5G AKA authentication vector is equal to KDF 0x6B∥SN name∥length of SN name∥RAND∥length of RAND∥XRES∥length of XRES).

For example, KDF=HMAC-SHA-256 (Key, S).

For another example, if the 5G EAP-AKA' authentication is performed, a 5G EAP-AKA' authentication vector (RAND, AUTN, CK', IK', XRES) is calculated based on the authentication vector quintet (RAND, AUTN, CK, IK, XRES).

RAND in the 5G EAP-AKA' authentication vector is equal to RAND in the authentication vector quintet.

AUTN in the 5G EAP-AKA' authentication vector is equal to AUTN in the authentication vector quintet.

XRES in the 5G EAP-AKA' authentication vector is equal to XRES in the authentication vector quintet.

CK'∥IK'=KDF (CK∥IK, 0x20∥SN name∥length of SN name∥SQN⊕AK∥length of SQN⊕AK).

For example, Kausf is an upper 256-bit of the EMSK, and EMSK=MK[1152 . . . 1663], where:

MK=PRF' (IK'∥CK', "EAP-AKA"∥SUPI);
PRF' (K, S)=T1∣T2∣T3∣T4∣ . . . ;
T1=HMAC-SHA-256 (K, S∣0x01);
T2=HMAC-SHA-256 (K, T1∣S∣0x02);
T3=HMAC-SHA-256 (K, T2∣S∣0x03); and
T4=HMAC-SHA-256 (K, T3∣S∣0x04).

The SUPI is obtained by the AMF or the HSS by decrypting the SUCI.

The AMF may further calculate a key (Kseaf).

For example, Kseaf=KDF (Kausf, 0x6C∥SN name∥length of SN name).

The calculation of the key Kseaf may alternatively be performed after step 307b.

305b: The AMF sends an authentication request to the UE, where the authentication request carries AUTN/RAND included in the 5G authentication vector.

306b: After receiving the authentication request from the AMF, the UE may authenticate a network based on received AUTN. If an authentication mode is 5G AKA authentication and the authentication succeeds, the UE adds calculated RES* to an authentication response to be sent to the AMF, where the UE calculates RES* in a same manner as the AMF calculates XRES*. If the authentication mode is 5G EAP-AKA' authentication and the authentication succeeds, the UE adds calculated RES to the authentication response to be sent to the AMF, where the UE calculates RES in a same manner as the AMF calculates XRES.

307b: After receiving the authentication response from the UE, the AMF performs authentication on a result (RES* or RES) returned by the UE, to be more specific, performs 5G AKA authentication or 5G EAP-AKA' authentication.

In the solution in this embodiment, the HSS/HLR may calculate, based on an indication of the AMF, an authentication vector quintet that meets a 5G authentication requirement. This brings almost no change to the UE, and further reduces implementation costs of the solution.

FIG. 4A is a schematic flowchart of another communication method according to an embodiment of this application. The communication method shown in FIG. 4A may be implemented based on the network architecture shown in FIG. 1C or FIG. 1D. Different from the embodiment corresponding to FIG. 3A, in this embodiment, a third core network device (in this embodiment, an example in which the third core network device is an IWF is used) is introduced to calculate and authenticate a 5G authentication vector, where the IWF may be deployed in a visited network, or may be deployed in a home network. If the IWF is deployed in the visited network, the IWF may alternatively be replaced with an AUSF, an authentication proxy network element, or another newly added network element.

As shown in FIG. 4A, the other communication method may include the following steps.

401: A UE sends a registration request to an AMF in the visited network, where the registration request may carry an SUCI of the UE protected using a null scheme.

402: The AMF sends a user authentication request to the IWF.

403: The IWF sends a first request that carries an authentication vector request indication to an HSS/HLR in a home domain, where the authentication vector request indication is used to request an authentication vector.

The authentication vector request indication includes, for example, one or more of the following: an access network type identifier, a requesting node identifier, or an authentication management field modification identifier.

An access network type indicated by the access network type identifier is a 5G access network, an authentication management field modification manner indicated by the authentication management field modification identifier is setting a $0^{th}$ bit of an authentication management field in an authentication vector quintet to 1, or a node that requests an authentication vector and that is indicated by the requesting node identifier is one or more of the AMF, an AUSF, an MME, an AAA-server, the IWF, an SGSN, or an authentication proxy network element.

404: After receiving the first request from the IWF, the HSS/HLR sets a $0^{th}$ bit of the AMF in the authentication vector quintet to 1 based on the authentication vector request indication, and sends a response to the first request to the IWF, where the response to the first request carries the authentication vector quintet in which the $0^{th}$ bit of the AMF is set to 1.

405: After receiving the response to the first request, the IWF obtains the authentication vector quintet carried in the response to the first request, and generates a 5G authentication vector for the UE based on the authentication vector quintet.

The IWF may determine to perform 5G AKA authentication or 5G EAP-AKA' authentication according to a local policy.

Optionally, the response to the first request further carries an authentication mode indication, and the authentication mode indication is used to indicate 5G AKA authentication or 5G EAP-AKA' authentication. The IWF may alternatively determine, based on the authentication mode indication carried in the response to the first request, to perform 5G AKA authentication or 5G EAP-AKA' authentication. For example, when the authentication mode indication indicates 5G EAP-AKA' authentication, the IWF determines to perform the 5G EAP-AKA' authentication on the UE; and when the authentication mode indication indicates 5G AKA authentication, the IWF determines to perform the 5G AKA authentication on the UE.

For example, if the 5G AKA authentication is performed, a 5G AKA authentication vector (RAND, AUTN, Kausf, XRES*) is calculated based on the authentication vector quintet (RAND, AUTN, CK, IK, XRES).

RAND in the 5G AKA authentication vector is equal to RAND in the authentication vector quintet.

AUTN in the 5G AKA authentication vector is equal to AUTN in the authentication vector quintet.

Kausf in the 5G AKA authentication vector is equal to KDF (CK∥IK, 0x6A∥SN name∥length of SN name∥SQN⊕AK∥length of SQN⊕AK).

XRES* in the 5G AKA authentication vector is equal to KDF (CK∥IK, 0x6B∥SN name∥length of SN name∥RAND∥length of RAND∥XRES∥length of XRES).

For example, KDF=HMAC-SHA-256 (Key, S).

For another example, if the EAP-AKA' authentication is performed, a 5G EAP-AKA' authentication vector (RAND, AUTN, CK', IK', XRES) is calculated based on the authentication vector quintet (RAND, AUTN, CK, IK, XRES).

RAND in the 5G EAP-AKA' authentication vector is equal to RAND in the authentication vector quintet.

AUTN in the 5G EAP-AKA' authentication vector is equal to AUTN in the authentication vector quintet.

XRES in the 5G EAP-AKA' authentication vector is equal to XRES in the authentication vector quintet.

CK'∥IK'=KDF (CK∥IK, 0x20∥SN name∥length of SN name∥SQN⊕AK∥length of SQN⊕AK).

For example, Kausf is an upper 256-bit of the EMSK, and EMSK=MK[1152 ... 1663]; where:

MK=PRF' (IK'∥CK', "EAP-AKA'"∥SUPI);
PRF' (K, S)=T1∣T2∣T3∣T4 ... ;

T1=HMAC-SHA-256 (K, S∣0x01);
T2=HMAC-SHA-256 (K, T1∣S∣0x02);
T3=HMAC-SHA-256 (K, T2∣S∣0x03); and
T4=HMAC-SHA-256 (K, T3∣S∣0x04).

The SUPI is obtained by the IWF from the SUCI.

The IWF may further calculate a key Kseaf.

For example, Kseaf=KDF (Kausf, 0x6C∥SN name∥length of SN name).

The calculation of the key Kseaf may alternatively be implemented after step 410.

406: The IWF sends a user authentication response to the AMF, where the user authentication response carries the 5G authentication vector.

407: The AMF sends an authentication request to the UE after receiving the user authentication response from the IWF, where the authentication request carries AUTN/RAND included in the 5G authentication vector.

408: After receiving the authentication request from the AMF, the UE may authenticate a network based on received AUTN. If an authentication mode is 5G AKA authentication and the authentication succeeds, the UE adds calculated RES* to an authentication response to be sent to the AMF, where the UE calculates RES* in a same manner as the AMF calculates XRES*. If the authentication mode is 5G EAP-AKA' authentication and the authentication succeeds, the UE adds calculated RES to the authentication response to be sent to the AMF, where the UE calculates RES in a same manner as the AMF calculates XRES.

409: After receiving the authentication response from the UE, the AMF forwards the authentication response from the UE to the IWF.

410: The IWF performs authentication on a result (RES* or RES) returned by the UE after receiving the authentication response from the UE that is forwarded by the AMF, to be more specific, performs 5G AKA authentication or 5G EAP-AKA' authentication.

411: The IWF feeds back an authentication result of the UE to the AMF.

In addition, optionally, the AMF may add the authentication vector request indication to the user authentication request, and the IWF forwards the user authentication request to the HSS/HLR. The IWF may be responsible for calculating the 5G authentication vector and a 5G security key using the authentication vector quintet. For 5G AKA authentication, the AMF may still perform HXRES* authentication, and the IWF completes XRES* authentication. For EAP-AKA' authentication, the IWF may complete XRES authentication. In other words, in the example procedure in FIG. 4A, some functions performed by the AMF may alternatively be performed by the IWF, and some functions performed by the IWF may alternatively be performed by the AMF.

In the solution in this embodiment, the IWF is introduced to be responsible for generating the 5G authentication vector and authenticating the UE. This helps reduce changes to the AMF.

FIG. 4B is a schematic flowchart of another communication method according to an embodiment of this application. The communication method shown in FIG. 4B may be implemented based on the network architecture shown in FIG. 1F. Different from the embodiment corresponding to FIG. 3B, in this embodiment, a third core network device is introduced to calculate and authenticate a 5G authentication vector (In this embodiment, an example in which the third core network device is an IWF is used). The IWF may alternatively be replaced with an AUSF, an authentication proxy network element, or another new network element.

As shown in FIG. 4B, the other communication method may include the following steps.

401b: A UE sends a registration request to an AMF, where the registration request may carry an SUCI of the UE.

402b: The AMF sends a user authentication request to the IWF.

403b: The IWF sends a first request that carries an authentication vector request indication to an HSS/HLR, where the authentication vector request indication is used to request an authentication vector.

The authentication vector request indication includes, for example, one or more of the following: an access network type identifier, a requesting node identifier, or an authentication management field modification identifier.

An access network type indicated by the access network type identifier is a 5G access network, an authentication management field modification manner indicated by the authentication management field modification identifier is setting a $0^{th}$ bit of an authentication management field in an authentication vector quintet to 1, or a node that requests an authentication vector and that is indicated by the requesting node identifier is one or more of the AMF, an AUSF, an MME, an AAA-server, the IWF, an SGSN, or the authentication proxy network element.

404b: After receiving the first request from the IWF, the HSS/HLR sets a $0^{th}$ bit of the AMF in the authentication vector quintet to 1 based on the authentication vector request indication, and sends a response to the first request to the IWF, where the response to the first request carries the authentication vector quintet in which the $0^{th}$ bit of the AMF is set to 1.

405b: After receiving the response to the first request, the IWF obtains the authentication vector quintet carried in the response to the first request, and generates a 5G authentication vector for the UE based on the authentication vector quintet.

The IWF may determine to perform 5G AKA authentication or 5G EAP-AKA' authentication according to a local policy.

Optionally, the response to the first request further carries an authentication mode indication, and the authentication mode indication is used to indicate 5G AKA authentication or 5G EAP-AKA' authentication. The IWF may alternatively determine, based on the authentication mode indication carried in the response to the first request, to perform 5G AKA authentication or 5G EAP-AKA' authentication. For example, when the authentication mode indication indicates 5G EAP-AKA' authentication, the IWF determines to perform the 5G EAP-AKA' authentication on the UE; and when the authentication mode indication indicates 5G AKA authentication, the IWF determines to perform the 5G AKA authentication on the UE.

For example, if the 5G AKA authentication is performed, a 5G AKA authentication vector (RAND, AUTN, Kausf, XRES*) is calculated based on the authentication vector quintet (RAND, AUTN, CK, IK, XRES).

RAND in the 5G AKA authentication vector is equal to RAND in the authentication vector quintet.

AUTN in the 5G AKA authentication vector is equal to AUTN in the authentication vector quintet.

Kausf in the 5G AKA authentication vector is equal to KDF (CK||IK, 0x6A||SN name||length of SN name||SQN⊕AK||length of SQN⊕AK).

XRES* in the 5G AKA authentication vector is equal to KDF (CK||IK, 0x6B||SN name||length of SN name||RAND-||length of RAND||XRES||length of XRES).

For example, KDF=HMAC-SHA-256 (Key, S).

For another example, if the EAP-AKA' authentication is performed, a 5G EAP-AKA' authentication vector (RAND, AUTN, CK', IK', XRES) is calculated based on the authentication vector quintet (RAND, AUTN, CK, IK, XRES).

RAND in the 5G EAP-AKA' authentication vector is equal to RAND in the authentication vector quintet.

AUTN in the 5G EAP-AKA' authentication vector is equal to AUTN in the authentication vector quintet.

XRES in the 5G EAP-AKA' authentication vector is equal to XRES in the authentication vector quintet.

CK'||IK'=KDF (CK||IK, 0x20||SN name||length of SN name||SQN⊕AK||length of SQN⊕AK).

For example, Kausf is an upper 256-bit of the EMSK, and EMSK=MK[1152 . . . 1663], where:

MK=PRF' (IK'||CK', "EAP-AKA'"||SUPI);

PRF' (K, S)=T1|T2|T3|T4| . . . ;

T1=HMAC-SHA-256 (K, S|0x01);

T2=HMAC-SHA-256 (K, T1|S|0x02);

T3=HMAC-SHA-256 (K, T2|S|0x03); and

T4=HMAC-SHA-256 (K, T3|S|0x04).

The SUPI may be obtained by the IWF or the HSS by decrypting the SUCI.

The IWF may further calculate a key Kseaf.

For example, Kseaf=KDF (Kausf, 0x6C||SN name||length of SN name).

The calculation of the key Kseaf may alternatively be implemented after step 410b.

406b: The IWF sends a user authentication response to the AMF, where the user authentication response carries the 5G authentication vector.

407b: The AMF sends an authentication request to the UE after receiving the user authentication response from the IWF, where the authentication request carries AUTN/RAND included in the 5G authentication vector.

408b: After receiving the authentication request from the AMF, the UE may authenticate a network based on received AUTN. If an authentication mode is 5G AKA authentication and the authentication succeeds, the UE adds calculated RES* to an authentication response to be sent to the AMF, where the UE calculates RES* in a same manner as the AMF calculates XRES*. If the authentication mode is 5G EAP-AKA' authentication and the authentication succeeds, the UE adds calculated RES to the authentication response to be sent to the AMF, where the UE calculates RES in a same manner as the AMF calculates XRES.

409b: After receiving the authentication response from the UE, the AMF forwards the authentication response from the UE to the IWF.

410b: The IWF performs authentication on a result (RES* or RES) returned by the UE after receiving the authentication response from the UE that is forwarded by the AMF, to be more specific, performs 5G AKA authentication or 5G EAP-AKA' authentication.

411b: The IWF feeds back an authentication result of the UE to the AMF.

In addition, optionally, the AMF may add the authentication vector request indication to the user authentication request, and the IWF forwards the user authentication request to the HSS/HLR. The IWF may be responsible for calculating the 5G authentication vector and a 5G security key using the authentication vector quintet. For 5G AKA authentication, the AMF may still perform HXRES* authentication, and the IWF completes XRES* authentication. For EAP-AKA' authentication, the IWF may complete XRES authentication. In other words, in the example procedure in FIG. 4B, some functions performed by the AMF may alternatively be performed by the IWF, and some functions performed by the IWF may alternatively be performed by the AMF.

In the solution in this embodiment, the IWF is introduced to be responsible for generating the 5G authentication vector and authenticating the UE. This helps reduce changes to the AMF.

FIG. 5A is a schematic flowchart of another communication method according to an embodiment of this application. The communication method shown in FIG. 5A may be implemented based on the network architecture shown in FIG. 1B. The other communication method may include the following steps.

501: A UE sends a registration request to an AMF in a visited network, where the registration request may carry an SUCI of the UE protected using, for example, a null scheme.

502: After receiving the registration request from the UE, the AMF sends a second request (a user authentication request or an authentication data request) that carries an authentication vector request indication to an HSS/HLR in a home network, where the authentication vector request indication is used to request an authentication vector. The authentication vector request indication may indicate that a 4G EAP-AKA' authentication vector or a 4G AKA authentication vector is required.

The authentication vector request indication includes, for example, one or more of the following: an access network type identifier, a requesting node identifier, or an authentication management field modification identifier.

An access network type indicated by the access network type identifier is a 5G access network. A node that requests an authentication vector and that is indicated by the requesting node identifier is one or more of the AMF, an AUSF, an MME, an AAA-server, an IWF, an SGSN, or an authentication proxy network element.

In addition, optionally, if the AMF determines, according to a local policy, that the 4G-AKA authentication vector is required, the AMF sends the second request to the HSS/HLR through an S6a interface; if the AMF determines that the 4G EAP-AKA' vector is required, the AMF sends the second request to the HSS/HLR through an SWx interface. The HSS/HLR determines a 4G authentication vector required by the AMF based on a type of an interface through which a message is received.

503: After receiving the second request from the AMF in the visited network, the HSS/HLR generates a 4G authentication vector based on the authentication vector request indication or an interface through which the second request is received, and sends a response to the second request to the AMF, where the response to the second request carries the 4G authentication vector.

The HSS may determine and deliver the 4G-AKA authentication vector or the EAP-AKA' authentication vector based on the authentication vector request indication, the interface through which the request is received, or the local policy.

For example, the HSS/HLR device determines, based on the authentication vector request indication, that the 4G authentication vector for the user equipment is the 4G AKA authentication vector or the 4G EAP-AKA' authentication vector. Alternatively, the HS S/HLR may determine, based on the interface through which the second request is received, that the 4G authentication vector for the user equipment is the 4G AKA authentication vector or the 4G EAP-AKA' authentication vector.

The 4G authentication vector is used to generate a 5G authentication vector for the user equipment. The 5G authentication vector is, for example, the 5G EAP-AKA' authentication vector or the 5G AKA authentication vector. The 4G authentication vector is, for example, the 4G EAP-AKA' authentication vector or the 4G AKA authentication vector.

For example, if the authentication vector request indication indicates that the access network type is the 5G access network or the node that requests an authentication vector is the AMF, the AUSF, the IWF, or the authentication proxy, the first core network device may determine, according to the local policy, that the 4G authentication vector for the user equipment is the 4G AKA or the 4G EAP-AKA' authentication vector.

If the authentication vector request indication indicates that the node that requests an authentication vector is an MIME, the HSS/HLR may, for example, determine that the 4G authentication vector for the user equipment is the 4G AKA authentication vector.

If the authentication vector request indication indicates that the node that requests an authentication vector is the AAA-server, the HSS/HLR may, for example, determine that the 4G authentication vector for the user equipment is the 4G EAP-AKA' authentication vector.

If the HSS/HLR receives the second request from the S6a interface, for example, the HSS/HLR may determine that the 4G authentication vector for the user equipment is the 4G AKA authentication vector.

If the HSS/HLR receives the second request from the SWx interface, for example, the HSS/HLR may determine that the 4G authentication vector for the user equipment is the 4G EAP-AKA' authentication vector.

Certainly, a manner in which the HSS/HLR determines, based on the authentication vector request indication, that the 4G authentication vector for the user equipment is the 4G AKA authentication vector or the 4G EAP-AKA' authentication vector is not limited to the foregoing example manners.

Optionally, the response to the second request may further carry a vector mapping indication (indicator), where the vector mapping indication is used to indicate to map the 4G authentication vector to the 5G authentication vector.

Optionally, the response to the second request may further carry an authentication mode indication, and the authentication mode indication is used to indicate 5G AKA authentication or 5G EAP-AKA' authentication. Alternatively, if 4G authentication can be performed, the response to the second request may further carry a delivered authentication mode indication (indicator), which is used to indicate the UE to perform 4G AKA authentication or 4G EAP-AKA' authentication.

504: After obtaining the 4G authentication vector, the AMF may determine, according to the local policy or the authentication mode indication delivered by the HSS, to perform 5G AKA authentication or 5G EAP-AKA' authentication.

For example, the AMF maps the 4G authentication vector to the 5G authentication vector.

A. If 5G AKA authentication is performed, the AMF derives CK||IK using an access security management entity (ASME) key (Kasme), or CK'||IK' and another parameter, and then calculates XRES*, Kausf, and Kseaf.

For example, CK||IK=KDF (Kasme or CK'||IK', SN name).

Optionally, the AMF derives Kausf using Kasme, or CK'||IK' and another parameter, and then calculates XRES*, Kausf, and Kseaf, where CK||IK can also be replaced with Kausf during derivation of XRES*.

For example, Kausf=KDF (Kasme or CK'||IK', SN name).

B. If 5G EAP-AKA' authentication is performed, the AMF derives CK'||IK' using Kasme, or CK'||IK' and another parameter, and then calculates Kausf and Kseaf.

For example, Kausf=KDF (Kasme or CK'||IK', SN name).

Optionally, the AMF derives Kausf using Kasme, or CK'||IK' and another parameter, and then calculates Kseaf.

For example, Kausf=KDF (Kasme or CK'||IK', SN name).

Derivation of the 5G security key may be performed after 508.

C. If it is determined to perform 4G AKA authentication or 4G EAP-AKA' authentication, XRES, and Kasme or CK'||IK' may be stored.

505: The AMF sends, to the UE, an authentication request that carries the 4G authentication vector, and may carry the vector mapping indication. The vector mapping indication may be from the HSS/HLR, or may be generated by the AMF, and the vector mapping indication is used to indicate the UE to map the 4G authentication vector to the 5G authentication vector.

Optionally, the AMF also delivers AUTN and XRES using the authentication request, and further carries the authentication mode indication. The authentication mode indication may be from the HSS/HLR, or may be generated by the AMF, and the authentication mode indication is used to indicate the UE to perform 4G authentication (for example, perform 4G AKA authentication or 4G EAP-AKA' authentication).

506: The UE calculates an authentication vector in a 4G manner, to obtain Kasme, IK', or CK', and then derives the 5G authentication vector and the key in a same key derivation manner as the AMF.

Optionally, the UE performs 4G authentication or 5G authentication based on the indication.

507: The UE sends an authentication response that carries RES/RES* to the AMF.

508: The AMF performs 4G authentication or 5G authentication on the UE, and may derive a related security key in the same key derivation manner as the UE.

For example, the AMF compares RES received from the UE with stored XRES. If authentication succeeds, the AMF continues a subsequent procedure and uses a 4G key to protect communication between the AMF and the UE.

In the solution in this embodiment of this application, the UE and the AMF maps the 4G authentication vector to the 5G authentication vector for an authentication context and the key, such that changes to the HSS/HLR are minimized.

FIG. 5B is a schematic flowchart of another communication method according to an embodiment of this application. The communication method shown in FIG. 5B may be implemented based on the network architecture shown in FIG. 1E. The other communication method may include the following steps.

501b: A UE sends a registration request to an AMF, where the registration request may carry an SUCI of the UE.

502b: After receiving the registration request from the UE, the AMF sends a second request (a user authentication request or an authentication data request) that carries an authentication vector request indication to an HSS/HLR, where the authentication vector request indication is used to request an authentication vector. The authentication vector request indication may indicate that a 4G EAP-AKA' authentication vector or a 4G AKA authentication vector is required.

The authentication vector request indication includes, for example, one or more of the following: an access network type identifier, a requesting node identifier, or an authentication management field modification identifier.

An access network type indicated by the access network type identifier is a 5G access network. A node that requests an authentication vector and that is indicated by the requesting node identifier is one or more of the AMF, an AUSF, an MME, an AAA-server, an IWF, an SGSN, or an authentication proxy network element.

In addition, optionally, if the AMF determines, according to a local policy, that the 4G-AKA authentication vector is required, the AMF sends the second request to the HSS/HLR through an S6a interface; if the AMF determines that the 4G EAP-AKA' vector is required, the AMF sends the second request to the HSS/HLR through an SWx interface. The HSS/HLR determines a 4G authentication vector required by the AMF based on a type of an interface through which a message is received.

503b: After receiving the second request from the AMF, the HSS/HLR generates a 4G authentication vector based on the authentication vector request indication or the interface through which the second request is received, and sends a response to the second request to the AMF, where the response to the second request carries the 4G authentication vector.

The HSS may determine and deliver the 4G-AKA authentication vector or the EAP-AKA' authentication vector based on the authentication vector request indication, the interface through which the request is received, or the local policy.

For example, the HSS/HLR device determines, based on the authentication vector request indication, that the 4G authentication vector for the user equipment is the 4G AKA authentication vector or the 4G EAP-AKA' authentication vector. Alternatively, the HSS/HLR may determine, based on the interface through which the second request is received, that the 4G authentication vector for the user equipment is the 4G AKA authentication vector or the 4G EAP-AKA' authentication vector.

The 4G authentication vector is used to generate a 5G authentication vector for the user equipment. The 5G authentication vector is, for example, a 5G EAP-AKA' authentication vector or a 5G AKA authentication vector. The 4G authentication vector is, for example, the 4G EAP-AKA' authentication vector or the 4G AKA authentication vector.

For example, if the authentication vector request indication indicates that the access network type is the 5G access network or the node that requests an authentication vector is the AMF, the AUSF, the IWF, or the authentication proxy, the first core network device may determine, according to a local policy, that the 4G authentication vector for the user equipment is the 4G AKA authentication vector or the 4G EAP-AKA' authentication vector.

If the authentication vector request indication indicates that the node that requests an authentication vector is the MME, the HSS/HLR may, for example, determine that the 4G authentication vector for the user equipment is the 4G AKA authentication vector.

If the authentication vector request indication indicates that the node that requests an authentication vector is the AAA-server, the HSS/HLR device may, for example, determine that the 4G authentication vector for the user equipment is the 4G EAP-AKA' authentication vector.

If the HSS/HLR receives the second request from the S6a interface, for example, the HSS/HLR may determine that the 4G authentication vector for the user equipment is the 4G AKA authentication vector.

If the HSS/HLR receives the second request from the SWx interface, for example, the HSS/HLR may determine that the 4G authentication vector for the user equipment is the 4G EAP-AKA' authentication vector.

Certainly, a manner in which the HSS/HLR determines, based on the authentication vector request indication, that the 4G authentication vector for the user equipment is the 4G AKA authentication vector or the 4G EAP-AKA' authentication vector is not limited to the foregoing example manners.

Optionally, the response to the second request may further carry a vector mapping indication (indicator), where the vector mapping indication is used to indicate to map the 4G authentication vector to the 5G authentication vector.

Optionally, the response to the second request may further carry an authentication mode indication, and the authentication mode indication is used to indicate 5G AKA authentication or 5G EAP-AKA' authentication. Alternatively, if 4G authentication can be performed, the response to the second request may further carry a delivered authentication mode indication (indicator), which is used to indicate the UE to perform 4G AKA authentication or 4G EAP-AKA' authentication.

504b: After obtaining the 4G authentication vector, the AMF may determine, according to the local policy or the authentication mode indication delivered by the HSS, to perform 5G AKA authentication or 5G EAP-AKA' authentication.

For example, the AMF maps the 4G authentication vector to the 5G authentication vector.

A. If 5G AKA authentication is performed, the AMF derives CK∥IK using Kasme, or CK'∥IK' and another parameter, and then calculates XRES*, Kausf, and Kseaf.

For example, CK∥IK=KDF (Kasme or CK'∥IK', SN name).

Optionally, the AMF derives Kausf using Kasme, or CK'∥IK' and another parameter, and then calculates XRES*, Kausf, and Kseaf, where CK∥IK can also be replaced with Kausf during derivation of XRES*.

For example, Kausf=KDF (Kasme or CK'∥IK', SN name).

B. If 5G EAP-AKA' authentication is performed, the AMF derives CK'∥IK' using Kasme, or CK'∥IK' and another parameter, and then calculates Kausf and Kseaf.

For example, CK'∥IK'=KDF (Kasme or CK'∥IK', SN name).

Optionally, the AMF derives Kausf using Kasme, or CK'∥IK' and another parameter, and then calculates Kseaf.

For example, Kausf=KDF (Kasme or CK'∥IK', SN name).

Derivation of the 5G security key may be performed after 508b.

C. If it is determined to perform 4G AKA authentication or 4G EAP-AKA' authentication, XRES, and Kasme or CK'∥IK' may be stored.

505b: The AMF sends, to the UE, an authentication request that carries the 4G authentication vector, and may carry the vector mapping indication. The vector mapping indication may be from the HSS/HLR, or may be generated by the AMF, and the vector mapping indication is used to indicate the UE to map the 4G authentication vector to the 5G authentication vector.

Optionally, the AMF also delivers AUTN and XRES using the authentication request, and further carries the authentication mode indication. The authentication mode indication may be from the HSS/HLR, or may be generated by the AMF, and the authentication mode indication is used to indicate the UE to perform 4G authentication (for example, perform 4G AKA authentication or 4G EAP-AKA' authentication).

506b: The UE calculates an authentication vector in a 4G manner, to obtain Kasme, IK', or CK', and then derives the 5G authentication vector and the key in a same manner as the AMF.

Optionally, the UE performs 4G authentication or 5G authentication based on the indication.

507b: The UE sends an authentication response that carries RES/RES* to the AMF.

508b: The AMF performs 4G authentication or 5G authentication on the UE, and may derive a related security key in the same key derivation manner as the UE.

For example, the AMF compares RES received from the UE with stored XRES. If authentication succeeds, the AMF continues a subsequent procedure and uses a 4G key to protect communication between the AMF and the UE.

In the solution in this embodiment, the UE and the AMF maps the 4G authentication vector to the 5G authentication vector for an authentication context and the key, such that changes to the HSS/HLR are minimized.

FIG. 6A is a schematic flowchart of another communication method according to an embodiment of this application. The communication method shown in FIG. 6A may be implemented based on the network architecture shown in FIG. 1C or FIG. 1D. Different from the embodiment corresponding to FIG. 5A, in this embodiment, a third core network device (in this embodiment, an example in which the third core network device is an IWF is used) is introduced to calculate and authenticate a 5G authentication vector, where the IWF may be deployed in a visited network, or may be deployed in a home network. If the IWF is deployed in the visited network, the IWF may alternatively be replaced with an AUSF, an authentication proxy network element, or another newly added network element.

As shown in FIG. 6A, the other communication method may include the following steps.

601: A UE initiates a registration request to the visited network, where the registration request carries an SUCI of the UE protected using a null scheme.

602: An AMF sends a user authentication request to the IWF after receiving the registration request from the UE.

603: After receiving the user authentication request from the AMF, the IWF sends a second request (the user authentication request or an authentication data request) that carries an authentication vector request indication to an HSS/HLR in a home domain, where the authentication vector request indication is used to request an authentication vector.

The authentication vector request indication includes, for example, one or more of the following: an access network type identifier, a requesting node identifier, or an authentication management field modification identifier.

An access network type indicated by the access network type identifier is a 5G access network. A node that requests an authentication vector and that is indicated by the requesting node identifier is one or more of the AMF, an AUSF, an MME, an AAA-server, the IWF, an SGSN, or an authentication proxy network element.

In addition, optionally, according to the local policy, if the IWF determines that a 4G-AKA vector is required, the IWF sends the second request from an S6a interface; or if the IWF determines that an EAP-AKA' vector is required, the IWF sends the second request from an SWx interface.

604: An HSS/HLR generates a 4G authentication vector based on the authentication vector request indication or an interface through which the second request is received, and sends a response to the second request to the IWF, where the response to the second request carries the 4G authentication vector.

The HSS may determine and deliver the 4G-AKA authentication vector or the EAP-AKA' authentication vector based on the authentication vector request indication, the interface through which the request is received, or the local policy.

For example, the HSS/HLR device determines, based on the authentication vector request indication, that the 4G authentication vector for the user equipment is the 4G AKA authentication vector or the 4G EAP-AKA' authentication vector. Alternatively, the HS S/HLR may determine, based on the interface through which the second request is received, that the 4G authentication vector for the user equipment is the 4G AKA authentication vector or the 4G EAP-AKA' authentication vector.

The 4G authentication vector is used to generate a 5G authentication vector for the user equipment, and the 5G authentication vector is, for example, a 5G EAP-AKA' authentication vector or a 5G AKA authentication vector. The 4G authentication vector is, for example, the 4G EAP-AKA' authentication vector or the 4G AKA authentication vector.

For example, if the authentication vector request indication indicates that the access network type is the 5G access network or the node that requests an authentication vector is the AMF, the AUSF, the IWF, or the authentication proxy, the first core network device may determine, according to the local policy, that the 4G authentication vector for the user equipment is the 4G AKA authentication vector or the 4G EAP-AKA' authentication vector.

If the authentication vector request indication indicates that the node that requests an authentication vector is the MME, the HSS/HLR may, for example, determine that the 4G authentication vector for the user equipment is the 4G AKA authentication vector.

If the authentication vector request indication indicates that the node that requests an authentication vector is the AAA-server, the HSS/HLR device may, for example, determine that the 4G authentication vector for the user equipment is the 4G EAP-AKA' authentication vector.

If the HSS/HLR receives the second request from the S6a interface, for example, the HSS/HLR may determine that the 4G authentication vector for the user equipment is the 4G AKA authentication vector.

If the HSS/HLR receives the second request from the SWx interface, for example, the HSS/HLR may determine that the 4G authentication vector for the user equipment is the 4G EAP-AKA' authentication vector.

Certainly, a manner in which the HSS/HLR determines, based on the authentication vector request indication, that the 4G authentication vector for the user equipment is the 4G AKA authentication vector or the 4G EAP-AKA' authentication vector is not limited to the foregoing example manners.

Optionally, the response to the second request further carries an authentication mode indication, and the authentication mode indication is used to indicate the UE to perform 5G AKA authentication or 5G EAP-AKA' authentication.

Optionally, the response to the second request may further carry a vector mapping indication (indicator), where the vector mapping indication is used to indicate to map the 4G authentication vector to the 5G authentication vector.

Optionally, if 4G authentication can be performed, the response to the second request may further carry a delivered authentication mode indication (indicator), which is used to indicate the UE to perform 4G AKA authentication or 4G EAP-AKA' authentication.

605: After obtaining the 4G authentication vector, the IWF may determine, according to the local policy or the indication of the HSS, to perform 5G AKA authentication or 5G EAP-AKA' authentication.

For example, the AMF maps the 4G authentication vector to the 5G authentication vector.

A. If 5G AKA authentication is performed, the AMF derives CK||IK using Kasme, or CK'||IK' and another parameter, and then calculates XRES*, Kausf, and Kseaf.

For example, CK||IK=KDF (Kasme or CK'||IK', SN name).

Optionally, the AMF derives Kausf using Kasme, or CK'||IK' and another parameter, and then calculates XRES*, Kausf, and Kseaf, where CK||IK is replaced with Kausf during derivation of XRES*.

For example, Kausf=KDF (Kasme or CK'||IK', SN name).

B. If EAP-AKA' authentication is performed, the AMF derives CK'||IK' using Kasme, or CK'||IK' and another parameter, and then calculates Kausf and Kseaf.

For example, CK'||IK'=KDF (Kasme or CK'||IK', SN name).

Optionally, the AMF derives Kausf using Kasme, or CK'||IK' and another parameter, and then calculates Kseaf.

For example, Kausf=KDF (Kasme or CK'||IK', SN name).

Alternatively, the key derivation may be performed until step 609.

C. If it is determined to perform 4G AKA authentication or 4G EAP-AKA' authentication, XRES, and Kasme or CK'||IK' may be stored.

606: The IWF sends the user authentication response that carries the 5G authentication vector/4G authentication vector to the AMF.

607: The AMF sends, to the UE, an authentication request that carries the 4G authentication vector, and may carry the vector mapping indication, where the vector mapping indication may be from the HSS/HLR, or may be generated by the AMF. The vector mapping indication is used to indicate the UE to map the 4G authentication vector to a 5G authentication vector.

Optionally, the AMF also delivers AUTN and XRES using the authentication request, and further carries the authentication mode indication. The authentication mode indication may be from the HSS/HLR, or may be generated by the AMF, and the authentication mode indication is used to indicate the UE to perform 4G authentication (for example, perform 4G AKA authentication or 4G EAP-AKA' authentication).

608: The UE calculates an authentication vector in a 4G manner, to obtain Kasme, IK', or CK', and then derives the 5G authentication vector and the key in a same manner as the AMF.

Optionally, the UE performs 4G authentication or 5G authentication based on the indication.

609: The UE sends an authentication response that carries RES/RES* to the AMF.

610: The AMF sends the authentication response that carries RES/RES* to the IWF.

611: The IWF performs 4G authentication or 5G authentication on the UE, and may derive a related security key in the same key derivation manner as the UE.

For example, the IWF compares RES received from the UE with stored XRES. If authentication succeeds, the IWF continues a subsequent procedure and uses a 4G key to protect communication between the IWF and the UE.

612: The IWF sends an authentication result of the UE to the AMF.

In the solution in this embodiment, the IWF is introduced to be responsible for mapping an authentication context and the key, and authenticating the UE. This helps reduce changes to the AMF.

FIG. 6B is a schematic flowchart of another communication method according to an embodiment of this application. The communication method shown in FIG. 6B may be implemented based on the network architecture shown in FIG. 1F. Different from the embodiment corresponding to FIG. 5B, in this embodiment, a third core network device (in this embodiment, an example in which the third core network device is an IWF is used) is introduced to calculate and authenticate a 5G authentication vector, where the IWF may alternatively be replaced with an AUSF, an authentication proxy network element, or another newly added network element.

As shown in FIG. 6B, the other communication method may include the following steps.

601b: A UE initiates a registration request to an AMF, where the registration request carries an SUCI of the UE.

602b: The AMF sends a user authentication request to the IWF after receiving the registration request from the UE.

603b: After receiving the user authentication request from the AMF, the IWF sends a second request (the user authentication request or an authentication data request) that carries an authentication vector request indication to an HSS/HLR, where the authentication vector request indication is used to request an authentication vector.

The authentication vector request indication includes, for example, one or more of the following: an access network type identifier, a requesting node identifier, or an authentication management field modification identifier.

An access network type indicated by the access network type identifier is a 5G access network. A node that requests an authentication vector and that is indicated by the requesting node identifier is one or more of the AMF, an AUSF, an MME, an AAA-server, the IWF, an SGSN, or the authentication proxy network element.

In addition, optionally, according to a local policy, if the IWF determines that a 4G-AKA vector is required, the IWF sends the second request from an S6a interface; or if the IWF determines that an EAP-AKA' vector is required, the IWF sends the second request from an SWx interface.

604b: The HSS/HLR generates a 4G authentication vector based on the authentication vector request indication or an interface through which the second request is received, and sends a response to the second request to the IWF, where the response to the second request carries the 4G authentication vector.

The HSS may determine and deliver the 4G-AKA authentication vector or the EAP-AKA' authentication vector based on the authentication vector request indication, the interface through which the request is received, or the local policy.

For example, the HSS/HLR device determines, based on the authentication vector request indication, that the 4G authentication vector for the user equipment is the 4G AKA authentication vector or the 4G EAP-AKA' authentication vector. Alternatively, the HS S/HLR may determine, based on the interface through which the second request is received, that the 4G authentication vector for the user equipment is the 4G AKA authentication vector or the 4G EAP-AKA' authentication vector.

The 4G authentication vector is used to generate a 5G authentication vector for the user equipment, and the 5G authentication vector is, for example, a 5G EAP-AKA' authentication vector or a 5G AKA authentication vector.

The 4G authentication vector is, for example, the 4G EAP-AKA' authentication vector or the 4G AKA authentication vector.

For example, if the authentication vector request indication indicates that the access network type is the 5G access network or the node that requests an authentication vector is the AMF, the AUSF, the IWF, or the authentication proxy, the first core network device may determine, according to the local policy, that the 4G authentication vector for the user equipment is the 4G AKA authentication vector or the 4G EAP-AKA' authentication vector.

If the authentication vector request indication indicates that the node that requests an authentication vector is the MIME, the HSS/HLR may, for example, determine that the 4G authentication vector for the user equipment is the 4G AKA authentication vector.

If the authentication vector request indication indicates that the node that requests an authentication vector is the AAA-server, the HSS/HLR device may, for example, determine that the 4G authentication vector for the user equipment is the 4G EAP-AKA' authentication vector.

If the HSS/HLR receives the second request from the S6a interface, for example, the HSS/HLR may determine that the 4G authentication vector for the user equipment is the 4G AKA authentication vector.

If the HSS/HLR receives the second request from the SWx interface, for example, the HSS/HLR may determine that the 4G authentication vector for the user equipment is the 4G EAP-AKA' authentication vector.

Certainly, a manner in which the HSS/HLR determines, based on the authentication vector request indication, that the 4G authentication vector for the user equipment is the 4G AKA authentication vector or the 4G EAP-AKA' authentication vector is not limited to the foregoing example manners.

Optionally, the response to the second request further carries an authentication mode indication, and the authentication mode indication is used to indicate the UE to perform 5G AKA authentication or 5G EAP-AKA' authentication.

Optionally, the response to the second request may further carry a vector mapping indication (indicator), where the vector mapping indication is used to indicate to map the 4G authentication vector to the 5G authentication vector.

Optionally, if 4G authentication can be performed, the response to the second request may further carry a delivered authentication mode indication (indicator), which is used to indicate the UE to perform 4G AKA authentication or 4G EAP-AKA' authentication.

605b: After obtaining the 4G authentication vector, the IWF may determine, according to the local policy or the indication of the HSS, to perform 5G AKA authentication or 5G EAP-AKA' authentication.

For example, the AMF maps the 4G authentication vector to the 5G authentication vector.

A. If 5G AKA authentication is performed, the AMF derives CK∥IK using Kasme, or CK'∥IK' and another parameter, and then calculates XRES*, Kausf, and Kseaf.

For example, CK∥IK=KDF (Kasme or CK'∥IK', SN name).

Optionally, the AMF derives Kausf using Kasme, or CK'∥IK' and another parameter, and then calculates XRES*, Kausf, and Kseaf, where CK∥IK is replaced with Kausf during derivation of XRES*.

For example, Kausf=KDF (Kasme or CK'∥IK', SN name).

B. If EAP-AKA' authentication is performed, the AMF derives CK'||IK' using Kasme, or CK'||IK' and another parameter, and then calculates Kausf and Kseaf.

For example, CK'||IK'=KDF (Kasme or CK'||IK', SN name).

Optionally, the AMF derives Kausf using Kasme, or CK'||IK' and another parameter, and then calculates Kseaf.

For example, Kausf=KDF (Kasme or CK'||IK', SN name).

Alternatively, the key derivation may be performed until step 609*b*.

C. If it is determined to perform 4G AKA authentication or 4G EAP-AKA' authentication, XRES, and Kasme or CK'||IK' may be stored.

606*b*: The IWF sends the user authentication response that carries the 5G authentication vector/4G authentication vector to the AMF.

607*b*: The AMF sends, to the UE, an authentication request that carries the 4G authentication vector, and may carry the vector mapping indication, where the vector mapping indication may be from the HSS/HLR, or may be generated by the AMF. The vector mapping indication is used to indicate the UE to map the 4G authentication vector to the 5G authentication vector.

Optionally, the AMF also delivers AUTN and XRES using the authentication request, and further carries the authentication mode indication. The authentication mode indication may be from the HSS/HLR, or may be generated by the AMF, and the authentication mode indication is used to indicate the UE to perform 4G authentication (for example, perform 4G AKA authentication or 4G EAP-AKA' authentication).

608*b*: The UE calculates an authentication vector in a 4G manner, to obtain Kasme, IK', or CK', and then derives the 5G authentication vector and the key in a same manner as the AMF.

Optionally, the UE performs 4G authentication or 5G authentication based on the indication.

609*b*: The UE sends an authentication response that carries RES/RES* to the AMF.

610*b*: The AMF sends the authentication response that carries RES/RES* to the IWF.

611*b*: The IWF performs 4G authentication or 5G authentication on the UE, and may derive a related security key in the same key derivation manner as the UE.

For example, the IWF compares RES received from the UE with stored XRES. If authentication succeeds, the IWF continues a subsequent procedure and uses a 4G key to protect communication between the IWF and the UE.

612*b*: The IWF sends an authentication result of the UE to the AMF.

In the solution in this embodiment, the IWF is introduced to be responsible for mapping an authentication context and the key, and authenticating the UE. This helps reduce changes to the AMF.

FIG. 7A is a schematic flowchart of another communication method according to an embodiment of this application. The communication method shown in FIG. 7A may be implemented based on the network architecture shown in FIG. 1B. The other communication method may include the following steps.

701: A UE initiates a registration request to a visited network, where the registration request carries an SUCI of the UE protected using a null scheme.

702: The AMF sends a third request (a user authentication request or an authentication data request) that carries an authentication vector request indication to an HSS/HLR in a home domain, where the authentication vector request indication is used to request an authentication vector.

The authentication vector request indication includes, for example, one or more of the following: an access network type identifier, a requesting node identifier, or an authentication management field modification identifier.

An access network type indicated by the access network type identifier is a 5G access network. A node that requests an authentication vector and that is indicated by the requesting node identifier is one or more of the AMF, an AUSF, an IWF, an SGSN, or an authentication proxy network element.

703: The HSS/HLR generates a 5G authentication vector based on the authentication vector request indication, and sends a response to the third request to the AMF, where the response to the third request carries the 5G authentication vector.

Optionally, the response to the third request further carries an authentication mode indication, and the authentication mode indication is used to indicate the UE to perform 5G AKA authentication or 5G EAP-AKA' authentication.

704: After obtaining the 5G authentication vector, the AMF may determine to perform 5G AKA authentication or EAP-AKA' authentication according to a local policy.

Optionally, an authentication mode may be selected based on the indication delivered by the HSS/HLR.

The AMF calculates a key Kseaf and obtains that Kseaf=KDF (Kausf, 0x6C||SN name||length of SN name).

Alternatively, the key derivation operation may be performed after authentication in 706.

705: The AMF sends an authentication request to the UE.

706: The UE authenticates a network based on AUTN carried in the received authentication request. If the authentication mode is 5G AKA authentication and the authentication succeeds, the UE calculates RES* and returns RES* to the network, where a manner of calculating RES* is the same as a manner of calculating XRES* by the AMF. If the authentication mode is EAP-AKA' authentication and the authentication succeeds, the UE calculates RES and returns RES to the network, where a manner of calculating RES is the same as a manner of calculating XRES by the AMF.

707: After receiving the authentication response from the UE, the AMF performs authentication on a result returned by the UE.

According to the solution in this embodiment, the HSS/HLR may calculate the 5G authentication vector based on the indication. This helps the UE remain unchanged, and reduces costs of optimization implementation.

FIG. 7B is a schematic flowchart of another communication method according to an embodiment of this application. The communication method shown in FIG. 7B may be implemented based on the network architecture shown in FIG. 1E. The other communication method may include the following steps.

701*b*: A UE initiates a registration request to an AMF, where the registration request may carry an SUCI of the UE.

702*b*: The AMF sends a third request (a user authentication request or an authentication data request) that carries an authentication vector request indication to an HSS/HLR, where the authentication vector request indication is used to request an authentication vector.

The authentication vector request indication includes, for example, one or more of the following: an access network type identifier, a requesting node identifier, or an authentication management field modification identifier.

An access network type indicated by the access network type identifier is a 5G access network. A node that requests an authentication vector and that is indicated by the requesting node identifier is one or more of the AMF, an AUSF, an IWF, an SGSN, or an authentication proxy network element.

703b: The HSS/HLR generates a 5G authentication vector based on the authentication vector request indication, and sends a response to the third request to the AMF, where the response to the third request carries the 5G authentication vector.

Optionally, the response to the third request further carries an authentication mode indication, and the authentication mode indication is used to indicate the UE to perform 5G AKA authentication or 5G EAP-AKA' authentication.

704b: After obtaining the 5G authentication vector, the AMF may determine to perform 5G AKA authentication or EAP-AKA' authentication according to a local policy.

Optionally, an authentication mode may be selected based on the indication delivered by the HSS/HLR.

The AMF calculates a key Kseaf and obtains that Kseaf=KDF (Kausf, 0x6C||SN name||length of SN name).

Alternatively, the key derivation operation may be performed after authentication in 706b.

705b: The AMF sends an authentication request to the UE.

706b: The UE authenticates a network based on AUTN carried in the received authentication request. If the authentication mode is 5G AKA authentication and the authentication succeeds, the UE calculates RES* and returns RES* to the network, where a manner of calculating RES* is the same as a manner of calculating XRES* by the AMF. If the authentication mode is EAP-AKA' authentication and the authentication succeeds, the UE calculates RES and returns RES to the network, where a manner of calculating RES is the same as a manner of calculating XRES by the AMF.

707b: After receiving the authentication response from the UE, the AMF performs authentication on a result returned by the UE.

According to the solution in this embodiment, the HSS/HLR may calculate the 5G authentication vector based on the indication. This helps the UE remain unchanged, and reduces costs of optimization implementation.

FIG. 8A is a schematic flowchart of another communication method according to an embodiment of this application. The communication method shown in FIG. 8A may be implemented based on the network architecture shown in FIG. 1C or FIG. 1D. Different from the embodiment corresponding to FIG. 7A, in this embodiment, a third core network device (in this embodiment, an example in which the third core network device is an IWF is used) is introduced to calculate and authenticate a 5G authentication vector, where the IWF may be deployed in a visited network, or may be deployed in a home network. If the IWF is deployed in the visited network, the IWF may alternatively be replaced with an AUSF, an authentication proxy network element, or another newly added network element.

As shown in FIG. 8A, the other communication method may include the following steps.

801: A UE initiates a registration request to the visited network, where the registration request carries an SUCI of the UE protected using a null scheme.

802: An AMF sends an authentication request to the IWF.

803: The IWF sends a third request that carries an authentication vector request indication to an HSS/HLR in a home domain, where the authentication vector request indication is used to request an authentication vector.

The authentication vector request indication includes, for example, one or more of the following: an access network type identifier, a requesting node identifier, or an authentication management field modification identifier.

An access network type indicated by the access network type identifier is a 5G access network. A node that requests an authentication vector and that is indicated by the requesting node identifier is one or more of the AMF, the AUSF, the IWF, an SGSN, or the authentication proxy network element.

804: The HSS/HLR generates a 5G authentication vector based on the authentication vector request indication, and sends a response to the third request to the IWF, where the response to the third request carries the 5G authentication vector.

Optionally, the response to the third request further carries an authentication mode indication, and the authentication mode indication is used to indicate the UE to perform 5G AKA authentication or 5G EAP-AKA' authentication.

805: After obtaining the 5G authentication vector, the IWF may determine to perform 5G AKA authentication or EAP-AKA' authentication according to a local policy. The IWF sends a user authentication response that carries the 5G authentication vector to the AMF.

Optionally, an authentication mode may be selected based on the authentication mode indication delivered by the HSS/HLR.

The IWF calculates a key Kseaf and obtains that Kseaf=KDF (Kausf, 0x6C||SN name||length of SN name).

Alternatively, the key derivation step may be performed after step 809.

806: The AMF sends an authentication request to the UE.

807: The UE authenticates a network based on AUTN carried in the received authentication request. If the authentication mode is 5G AKA authentication and the authentication succeeds, the UE calculates RES* and returns RES* to the network, where a manner of calculating RES* is the same as a manner of calculating XRES* by the AMF. If the authentication mode is EAP-AKA' authentication and the authentication succeeds, the UE calculates RES and returns RES to the network, where a manner of calculating RES is the same as a manner of calculating XRES by the AMF.

808: After receiving the authentication response from the UE, the AMF forwards the authentication response to the IWF.

809: The IWF authenticates a result returned by the UE.

810: The IWF sends a corresponding authentication result to the AMF.

It can be learned that, according to the solution in this embodiment, the HSS/HLR may calculate the 5G authentication vector based on the indication. This helps the UE remain unchanged, and reduces costs of optimization implementation. In addition, the introduction of the IWF reduces changes to the AMF.

FIG. 8B is a schematic flowchart of another communication method according to an embodiment of this application. The communication method shown in FIG. 8B may be implemented based on the network architecture shown in FIG. 1F. Different from the embodiment corresponding to FIG. 7B, in this embodiment, a third core network device (in this embodiment, an example in which the third core network device is an IWF is used) is introduced to calculate and authenticate a 5G authentication vector, where the IWF may alternatively be replaced with an AUSF, an authentication proxy network element, or another newly added network element.

As shown in FIG. 8B, the other communication method may include the following steps.

- 801b: A UE initiates a registration request to an AMF, where the registration request carries an SUCI of the UE.
- 802b: The AMF sends an authentication request to the IWF.
- 803b: The IWF sends a third request that carries an authentication vector request indication to an HSS/HLR, where the authentication vector request indication is used to request an authentication vector.

The authentication vector request indication includes, for example, one or more of the following: an access network type identifier, a requesting node identifier, or an authentication management field modification identifier.

An access network type indicated by the access network type identifier is a 5G access network. A node that requests an authentication vector and that is indicated by the requesting node identifier is one or more of the AMF, the AUSF, the IWF, an SGSN, or the authentication proxy network element.

- 804b: The HSS/HLR generates a 5G authentication vector based on the authentication vector request indication, and sends a response to the third request to the IWF, where the response to the third request carries the 5G authentication vector.

Optionally, the response to the third request further carries an authentication mode indication, and the authentication mode indication is used to indicate the UE to perform 5G AKA authentication or 5G EAP-AKA' authentication.

- 805b: After obtaining the 5G authentication vector, the IWF may determine to perform 5G AKA authentication or EAP-AKA' authentication according to a local policy. The IWF sends a user authentication response that carries the 5G authentication vector to the AMF.

Optionally, an authentication mode may be selected based on the authentication mode indication delivered by the HSS/HLR.

The IWF calculates a key Kseaf and obtains that Kseaf=KDF (Kausf, 0x6C||SN name||length of SN name).

Alternatively, the key derivation step may be performed after step 809b.

- 806b: The AMF sends an authentication request to the UE.
- 807b: The UE authenticates a network based on AUTN carried in the received authentication request. If the authentication mode is 5G AKA authentication and the authentication succeeds, the UE calculates RES* and returns RES* to the network, where a manner of calculating RES* is the same as a manner of calculating XRES* by the AMF. If the authentication mode is EAP-AKA' authentication and the authentication succeeds, the UE calculates RES and returns RES to the network, where a manner of calculating RES is the same as a manner of calculating XRES by the AMF.
- 808b: After receiving the authentication response from the UE, the AMF forwards the authentication response to the IWF.
- 809b: The IWF authenticates a result returned by the UE.
- 810b: The IWF sends a corresponding authentication result to the AMF.

It can be learned that, according to the solution in this embodiment, the HSS/HLR may calculate the 5G authentication vector based on the indication. This helps the UE remain unchanged, and reduces costs of optimization implementation. In addition, the introduction of the IWF reduces changes to the AMF.

Some product embodiments are further provided below.

Referring to FIG. 9, a core network device 900 according to an embodiment of this application includes: a processor 910 and a memory 920 that are coupled to each other. The processor 910 invokes a program stored in the memory 920, to perform some or all of the steps of any method performed by a first core network device (for example, an HSS/HLR) in the embodiments of this application.

Figure 10:
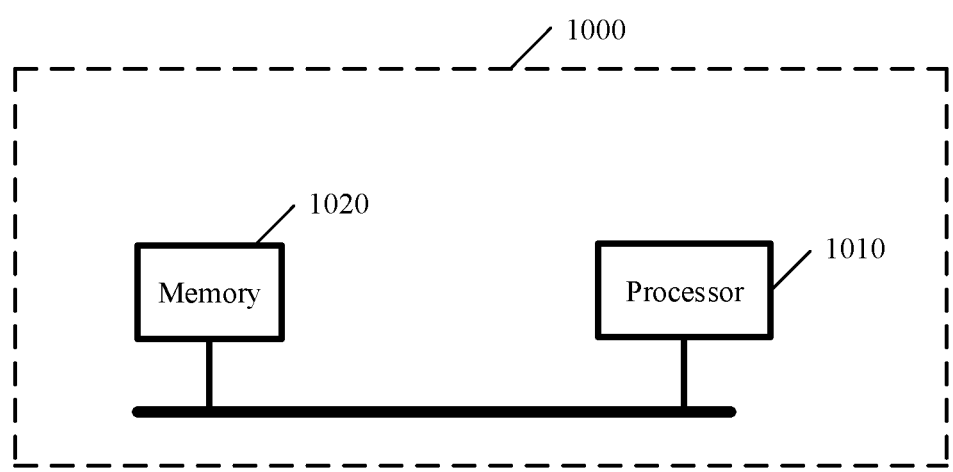
FIG. 10 is a schematic architectural diagram of another core network device according to an embodiment of this application.

Referring to FIG. 10, a core network device 1000 according to an embodiment of this application includes: a processor 1010 and a memory 1020 that are coupled to each other. The processor 1010 invokes a program stored in the memory 1020, to perform some or all steps of any method performed by a second core network device (for example, an AMF) in the embodiments of this application.

Figure 11:
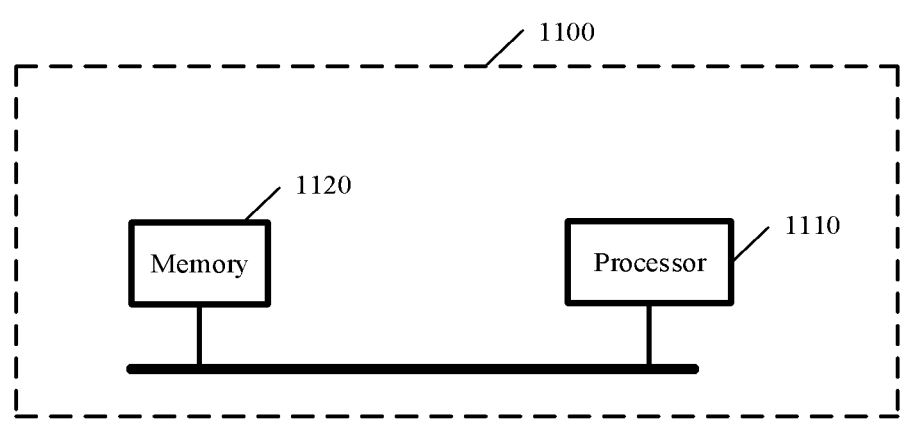
FIG. 11 is a schematic architectural diagram of another core network device according to an embodiment of this application.

Referring to FIG. 11, a core network device 1100 according to an embodiment of this application includes: a processor 1110 and a memory 1120 that are coupled to each other. The processor 1110 invokes a program stored in the memory 1120, to perform some or all steps of any method performed by a third core network device (for example, an IWF) in the embodiments of this application.

Figure 12:
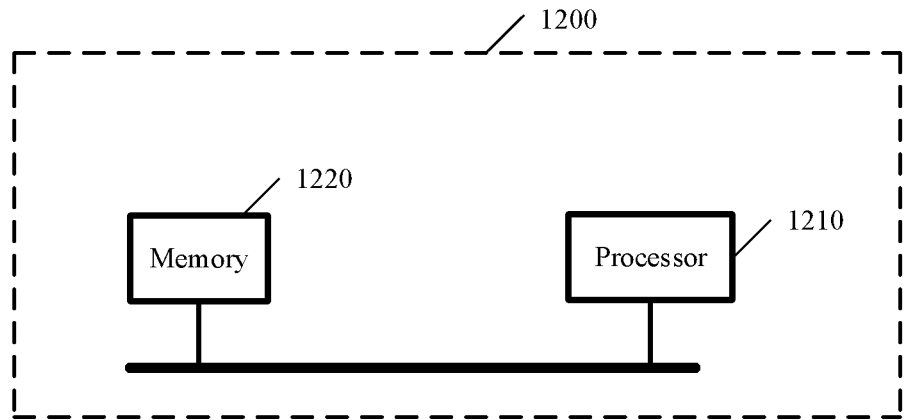
FIG. 12 is a schematic architectural diagram of user equipment according to an embodiment of this application.

Referring to FIG. 12, a user equipment 1200 according to an embodiment of this application includes: a processor 1210 and a memory 1220 that are coupled to each other. The processor 1210 invokes a program stored in the memory 1220, to perform some or all steps of any method performed by user equipment in the embodiments of this application.

Figure 13:
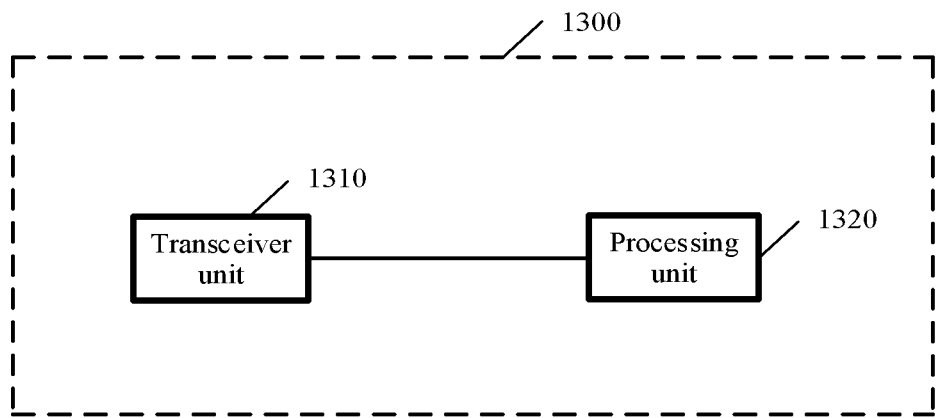
FIG. 13 is a schematic architectural diagram of a first core network device according to an embodiment of this application.

Referring to FIG. 13, a first core network device 1300 according to an embodiment of this application may include: a transceiver unit 1310 configured to receive a first request when a user equipment roams from a first network to a second network, where the first request is a user authentication request or an authentication data request, where the first request carries an authentication vector request indication, where the second network is a 5G standalone network, where the first network is a 5G non-standalone network, and where the first core network device is a core network device in the first network; and a processing unit 1320 configured to generate an authentication vector quintet based on the authentication vector request indication, where a $0^{th}$ bit of an authentication management field in the authentication vector quintet is set to 1.

The transceiver unit 1310 is further configured to send a response to the first request, where the response to the first request carries the authentication vector quintet.

Figure 14:
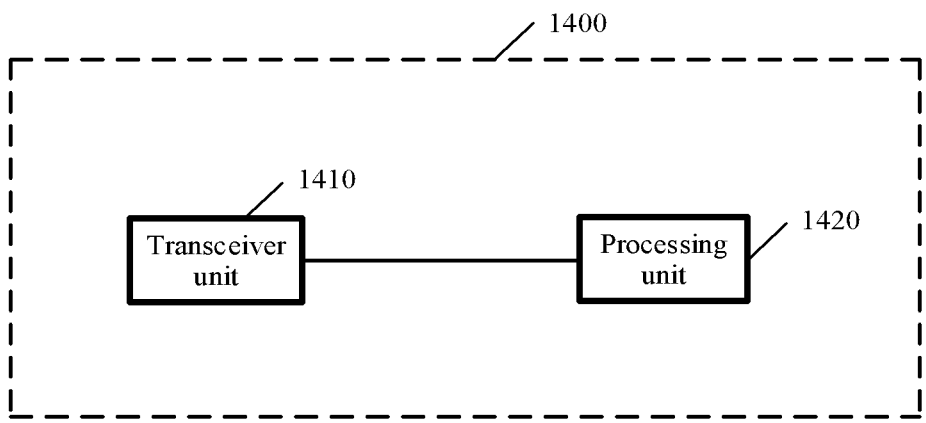
FIG. 14 is a schematic architectural diagram of a second core network device according to an embodiment of this application.

Referring to FIG. 14, a second core network device 1400 according to an embodiment of this application includes: a transceiver unit 1410 and a processing unit 1420.

The transceiver unit 1410 is configured to send a first request when user equipment roams from a first network to a second network, where the first request is a user authentication request or an authentication data request, where the first request carries an authentication vector request indication, where the second network is a 5G standalone network, where the first network is a 5G non-standalone network, and where the second core network device is a core network device in the second network.

The transceiver unit 1410 is further configured to receive a response to the first request that carries an authentication vector quintet, where a $0^{th}$ bit of an authentication management field in the authentication vector quintet is set to 1.

The processing unit 1420 is configured to generate a 5G authentication vector for the user equipment using the authentication vector quintet.

In some possible implementations, the response to the first request may further carry an authentication mode indication, and the authentication mode indication is used to indicate 5G AKA authentication or 5G EAP-AKA' authentication. When the authentication mode indication indicates 5G AKA authentication, the generated 5G authentication vector for the user equipment is a 5G AKA authentication vector. When the authentication mode indication indicates 5G EAP-AKA' authentication, the generated 5G authentication vector for the user equipment is a 5G EAP-AKA' authentication vector.

In some possible implementations, the transceiver unit 1410 is further configured to: send an authentication request to the user equipment; and receive an authentication response from the user equipment.

The processing unit 1420 is further configured to: when the authentication mode indication indicates 5G EAP-AKA' authentication, perform the 5G EAP-AKA' authentication on the user equipment; and when the authentication mode indication indicates 5G AKA authentication, perform the 5G AKA authentication on the user equipment.

Figure 15:
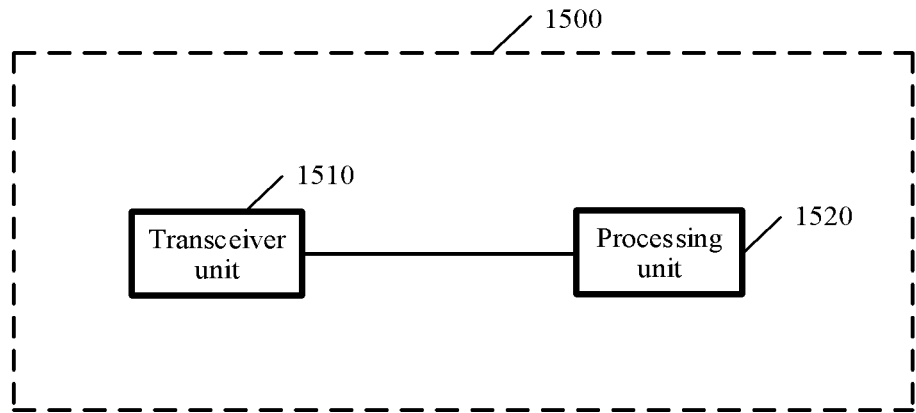
FIG. 15 is a schematic architectural diagram of a third core network device according to an embodiment of this application.

Referring to FIG. 15, a third core network device 1500 according to an embodiment of this application includes: a transceiver unit 1510 and a processing unit 1520.

The transceiver unit 1510 is configured to receive a first request from a second core network device when a user equipment roams from a first network to a second network, where the first request is a user authentication request or an authentication data request, where the second network is a 5G standalone network, where the first network is a 5G non-standalone network, where the third core network device is a core network device in the first network or the second network, and where the second core network device is a core network device in the second network.

The transceiver unit 1510 is further configured to send a first request that carries an authentication vector request indication to a first core network device, where the first core network device is a core network device in the first network.

The transceiver unit 1510 is further configured to receive a response to the first request from the first core network device, where the response to the first request carries an authentication vector quintet, and where a $0^{th}$ bit of an authentication management field in the authentication vector quintet is set to 1.

The processing unit 1520 is configured to generate a 5G authentication vector for the user equipment using the authentication vector quintet.

The transceiver unit 1510 is further configured to send the response to the first request to the second core network device.

In some possible implementations, the response to the first request further carries an authentication mode indication, and the authentication mode indication is used to indicate 5G AKA authentication or 5G EAP-AKA' authentication. When the authentication mode indication indicates 5G EAP-AKA' authentication, the generated 5G authentication vector for the user equipment is a 5G EAP-AKA' authentication vector; and when the authentication mode indication indicates 5G AKA authentication, the generated 5G authentication vector for the user equipment is a 5G AKA authentication vector.

In some possible implementations, the transceiver unit 1510 may be further configured to receive an authentication response from the second core network device.

The processing unit 1520 is further configured to: when the authentication mode indication indicates 5G AKA authentication, perform the 5G AKA authentication on the user equipment; and when the authentication mode indication indicates EAP-AKA' authentication, perform the EAP-AKA' authentication on the user equipment.

In some possible implementations, the processing unit 1520 is further configured to generate a 5G security key of the user equipment using the authentication vector quintet, where the 5G security key includes, for example, Kseaf and Kausf.

Figure 16:
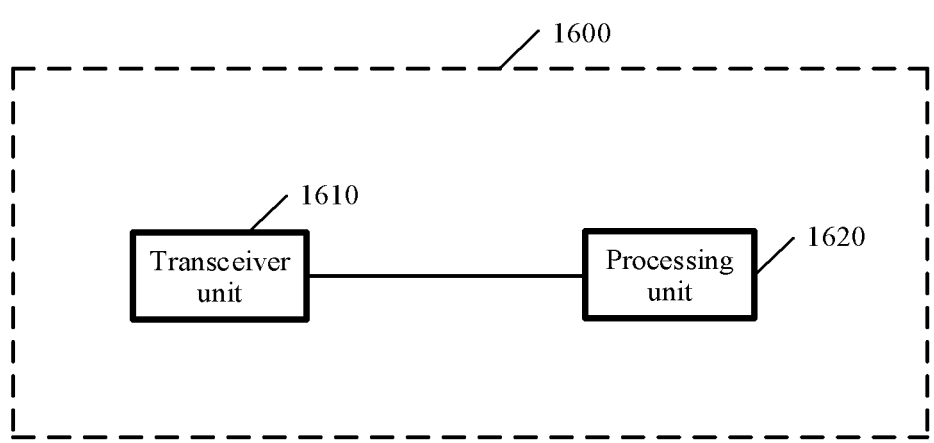
FIG. 16 is a schematic architectural diagram of another first core network device according to an embodiment of this application.

Referring to FIG. 16, a first core network device 1600 according to an embodiment of this application includes: a transceiver unit 1610 configured to receive a second request when a user equipment roams from a first network to a second network, where the second request is a user authentication request or an authentication data request, where the second network is a 5G standalone network, where the first network is a 5G non-standalone network, where the first core network device is a core network device in the first network, and where the second request carries an authentication vector request indication, or where the second request is received through an S6a interface or an SWx interface; and a processing unit 1620 configured to: determine, based on the authentication vector request indication, that a 4G authentication vector for the user equipment is a 4G AKA authentication vector or a 4G EAP-AKA' authentication vector; or determine, based on an interface through which the second request is received, that the 4G authentication vector for the user equipment is a 4G AKA authentication vector or a 4G EAP-AKA' authentication vector.

The transceiver unit 1610 is configured to send a response to the second request that carries the 4G authentication vector.

The 4G authentication vector is used to generate a 5G authentication vector for the user equipment, and the 5G authentication vector is, for example, an EAP-AKA' authentication vector or a 5G AKA authentication vector.

In some possible implementations, the authentication vector request indication includes one or more of the following: an access network type identifier or a requesting node identifier. An access network type indicated by the access network type identifier is a 5G access network. A node that requests an authentication vector and that is indicated by the requesting node identifier is one or more of an AMF, an AUSF, an MME, an AAA-server, an IWF, an SGSN, or an authentication proxy network element.

For example, if the authentication vector request indication indicates that the access network type is the 5G access network or the node that requests the authentication vector is the AMF, the AUSF, the IWF, or an authentication proxy, the processing unit may determine, according to a local policy, that the 4G authentication vector for the user equipment is the 4G AKA authentication vector or the 4G EAP-AKA' authentication vector.

If the authentication vector request indication indicates that the node that requests an authentication vector is the MME, the processing unit may, for example, determine that the 4G authentication vector for the user equipment is the 4G AKA authentication vector.

If the authentication vector request indication indicates that the node that requests an authentication vector is the AAA-server, the processing unit may, for example, determine that the 4G authentication vector for the user equipment is the 4G EAP-AKA' authentication vector.

If the first core network device receives the second request from the S6a interface, the processing unit may, for example, determine that the 4G authentication vector for the user equipment is the 4G AKA authentication vector.

If the first core network device receives the second request from the SWx interface, the processing unit may, for example, determine that the 4G authentication vector for the user equipment is the 4G EAP-AKA' authentication vector.

Certainly, a manner in which the processing unit determines, based on the authentication vector request indication, that the 4G authentication vector for the user equipment is the 4G AKA authentication vector or the 4G EAP-AKA' authentication vector is not limited to the foregoing example manners.

In some possible implementations, the authentication vector request indication includes one or more of the following: an access network type identifier or a requesting node identifier. An access network type indicated by the access network type identifier is a 5G access network. A node that requests an authentication vector and that is indicated by the requesting node identifier is one or more of an AMF, an AUSF, an MME, an AAA-server, an IWF, an SGSN, or an authentication proxy network element.

In some possible implementations, the response to the second request further carries an authentication vector generation indication. The authentication vector generation indication is used to indicate the user equipment to generate the 4G EAP-AKA' authentication vector or the 4G AKA authentication vector.

In some possible implementations, the response to the second request further carries an authentication vector mapping indication, and the authentication vector mapping indication indicates to map the 4G AKA authentication vector to a 5G AKA authentication vector, or the authentication vector mapping indication indicates to map the 4G EAP-AKA' authentication vector to a 5G EAP-AKA' authentication vector.

Figure 17:
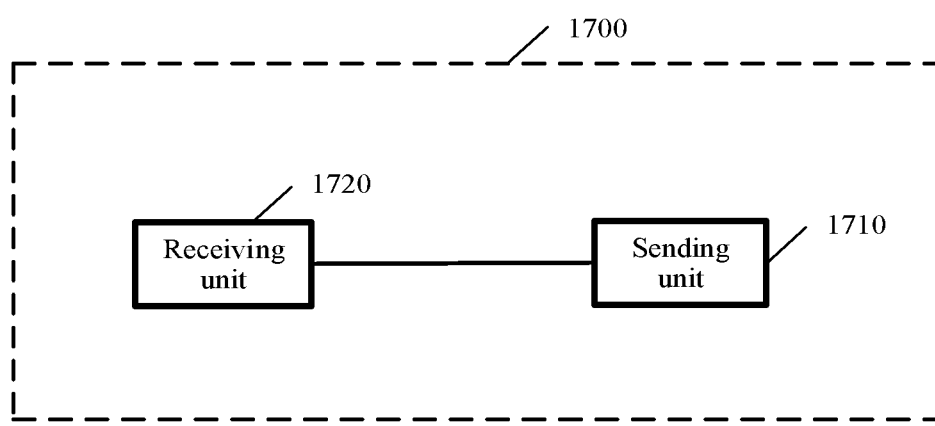
FIG. 17 is a schematic architectural diagram of another second core network device according to an embodiment of this application.

Referring to FIG. 17, a second core network device 1700 according to an embodiment of this application includes: a sending unit 1710 configured to send a second request when a user equipment roams from a first network to a second network, where the second request is a user authentication request or an authentication data request, where the second network is a 5G standalone network, where the first network is a 5G non-standalone network, where the second core network device is a core network device in the second network, and where the second request carries an authentication vector request indication, or where the second request is sent through an S6a interface or an SWx interface; and a receiving unit 1720 configured to receive a response to the second request that carries a 4G authentication vector.

The 4G authentication vector is used to generate a 5G authentication vector for the user equipment, and the 5G authentication vector is a 5G EAP-AKA' authentication vector or a 5G AKA authentication vector. The 4G authentication vector is a 4G EAP-AKA' authentication vector or a 4G AKA authentication vector.

In some possible implementations, the authentication vector request indication includes one or more of an access network type identifier or a requesting node identifier. An access network type indicated by the access network type identifier is a 5G access network. A node that requests an authentication vector and that is indicated by the requesting node identifier is one or more of an AMF, an AUSF, an MME, an AAA-server, an IWF, an SGSN, or an authentication proxy network element.

In some possible implementations, the response to the second request further carries an authentication vector generation indication, where the authentication vector generation indication is used to indicate the user equipment to generate the 4G EAP-AKA' authentication vector or the 4G AKA authentication vector.

In some possible implementations, the response to the second request further carries an authentication vector mapping indication, and the authentication vector mapping indication indicates to map the 4G AKA authentication vector to the 5G AKA authentication vector. Alternatively, the authentication vector mapping indication indicates to map the 4G EAP-AKA' authentication vector to the 5G EAP-AKA' authentication vector.

In some possible implementations, the second core network device further includes a processing unit 1730 configured to: when the authentication vector mapping indication indicates to map the 4G AKA authentication vector to the 5G AKA authentication vector, map the 4G authentication vector carried in the response to the second request to the 5G AKA authentication vector; or when the authentication vector mapping indication indicates to map the 4G EAP-AKA' authentication vector to the 5G EAP-AKA' authentication vector, map the 4G authentication vector carried in the response to the second request to the 5G EAP-AKA' authentication vector.

In some possible implementations, the processing unit 1730 is further configured to determine, according to a local policy, to perform 5G AKA authentication, 5G EAP-AKA' authentication, 4G AKA authentication, or 4G EAP-AKA' authentication on the user equipment.

In some possible implementations, the sending unit 1710 is further configured to send an authentication request to the user equipment. For example, the authentication request carries the authentication vector generation indication and/or the authentication vector mapping indication.

The receiving unit 1720 is further configured to receive an authentication response from the user equipment.

The processing unit 1730 is further configured to: when it is determined, according to the local policy, to perform the 5G AKA authentication on the user equipment, perform the 5G AKA authentication on the user equipment; or when it is determined, according to the local policy, to perform the 5G EAP-AKA' authentication on the user equipment, perform the 5G EAP-AKA' authentication on the user equipment; or when it is determined, according to the local policy, to perform the 4G AKA authentication on the user equipment, perform the 4G AKA authentication on the user equipment; or when it is determined, according to the local policy, to perform the 4G EAP-AKA' authentication on the user equipment, perform the 4G EAP-AKA' authentication on the user equipment.

In some possible implementations, the processing unit 1730 is further configured to generate a 5G security key of the user equipment using the 4G authentication vector, where the 5G security key may include Kseaf and Kausf.

Figure 18:
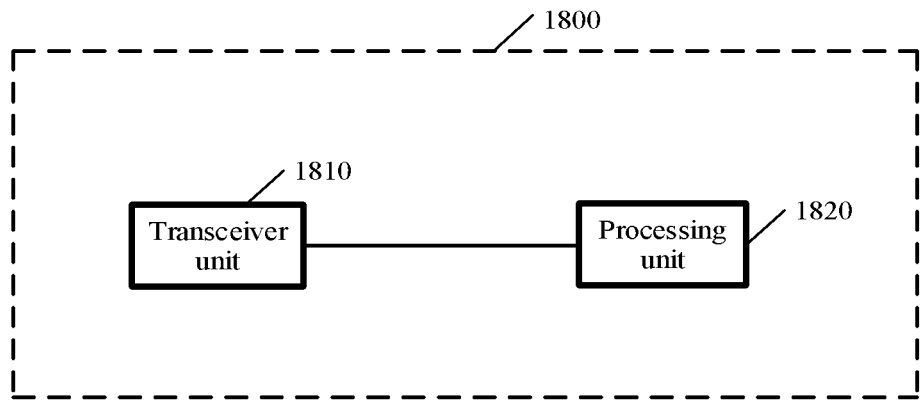
FIG. 18 is a schematic architectural diagram of another third core network device according to an embodiment of this application.

Referring to FIG. 18, a third core network device 1800 according to an embodiment of this application includes: a transceiver unit 1810 configured to: when user equipment roams from a first network to a second network, receive a first request from a second core network device, where the first request is a user authentication request or an authentication data request, where the second network is a 5G standalone network, where the first network is a 5G non-standalone network, where the third core network device is a core network device in the first network or the second network, and where the second core network device is a core network device in the second network.

The transceiver unit 1810 is further configured to: send a second request to a first core network device through an S6a interface or an SWx interface; add an authentication vector request indication to the second request; or send the second request that carries the authentication vector request indication to the first core network device, where the first core network device is a core network device in the first network.

The transceiver unit 1810 is further configured to receive a response to the second request that carries a 4G authentication vector, and send the response to the second request to the second core network device.

The 4G authentication vector is used to generate a 5G authentication vector for the user equipment, and the 5G authentication vector is a 5G EAP-AKA' authentication vector or a 5G AKA authentication vector. The 4G authentication vector is a 4G EAP-AKA' authentication vector or a 4G AKA authentication vector.

In some possible implementations, the authentication vector request indication includes one or more of an access network type identifier or a requesting node identifier. An access network type indicated by the access network type identifier is a 5G access network. A node that requests an authentication vector and that is indicated by the requesting node identifier is one or more of an AMF, an AUSF, an MME, an AAA-server, an IWF, an SGSN, or an authentication proxy network element.

In some possible implementations, the response to the second request further carries an authentication vector generation indication, where the authentication vector generation indication is used to indicate the user equipment to generate the 4G EAP-AKA' authentication vector or the 4G AKA authentication vector.

In some possible implementations, the response to the second request further carries an authentication vector mapping indication, and the authentication vector mapping indication indicates to map the 4G AKA authentication vector to the 5G AKA authentication vector, or the authentication vector mapping indication indicates to map the 4G EAP-AKA' authentication vector to the 5G EAP-AKA' authentication vector.

In some possible implementations, the third core network device further includes a processing unit 1820 configured to: when the authentication vector mapping indication indicates to map the 4G AKA authentication vector to the 5G AKA authentication vector, map the 4G authentication vector carried in the response to the second request to the 5G AKA authentication vector; or when the authentication vector mapping indication indicates to map the 4G EAP-AKA' authentication vector to the 5G EAP-AKA' authentication vector, map the 4G authentication vector carried in the response to the second request to the 5G EAP-AKA' authentication vector.

In some possible implementations, the processing unit 1820 is further configured to determine, according to a local policy, to perform 5G AKA authentication, 5G EAP-AKA' authentication, 4G AKA authentication, or 4G EAP-AKA' authentication on the user equipment.

In some possible implementations, the transceiver unit 1810 is further configured to receive an authentication response from the second core network device.

The processing unit 1820 is further configured to: when it is determined, according to the local policy, to perform the 5G AKA authentication on the user equipment, perform the 5G AKA authentication on the user equipment; or when it is determined, according to the local policy, to perform the 5G EAP-AKA' authentication on the user equipment, perform the 5G EAP-AKA' authentication on the user equipment; or when it is determined, according to the local policy, to perform the 4G AKA authentication on the user equipment, perform the 4G AKA authentication on the user equipment; or when it is determined, according to the local policy, to perform the 4G EAP-AKA' authentication on the user equipment, perform the 4G EAP-AKA' authentication on the user equipment.

In some possible implementations, the processing unit 1820 is further configured to generate, by the second core network device, a 5G security key of the user equipment using the 4G authentication vector, where the 5G security key includes Kseaf and Kausf.

In some possible implementations, the third core network device is the AUSF, the IWF, or the authentication proxy network element.

Figure 19:
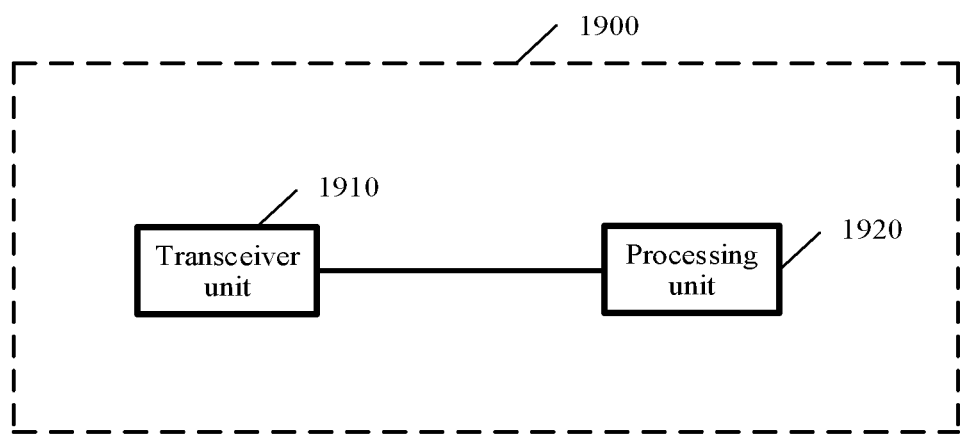
FIG. 19 is a schematic architectural diagram of user equipment according to an embodiment of this application.

Referring to FIG. 19, user equipment 1900 according to an embodiment of this application includes: a transceiver unit 1910 configured to receive an authentication request sent by a second core network device when the user equipment roams from a first network to a second network, where the authentication request carries an authentication vector generation indication, where the second network is a 5G standalone network, where the first network is a 5G non-standalone network, and where the second core network device is a core network device in the second network; and a processing unit 1920 configured to: when the authentication vector generation indication carried in the authentication request is used to indicate the user equipment to generate a 4G EAP-AKA' authentication vector, a generated 4G authentication vector is a 4G EAP-AKA' authentication vector; or when the authentication vector generation indication is used to indicate the user equipment to generate a 4G AKA authentication vector, a generated 4G authentication vector is a 4G AKA authentication vector.

The transceiver unit 1910 is further configured to send, to the core network device, an authentication response that carries the generated 4G EAP-AKA' authentication vector or 4G AKA authentication vector.

Figure 20:
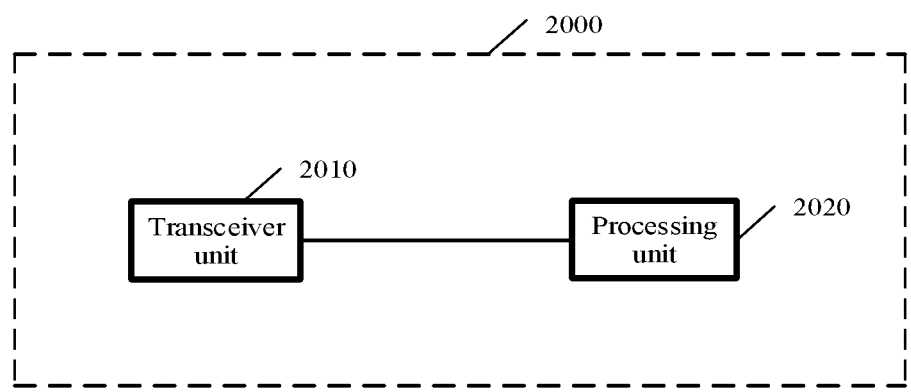
FIG. 20 is a schematic architectural diagram of another user equipment according to an embodiment of this application.

Referring to FIG. 20, a user equipment 2000 according to an embodiment of this application includes: a transceiver unit 2010 configured to receive an authentication request sent by a second core network device when the user equipment 2000 roams from a first network to a second network, where the authentication request carries an authentication vector mapping indication, where the second network is a 5G standalone network, where the first network is a 5G non-standalone network, and where the second core network device is a core network device in the second network; and a processing unit 2020 configured to: when the authentication vector mapping indication carried in the authentication request indicates to the user equipment 2000 to map a 4G EAP-AKA' authentication vector to a 5G EAP-AKA' authentication vector, the user equipment generates a 4G EAP-AKA' authentication vector, and the user equipment 2000 maps the generated 4G EAP-AKA' authentication vector to a 5G EAP-AKA' authentication vector.

The processing unit 2020 is further configured to: when the authentication vector mapping indication carried in the authentication request indicates to the user equipment 2000 to map a 4G AKA authentication vector to a 5G AKA authentication vector, the user equipment 2000 generates a 4G AKA authentication vector, and the user equipment 2000 maps the generated 4G AKA authentication vector to a 5G AKA authentication vector.

The transceiver unit 2010 is further configured to send an authentication response to the second core network device, where the authentication response carries the 5G AKA authentication vector or the 5G EAP-AKA' authentication vector obtained through mapping.

Figure 21:
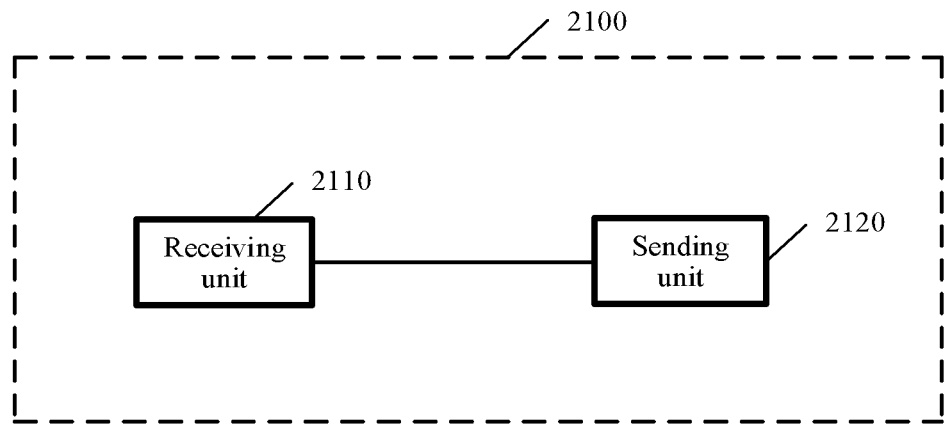
FIG. 21 is a schematic architectural diagram of another first core network device according to an embodiment of this application.

Referring to FIG. 21, a first core network device 2100 according to an embodiment of this application includes: a receiving unit 2110 configured to receive a third request when a user equipment roams from a first network to a second network, where the third request is a user authentication request or an authentication data request, where the third request carries an authentication vector request indication, where the second network is a 5G standalone network, where the first network is a 5G non-standalone network, and where the first core network device is a core network device in the first network; and a sending unit 2120 configured to send a response to the third request that carries a 5G authentication vector, where the 5G authentication vector is an EAP-AKA' authentication vector or a 5G AKA authentication vector.

In some possible implementations, the authentication vector request indication includes one or more of the following: an access network type identifier or a requesting node identifier.

An access network type indicated by the access network type identifier is a 5G access network. A node that requests an authentication vector and that is indicated by the requesting node identifier is one or more of an AMF, an AUSF, an IWF, an SGSN, or an authentication proxy network element.

Figure 22:
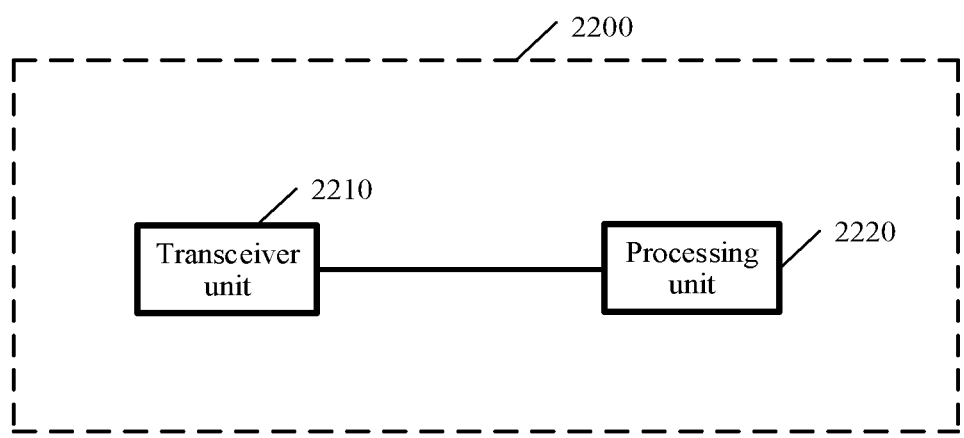
FIG. 22 is a schematic architectural diagram of another second core network device according to an embodiment of this application.

Referring to FIG. 22, a second core network device 2200 according to an embodiment of this application includes: a transceiver unit 2210 configured to send a third request when a user equipment roams from a first network to a second network, where the third request is a user authentication request or an authentication data request, where the third request carries an authentication vector request indication, where the second network is a 5G standalone network, where the first network is a 5G non-standalone network, and where the second core network device is a core network device in the second network.

The transceiver unit 2210 is further configured to receive a response to the third request that carries a 5G authentication vector, where the 5G authentication vector is a 5G AKA authentication vector or a 5G EAP-AKA' authentication vector.

In some possible implementations, the authentication vector request indication includes one or more of the following: an access network type identifier or a requesting node identifier.

An access network type indicated by the access network type identifier is a 5G access network. A node that requests an authentication vector and that is indicated by the requesting node identifier is one or more of an AMF, an AUSF, an IWF, an SGSN, or an authentication proxy network element.

In some possible implementations, the transceiver unit 2210 is further configured to send an authentication request to the user equipment, and receive an authentication response from the user equipment.

The second core network device further includes a processing unit 2220 configured to perform 5G AKA authentication or 5G EAP-AKA' authentication on the user equipment.

For example, when the authentication response carries RES, the processing unit 2220 compares XRES in the EAP-AKA' authentication vector with RES carried in the authentication response. When XRES in the EAP-AKA' authentication vector is consistent with RES carried in the authentication response, it is determined that authentication of the user equipment succeeds.

Alternatively, when the authentication response carries RES*, the processing unit 2220 compares XRES* in the 5G AKA authentication vector with RES* carried in the authentication response. When XRES* in the 5G AKA authentication vector is consistent with RES* carried in the authentication response, it is determined that the authentication of the user equipment succeeds.

In some possible implementations, the processing unit is further configured to generate a 5G security key of the user equipment using the 5G authentication vector, where the 5G security key includes Kseaf and Kausf.

Figure 23:
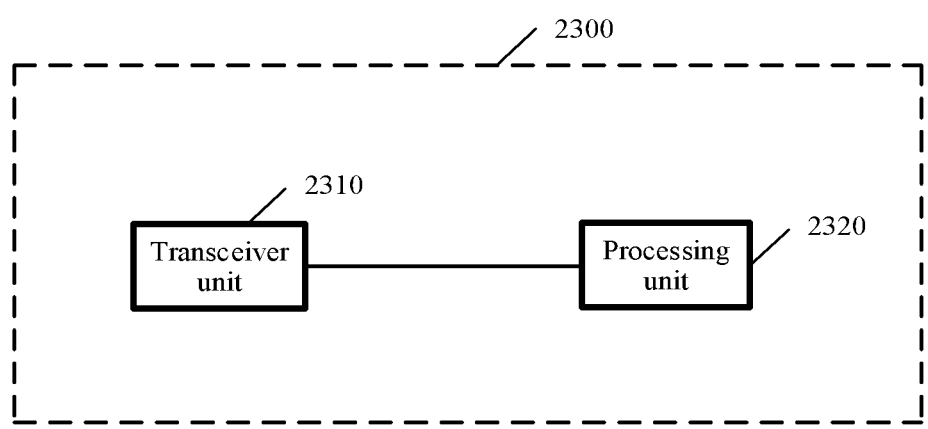
FIG. 23 is a schematic architectural diagram of another third core network device according to an embodiment of this application.

Referring to FIG. 23, a third core network device 2300 according to an embodiment of this application includes: a transceiver unit 2310 configured to receive a third request from a second core network device when a user equipment roams from a first network to a second network, where the third request is a user authentication request or an authentication data request, where the second network is a 5G standalone network, where the first network is a 5G non-standalone network, where the third core network device is a core network device in the first network or the second network, and where the second core network device is a core network device in the second network.

The transceiver unit 2310 is further configured to send the third request that carries an authentication vector request indication to a first core network device, where the first core network device is a core network device in the first network.

The transceiver unit 2310 is further configured to receive a response to the third request that carries a 5G authentication vector, where the 5G authentication vector is a 5G AKA authentication vector or a 5G EAP-AKA' authentication vector.

The transceiver unit 2310 is further configured to send the response to the third request to the second core network device.

In some possible implementations, the authentication vector request indication includes one or more of the following: an access network type identifier or a requesting node identifier. An access network type indicated by the access network type identifier is a 5G access network. A node that requests an authentication vector and that is indicated by the requesting node identifier is one or more of an AMF, an AUSF, an IWF, an SGSN, or an authentication proxy network element.

In some possible implementations, the transceiver unit 2310 is further configured to receive an authentication response from the user equipment.

The third core network device further includes a processing unit configured to perform 5G AKA authentication or 5G EAP-AKA' authentication on the user equipment.

For example, when the authentication response carries RES, the processing unit compares XRES in the EAP-AKA' authentication vector with RES carried in the authentication response. When XRES in the EAP-AKA' authentication vector is consistent with RES carried in the authentication response, it is determined that authentication of the user equipment succeeds.

Alternatively, when the authentication response carries RES*, the processing unit 2320 compares XRES* in the 5G AKA authentication vector with RES* carried in the authentication response. When XRES* in the 5G AKA authentication vector is consistent with RES* carried in the authentication response, it is determined that the authentication of the user equipment succeeds.

In some possible implementations, the processing unit 2320 is further configured to generate a 5G security key of the user equipment using the 5G authentication vector, where the 5G security key includes Kseaf and Kausf.

In some possible implementations, the third core network device is the AUSF, the IWF, or the authentication proxy network element.

FIG. 24A is a schematic flowchart of another communication method according to an embodiment of this application. The communication method shown in FIG. 24A may be implemented based on the network architecture shown in FIG. 1C or FIG. 1D. Different from the embodiment corresponding to FIG. 3A, in this embodiment, a third core network device (in this embodiment, an example in which the third core network device is an IWF is used) is introduced to calculate and authenticate a 5G authentication vector, where the IWF may be deployed in a visited network, or may be deployed in a home network. If the IWF is deployed in the visited network, the IWF may alternatively be replaced with an AUSF, an authentication proxy network element, or another newly added network element.

As shown in FIG. 24A, the other communication method may include the following steps.

2401: A UE sends a registration request to an AMF in the visited network.

2402: The AMF sends a user authentication request to the IWF.

2403: The IWF sends a first request to an HSS/HLR in a home domain.

2404: After receiving the first request from the IWF, the HSS/HLR sets a $0^{th}$ bit of an AMF in an authentication vector quintet to 1, and sends a response to the first request to the IWF, where the response to the first request carries the authentication vector quintet in which the $0^{th}$ bit of the AMF is set to 1.

Optionally, the HS S/HLR sets the $0^{th}$ bit of the AMF in the authentication vector quintet to 1 based on a local configuration or the like.

It is assumed that the HSS/HLR sets different office direction configurations for the IWF, an SGSN, and an MME. For example, referring to FIG. 24B, an office direction of the IWF is set to Office 1 (OFC 1), an office direction of the SGSN is set to Office 2 (OFC 2), and an office direction of the MME is set to Office 3 (OFC 3).

When office direction information of a requesting node is OFC 3, the HSS/HLR sets the bit 0 of the AMF in the authentication vector quintet to 1, and sends the response to the first request to the requesting node, where the response to the first request carries the authentication vector quintet in which the bit 0 of the AMF is set to 1.

2405: After receiving the response to the first request, the IWF obtains the authentication vector quintet carried in the response to the first request, and generates a 5G authentication vector for the UE based on the authentication vector quintet.

The IWF may determine to perform 5G AKA authentication or 5G EAP-AKA' authentication according to a local policy.

Optionally, the response to the first request further carries an authentication mode indication, and the authentication mode indication is used to indicate 5G AKA authentication or 5G EAP-AKA' authentication. The IWF may alternatively determine, based on the authentication mode indication carried in the response to the first request, to perform 5G AKA authentication or 5G EAP-AKA' authentication. For example, when the authentication mode indication indicates 5G EAP-AKA' authentication, the IWF determines to perform the 5G EAP-AKA' authentication on the UE; and when the authentication mode indication indicates 5G AKA authentication, the IWF determines to perform the 5G AKA authentication on the UE.

For example, if the 5G AKA authentication is performed, a 5G AKA authentication vector (RAND, AUTN, Kausf, XRES*) is calculated based on the authentication vector quintet (RAND, AUTN, CK, IK, XRES).

RAND in the 5G AKA authentication vector is equal to RAND in the authentication vector quintet.

AUTN in the 5G AKA authentication vector is equal to AUTN in the authentication vector quintet.

Kausf in the 5G AKA authentication vector is equal to KDF 0x6A||SN name||length of SN name||SQN⊕AK||length of SQN⊕AK).

XRES* in the 5G AKA authentication vector is equal to KDF 0x6B||SN name||length of SN name||RAND||length of RAND||XRES||length of XRES).

For example, KDF=HMAC-SHA-256 (Key, S).

For another example, if the EAP-AKA' authentication is performed, a 5G EAP-AKA' authentication vector (RAND, AUTN, CK', IK', XRES) is calculated based on the authentication vector quintet (RAND, AUTN, CK, IK, XRES).

RAND in the 5G EAP-AKA' authentication vector is equal to RAND in the authentication vector quintet.

AUTN in the 5G EAP-AKA' authentication vector is equal to AUTN in the authentication vector quintet.

XRES in the 5G EAP-AKA' authentication vector is equal to XRES in the authentication vector quintet.

CK'||IK'=KDF (CK||IK, 0x20||SN name||length of SN name||SQN⊕AK||length of SQN⊕AK).

For example, Kausf is an upper 256-bit of the EMSK, and EMSK=MK[1152 . . . 1663], where:

MK=PRF' (IK'||CK', "EAP-AKA'"||SUPI);
PRF' (K, S)=T1|T2|T3|T4| . . . ;
T1=HMAC-SHA-256 (K, S|0x01);
T2=HMAC-SHA-256 (K, T1|S|0x02);
T3=HMAC-SHA-256 (K, T2|S|0x03); and
T4=HMAC-SHA-256 (K, T3|S|0x04).

The SUPI is obtained by the IWF from an SUCI.

The IWF may further calculate a key Kseaf.

For example, Kseaf=KDF (Kausf, 0x6C||SN name||length of SN name).

The calculation of the key Kseaf may alternatively be implemented after step 410.

2406: The IWF sends a user authentication response to the AMF, where the user authentication response carries the 5G authentication vector.

2407: The AMF sends an authentication request to the UE after receiving the user authentication response from the IWF, where the authentication request carries AUTN/RAND included in the 5G authentication vector.

2408: After receiving the authentication request from the AMF, the UE may authenticate a network based on received AUTN. If an authentication mode is 5G AKA authentication and the authentication succeeds, the UE adds calculated RES* to an authentication response to be sent to the AMF, where the UE calculates RES* in a same manner as the AMF calculates XRES*. If the authentication mode is 5G EAP-AKA' authentication and the authentication succeeds, the UE adds calculated RES to the authentication response to be sent to the AMF, where the UE calculates RES in a same manner as the AMF calculates XRES.

2409: After receiving the authentication response from the UE, the AMF forwards the authentication response from the UE to the IWF.

2410: The IWF performs authentication on a result (RES* or RES) returned by the UE after receiving the authentication response from the UE that is forwarded by the AMF, to be more specific, performs 5G AKA authentication or 5G EAP-AKA' authentication.

2411: The IWF feeds back an authentication result of the UE to the AMF.

In addition, optionally, the AMF may add an authentication vector request indication to the user authentication request, and the IWF forwards the user authentication request to the HSS/HLR. The IWF may be responsible for calculating the 5G authentication vector and a 5G security key using the authentication vector quintet. For 5G AKA authentication, the AMF may still perform HXRES* authentication, and the IWF completes XRES* authentication. For EAP-AKA' authentication, the IWF may complete XRES authentication. In other words, in the example procedure in FIG. 24A, some functions performed by the AMF may alternatively be performed by the IWF, and some functions performed by the IWF may alternatively be performed by the AMF.

In the solution in this embodiment, the IWF is introduced to be responsible for generating the 5G authentication vector and authenticating the UE. This helps reduce changes to the AMF.

FIG. 25A is a schematic flowchart of another communication method according to an embodiment of this application. The communication method shown in FIG. 25A may be implemented based on the network architecture shown in FIG. 1C or FIG. 1D. Different from the embodiment corresponding to FIG. 3A, in this embodiment, a third core network device (in this embodiment, an example in which the third core network device is an IWF is used) is introduced to calculate and authenticate a 5G authentication vector, where the IWF may be deployed in a visited network, or may be deployed in a home network. If the IWF is deployed in the visited network, the IWF may alternatively be replaced with an AUSF, an authentication proxy network element, or another newly added network element.

As shown in FIG. 25A, the other communication method may include the following steps.

2501: A UE sends a registration request to an AMF in the visited network.

2502: The AMF sends a user authentication request to the IWF.

2503: The IWF sends a first request to an HSS/HLR in a home domain.

2504: After receiving the first request from the IWF, the HSS/HLR sets a $0^{th}$ bit of an AMF in an authentication vector quintet to 1, and sends a response to the first request to the IWF, where the response to the first request carries the authentication vector quintet in which the $0^{th}$ bit of the AMF is set to 1.

Optionally, the HS S/HLR sets the $0^{th}$ bit of the AMF in the authentication vector quintet to 1 based on a local configuration or the like.

For example, the IWF, an SGSN, and an MME have different IP addresses and/or port numbers. For an example, referring to FIG. 25B, an IP address of the IWF is IP-001 and a corresponding port number is PORT 001, an IP address of the SGSN is IP-002 and a corresponding port number is PORT 002, and an IP address of the MME is IP-0032 and a corresponding port number is PORT 003.

For example, when an IP address of a requesting node is IP-001, the HSS/HLR sets the bit 0 of the AMF in the authentication vector quintet to 1, and sends the response to the first request to the requesting node, where the response to the first request carries the authentication vector quintet in which the bit 0 of the AMF is set to 1.

2505: After receiving the response to the first request, the IWF obtains the authentication vector quintet carried in the response to the first request, and generates a 5G authentication vector for the UE based on the authentication vector quintet.

The IWF may determine to perform 5G AKA authentication or 5G EAP-AKA' authentication according to a local policy.

Optionally, the response to the first request further carries an authentication mode indication, and the authentication mode indication is used to indicate 5G AKA authentication or 5G EAP-AKA' authentication. The IWF may alternatively determine, based on the authentication mode indication carried in the response to the first request, to perform 5G AKA authentication or 5G EAP-AKA' authentication. For example, when the authentication mode indication indicates 5G EAP-AKA' authentication, the IWF determines to perform the 5G EAP-AKA' authentication on the UE; and when the authentication mode indication indicates 5G AKA authentication, the IWF determines to perform the 5G AKA authentication on the UE.

For example, if the 5G AKA authentication is performed, a 5G AKA authentication vector (RAND, AUTN, Kausf, XRES*) is calculated based on the authentication vector quintet (RAND, AUTN, CK, IK, XRES).

RAND in the 5G AKA authentication vector is equal to RAND in the authentication vector quintet.

AUTN in the 5G AKA authentication vector is equal to AUTN in the authentication vector quintet.

Kausf in the 5G AKA authentication vector is equal to KDF (CK||IK, 0x6A||SN name||length of SN name||SQN⊕AK||length of SQN⊕AK).

XRES* in the 5G AKA authentication vector is equal to KDF (CK||IK, 0x6B||SN name||length of SN name||RAND-||length of RAND||XRES||length of XRES).

For example, KDF=HMAC-SHA-256 (Key, S).

For another example, if the EAP-AKA' authentication is performed, a 5G EAP-AKA' authentication vector (RAND, AUTN, CK', IK', XRES) is calculated based on the authentication vector quintet (RAND, AUTN, CK, IK, XRES).

RAND in the 5G EAP-AKA' authentication vector is equal to RAND in the authentication vector quintet.

AUTN in the 5G EAP-AKA' authentication vector is equal to AUTN in the authentication vector quintet.

XRES in the 5G EAP-AKA' authentication vector is equal to XRES in the authentication vector quintet.

CK'||IK'=KDF (CK||IK, 0x20||SN name||length of SN name||SQN⊕AK||length of SQN⊕AK).

For example, Kausf is an upper 256-bit of the EMSK, and EMSK=MK[1152 . . . 1663], where:

MK=PRF' (IK'||CK', "EAP-AKA'"||SUPI);
PRF' (K, S)=T1|T2|T3|T4| . . . ;
T1=HMAC-SHA-256 (K, S|0x01);
T2=HMAC-SHA-256 (K, T1|S|0x02);
T3=HMAC-SHA-256 (K, T2|S|0x03); and
T4=HMAC-SHA-256 (K, T3|S|0x04).

The SUPI is obtained by the IWF from an SUCI.

The IWF may further calculate a key Kseaf.

For example, Kseaf=KDF (Kausf, 0x6C||SN name||length of SN name).

The calculation of the key Kseaf may alternatively be implemented after step 410.

2506: The IWF sends a user authentication response to the AMF, where the user authentication response carries the 5G authentication vector.

2507: The AMF sends an authentication request to the UE after receiving the user authentication response from the IWF, where the authentication request carries AUTN/RAND included in the 5G authentication vector.

2508: After receiving the authentication request from the AMF, the UE may authenticate a network based on received AUTN. If an authentication mode is 5G AKA authentication and the authentication succeeds, the UE adds calculated RES* to an authentication response to be sent to the AMF, where the UE calculates RES* in a same manner as the AMF calculates XRES*. If the authentication mode is 5G EAP-AKA' authentication and the authentication succeeds, the UE adds calculated RES to the authentication response to be sent to the AMF, where the UE calculates RES in a same manner as the AMF calculates XRES.

2509: After receiving the authentication response from the UE, the AMF forwards the authentication response from the UE to the IWF.

2510: The IWF performs authentication on a result (RES* or RES) returned by the UE after receiving the authentication response from the UE that is forwarded by the AMF, to be more specific, performs 5G AKA authentication or 5G EAP-AKA' authentication.

2511: The IWF feeds back an authentication result of the UE to the AMF.

In addition, optionally, the AMF may add an authentication vector request indication to the user authentication request, and the IWF forwards the user authentication request to the HSS/HLR. The IWF may be responsible for calculating the 5G authentication vector and a 5G security key using the authentication vector quintet. For 5G AKA authentication, the AMF may still perform HXRES* authentication, and the IWF completes XRES* authentication. For EAP-AKA' authentication, the IWF may complete XRES authentication. In other words, in the example procedure in FIG. 25A, some functions performed by the AMF may alternatively be performed by the IWF, and some functions performed by the IWF may alternatively be performed by the AMF.

In the solution in this embodiment, the IWF is introduced to be responsible for generating the 5G authentication vector and authenticating the UE. This helps reduce changes to the AMF.

It may be understood that functions of functional modules of these products in the product embodiments of this application may be implemented based on related methods in the method embodiments. For implementations, refer to the foregoing method embodiments.

An embodiment of this application further provides a computer-readable storage medium. The computer-readable storage medium stores a computer program, and the computer program is executed by hardware (for example, a processor), to perform some or all of the steps of any method performed by any device in the embodiments of this application.

An embodiment of this application further provides a computer program product including instructions. When the computer program product runs on a computer device, the computer device is enabled to perform some or all of the steps of any method in the foregoing aspects.

All or some of the foregoing embodiments may be implemented using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, an optical disc), a semiconductor medium (for example, a solid-state drive), or the like. In the foregoing embodiments, the descriptions of the embodiments have respective focuses. For a part that is not described in detail in an embodiment, refer to related descriptions in another embodiment.

In the several embodiments provided in this application, it should be understood that the disclosed apparatus may be implemented in other manners. For example, the described apparatus embodiment is merely an example. For example, division into units is merely logical function division or may be other division during actual implementation. For example, a plurality of units or components may be combined or integrated into another system, or some features may be ignored or not performed. In addition, the displayed or discussed mutual indirect couplings or direct couplings or communication connections may be implemented through some interfaces. The indirect couplings or communication connections between the apparatuses or units may be implemented in an electronic form or in other forms.

The units described as separate parts may or may not be physically separate. Parts displayed as units may or may not be physical units, and may be located in one position or may be distributed on a plurality of network units. Some or all of the units may be selected according to actual needs to achieve the objectives of the solutions in the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions in this application essentially, or the part contributing to other approaches, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a Universal Serial Bus (USB) flash drive, a removable hard disk, a read-only memory (ROM), a random-access memory (RAM), a magnetic disk, or an optical disc.

What is claimed is:

1. A communication method, comprising:
receiving, by a first core network device, a first request when a user equipment roams from a first network to a second network, wherein the first request is a first user authentication request or a first authentication data request, wherein the second network is a 5th generation (5G) standalone network, wherein the first network is a 5G non-standalone network, and wherein the first core network device is in the first network;

generating, by the first core network device, an authentication vector quintet after receiving the first request, wherein a $0^{th}$ bit of an authentication management field in the authentication vector quintet is set to 1; and sending, by the first core network device, a response to the first request, wherein the response carries the authentication vector quintet.

2. The communication method according to claim 1, wherein the first core network device is a home subscriber server or a home location register.

3. A core network device, comprising:
a processor; and
a memory coupled to the processor and configured to store instructions executable by the processor to cause the core network device to:
  receive a first request when a user equipment roams from a first network to a second network, wherein the first request is a user authentication request or an authentication data request, wherein the second network is a $5^{th}$ generation (5G) standalone network, wherein the first network is a 5G non-standalone network, and wherein the core network device is in the first network;
  generate an authentication vector quintet after receiving the first request, wherein a $0^{th}$ bit of an authentication management field in the authentication vector quintet is set to 1; and
  send a response to the first request, wherein the response carries the authentication vector quintet.

4. A third core network device, comprising:
a processor; and
a memory coupled to the processor and configured to store instructions executable by the processor to cause the third core network device to:
  receive a second user authentication request from a second core network device when a user equipment roams from a first network to a second network, wherein the second network is a $5^{th}$ generation (5G) standalone network, wherein the first network is a 5G non-standalone network, wherein the third core network device is in the first network or the second network, and wherein the second core network device is in the second network;
  send a first request to a first core network device in the first network, wherein the first request is a first user authentication request or a first authentication data request;
  receive a response to the first request from the first core network device, wherein the response carries an authentication vector quintet, and wherein a $0^{th}$ bit of an authentication management field in the authentication vector quintet is set to 1;
  generate a 5G authentication vector for the user equipment using the authentication vector quintet; and
  send a user authentication response to the second core network device, wherein the user authentication response carries the 5G authentication vector.

5. The third core network device according to claim 4, wherein the processor is configured to execute the instructions to further cause the third core network device to generate a 5G security key of the user equipment using the authentication vector quintet, and wherein the 5G security key comprises a security anchor function (SEAF) key (Kseaf) and an authentication server function (AUSF) key (Kausf).

6. The third core network device according to claim 4, wherein the third core network device is an authentication server function, an interworking function, or an authentication proxy network element.

7. The third core network device according to claim 4, wherein the first core network device is a home subscriber server or a home location register.

8. The third core network device according to claim 4, wherein the second core network device is an access and mobility management function.

9. The third core network device according to claim 4, wherein the response further carries an authentication mode indication, wherein the authentication mode indication indicates a 5G Authentication and Key Agreement (AKA) authentication mode or a 5G Extensible Authentication Protocol (EAP)-AKA' authentication mode, wherein the 5G authentication vector is a 5G EAP-AKA' authentication vector when the authentication mode indication indicates the 5G EAP-AKA' authentication mode, and wherein the 5G authentication vector is a 5G AKA authentication vector when the authentication mode indication indicates the 5G AKA authentication mode.

10. The third core network device according to claim 9, wherein the processor is configured to execute the instructions to further cause the third core network device to:
  receive an authentication response from the second core network device; and
  perform 5G AKA authentication on the user equipment when the authentication mode indication indicates the 5G AKA authentication mode.

11. The third core network device according to claim 9, wherein the processor is configured to execute the instructions to further cause the third core network device to:
  receive an authentication response from the second core network device; and
  perform 5G EAP-AKA' authentication on the user equipment when the authentication mode indication indicates the 5G EAP-AKA' authentication mode.

12. The core network device according to claim 3, wherein the first request is from an interworking function, and the response to the first request is sent to the interworking function.

13. The core network device according to claim 3, wherein the authentication vector quintet comprises a CK, an IK, a random number (RAND), an authentication token (AUTN), and an expected authentication result (XRES), and wherein the authentication management field is in the AUTN.

14. The core network device according to claim 13, wherein the AUTN is for the user equipment to authenticate the second network.

15. A communication method, comprising:
  receiving a second user authentication request from a second core network device when a user equipment roams from a first network to a second network, wherein the second network is a 5th generation (5G) standalone network, wherein the first network is a 5G non-standalone network, and wherein the second core network device is in the second network;
  sending a first request to a first core network device in the first network, wherein the first request is a first user authentication request or a first authentication data request;

receiving a response to the first request from the first core network device, wherein the response carries an authentication vector quintet, and wherein a 0th bit of an authentication management field in the authentication vector quintet is set to 1;

generating a 5G authentication vector for the user equipment using the authentication vector quintet; and sending a user authentication response to the second core network device, wherein the user authentication response carries the 5G authentication vector.

16. The communication method according to claim 15, wherein the method is performed by an interworking function.

17. The third core network device according to claim 4, wherein the authentication vector quintet comprises a CK, an IK, a random number (RAND), an authentication token (AUTN), and an expected authentication result (XRES), and wherein the authentication management field is in the AUTN.

18. The third core network device according to claim 17, wherein the AUTN is for the user equipment to authenticate the second network.

19. The third core network device according to claim 17, wherein an authentication mode is a 5G Authentication and Key Agreement (AKA) authentication mode, and the 5G authentication vector comprises: the RAND, the AUTN, an authentication server function (AUSF) key (Kausf), and an XRES*.

20. The third core network device according to claim 17, wherein an authentication mode is a 5G Extensible Authentication Protocol (EAP)-AKA' authentication mode, and the 5G authentication vector comprises: the RAND, the AUTN, CK', IK', and the XRES.

* * * * *